(12) United States Patent
Hara et al.

(10) Patent No.: US 10,040,499 B2
(45) Date of Patent: Aug. 7, 2018

(54) ELECTRICAL SEATPOST ASSEMBLY

(71) Applicant: SHIMANO INC., Sakai (JP)

(72) Inventors: Nobukatsu Hara, Sakai (JP); Toyoto Shirai, Sakai (JP); Yuta Kurokawa, Sakai (JP)

(73) Assignee: SHIMANO INC., Sakai (JP)

( * ) Notice: Subject to any disclaimer, the term of this patent is extended or adjusted under 35 U.S.C. 154(b) by 35 days.

(21) Appl. No.: 14/873,160

(22) Filed: Oct. 1, 2015

(65) Prior Publication Data

US 2017/0096185 A1 Apr. 6, 2017

(51) Int. Cl.
*B62K 19/36* (2006.01)
*B62J 1/08* (2006.01)
*B62M 9/122* (2010.01)

(52) U.S. Cl.
CPC ............ *B62J 1/08* (2013.01); *B62J 2001/085* (2013.01); *B62M 9/122* (2013.01)

(58) Field of Classification Search
CPC . B62J 1/08; B62J 2001/085; B62J 6/00; B62J 2006/008; B62J 1/06; B62K 19/36
See application file for complete search history.

(56) References Cited

U.S. PATENT DOCUMENTS

| 8,016,349 | B2 | 9/2011 | Mouri et al. | |
|---|---|---|---|---|
| 8,308,124 | B2 | 11/2012 | Hsu | |
| 2013/0138302 | A1* | 5/2013 | Hara | B62J 1/08 701/49 |
| 2013/0221713 | A1 | 8/2013 | Pelot et al. | |
| 2014/0102237 | A1* | 4/2014 | Jordan | B62K 23/02 74/473.12 |
| 2014/0298943 | A1* | 10/2014 | Hashimoto | F16H 59/044 74/473.12 |
| 2014/0305253 | A1 | 10/2014 | Tseng | |
| 2016/0031506 | A1* | 2/2016 | Lloyd | B62J 99/00 701/49 |
| 2016/0176463 | A1* | 6/2016 | McPherson | B62J 1/10 297/215.15 |
| 2016/0311500 | A1* | 10/2016 | Kasai | B62M 6/45 |
| 2017/0096184 | A1* | 4/2017 | Hara | B62J 1/08 |

FOREIGN PATENT DOCUMENTS

| DE | 202010012738 U1 | 12/2010 |
|---|---|---|
| DE | 202013105415 U1 | 12/2013 |
| EP | 2287065 | 2/2011 |
| EP | 2657113 | 10/2013 |
| EP | 2865586 A1 | 4/2015 |
| TW | M378163 U1 | 4/2010 |
| TW | M458366 U1 | 8/2013 |

* cited by examiner

*Primary Examiner* — Bradley T King
(74) *Attorney, Agent, or Firm* — Mori & Ward, LLP

(57) ABSTRACT

An electrical seatpost assembly comprises a first cylinder, a second cylinder, a guide member, a positioning structure, an electrical actuator, and an electrical device. The guide member is disposed between the first cylinder and the second cylinder to slidably guide the second cylinder with respect to the first cylinder. The positioning structure is to adjustably position the second cylinder relative to the first cylinder in a telescopic direction. The electrical actuator is to actuate the positioning structure in accordance with an electrical signal. The electrical device is mounted to the first cylinder. An upper end of the electrical device is disposed above a lower end of the guide member in the telescopic direction in a mounting state where the first cylinder is mounted to a bicycle frame.

48 Claims, 53 Drawing Sheets

ELECTRICAL SEATPOST ASSEMBLY

BACKGROUND OF THE INVENTION

Field of the Invention

The present invention relates to an electrical seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a seatpost assembly.

SUMMARY OF THE INVENTION

In accordance with a first aspect of the present invention, an electrical seatpost assembly comprises a first cylinder, a second cylinder, a guide member, a positioning structure, an electrical actuator, and an electrical device. The first cylinder comprises a first end and a second end. The second end is opposite to the first end in a telescopic direction. The second cylinder is telescopically received in the first cylinder from the first end. The guide member is disposed between the first cylinder and the second cylinder to slidably guide the second cylinder with respect to the first cylinder. The positioning structure is to adjustably position the second cylinder relative to the first cylinder in the telescopic direction. The electrical actuator is to actuate the positioning structure in accordance with an electrical signal. The electrical device is mounted to the first cylinder. An upper end of the electrical device is disposed above a lower end of the guide member in the telescopic direction in a mounting state where the first cylinder is mounted to a bicycle frame.

With the electrical seatpost assembly according to the first aspect, an upper end of the electrical device is disposed above a lower end of the guide member in the telescopic direction in the mounting state where the first cylinder is mounted to the bicycle frame. Accordingly, it is possible to utilize a space disposed around the guide member, allowing the electrical seatpost assembly to be compact.

In accordance with a second aspect of the present invention, the electrical seatpost assembly according to the first aspect is configured so that the guide member is provided at the first end.

With the electrical seatpost assembly according to the second aspect, it is possible to utilize a space disposed around the first end of the first cylinder, allowing the electrical seatpost assembly to be compact without making a total length of the electrical seatpost assembly in the telescopic direction.

In accordance with a third aspect of the present invention, the electrical seatpost assembly according to the first or second aspect further comprises a seal provided at the first end to seal a gap between the first and second cylinders. The upper end of the electrical device is disposed above a lower end of the seal in the telescopic direction in the mounting state.

With the electrical seatpost assembly according to the third aspect, it is possible to utilize a space disposed around the seal provided at the first end, allowing the electrical seatpost assembly to be compact.

In accordance with a fourth aspect of the present invention, the electrical seatpost assembly according to the third aspect is configured so that the first cylinder includes a cover member provided at the first end. At least one of the guide member and the seal is disposed between the cover member and the second cylinder in the direction perpendicular to the telescopic direction.

With the electrical seatpost assembly according to the fourth aspect, it is possible to protect at least one of the guide member and the seal by the cover member.

In accordance with a fifth aspect of the present invention, the electrical seatpost assembly according to any one of the first to fourth aspects is configured so that the electrical device is configured to receive at least one of an electrical input and a mechanical input.

With the electrical seatpost assembly according to the fifth aspect, it is possible to operate the electrical seatpost assembly using at least one of the electrical input and the mechanical input.

In accordance with a sixth aspect of the present invention, the electrical seatpost assembly according to the fifth aspect is configured so that the electrical device includes a wireless receiver to wirelessly receive a wireless signal.

With the electrical seatpost assembly according to the sixth aspect, it is possible to operate the electrical seatpost assembly using the wireless signal.

In accordance with a seventh aspect of the present invention, the electrical seatpost assembly according to the sixth aspect is configured so that the electrical device includes a pairing switch to switch a mode of the wireless receiver to a pairing mode.

With the electrical seatpost assembly according to the seventh aspect, it is possible to easily perform the pairing between the wireless receiver and an external operating device.

In accordance with an eighth aspect of the present invention, the electrical seatpost assembly according to the sixth or seventh aspect is configured so that the first cylinder includes a cover member provided at the first end. The cover member includes a resin material.

With the electrical seatpost assembly according to the eighth aspect, it is possible to maintain the intensity of the wireless signal even if the cover member is disposed to cover the wireless receiver.

In accordance with a ninth aspect of the present invention, the electrical seatpost assembly according to any one of the first to eighth aspects is configured so that the electrical device includes a start switch to turn the electrical actuator on.

With the electrical seatpost assembly according to the ninth aspect, it is possible to manually start the electrical actuator via the start switch.

In accordance with a tenth aspect of the present invention, the electrical seatpost assembly according to any one of the first to ninth aspects is configured so that the electrical device includes an operating switch to operate the electrical actuator to actuate the positioning structure.

With the electrical seatpost assembly according to the tenth aspect, it is possible to manually operate the electrical actuator via the operating switch.

In accordance with an eleventh aspect of the present invention, the electrical seatpost assembly according to any one of the first to tenth aspects is configured so that the electrical device includes a control substrate.

With the electrical seatpost assembly according to the eleventh aspect, it is possible to install electrical elements on the control substrate in accordance with the desired specification of the electrical seatpost assembly.

In accordance with a twelfth aspect of the present invention, the electrical seatpost assembly according to any one of the first to eleventh aspects is configured so that the electrical device includes an indicator provided outside the first cylinder and the second cylinder to indicate seatpost information relating to the electrical seatpost assembly.

With the electrical seatpost assembly according to the twelfth aspect, it is possible to inform the user of the seatpost information relating to the electrical seatpost assembly.

In accordance with a thirteenth aspect of the present invention, the electrical seatpost assembly according to the twelfth aspect is configured so that the seatpost information includes a remaining battery level of a battery to supply electrical power to the electrical actuator.

With the electrical seatpost assembly according to the thirteenth aspect, it is possible to inform the user of the remaining battery level of the battery.

In accordance with a fourteenth aspect of the present invention, the electrical seatpost assembly according to any one of the first to thirteenth aspects is configured so that the electrical device includes a charging port to receive electrical power to charge a battery.

With the electrical seatpost assembly according to the fourteenth aspect, it is possible to charge the battery via the charging port.

In accordance with a fifteenth aspect of the present invention, the electrical seatpost assembly according to any one of the first to fourteenth aspects is configured so that the electrical device is provided on a front side of the guide member in the mounting state.

With the electrical seatpost assembly according to the fifteenth aspect, it is possible to easily operate or check the electrical device for the user during cycling.

In accordance with a sixteenth aspect of the present invention, the electrical seatpost assembly according to any one of the first to fifteenth aspects is configured so that the first cylinder includes a cover member provided at the first end. The cover member includes an outer peripheral surface. The electrical device is provided not to protrude radially outwardly from the outer peripheral surface of the cover member.

With the electrical seatpost assembly according to the sixteenth aspect, it is possible to prevent the interference between the electrical device and the bicycle frame when the first cylinder is mounted to the bicycle frame.

In accordance with a seventeenth aspect of the present invention, the electrical seatpost assembly according to any one of the first to sixteenth aspects is configured so that the electrical device includes at least one power receiving port to receive electrical power from an external power supply.

With the electrical seatpost assembly according to the seventeenth aspect, it is possible to utilize the electrical power of the external power supply.

In accordance with an eighteenth aspect of the present invention, the electrical seatpost assembly according to the seventeenth aspect is configured so that the at least one power receiving port is movably mounted relative to the first cylinder in a circumferential direction of the first cylinder.

With the electrical seatpost assembly according to the eighteenth aspect, it is possible to adjust a position of the at least one power receiving port in the circumferential direction. This allows the user to select a preferable route of an electrical cable.

In accordance with a nineteenth aspect of the present invention, the electrical seatpost assembly according to the seventeenth or eighteenth aspect is configured so that the at least one power receiving port includes a plurality of power receiving ports. The plurality of power receiving ports are spaced apart from each other in a circumferential direction of the first cylinder.

With the electrical seatpost assembly according to the nineteenth aspect, the plurality of power receiving ports allow the user to select a preferable ports among the plurality of power receiving ports. This allows the user to select a preferable route of an electrical cable.

In accordance with a twentieth aspect of the present invention, the electrical seatpost assembly according to any one of the first to nineteenth aspects is configured so that the electrical device includes a battery.

With the electrical seatpost assembly according to the twentieth aspect, it is possible to supply electrical power from the battery to the electrical actuator.

In accordance with a twenty-first aspect of the present invention, the electrical seatpost assembly according to the twentieth aspect is configured so that the first cylinder includes a cover member provided at the first end. The battery is detachably attached to the cover member.

With the electrical seatpost assembly according to the twenty-first aspect, it is possible to detach and attach the battery from and to the cover member in the mounting state.

In accordance with a twenty-second aspect of the present invention, the electrical seatpost assembly according to the twentieth or twenty-first aspect is configured so that the first cylinder includes a cover member provided at the first end. One of the electrical device and the cover member includes a charging port to receive electrical power to charge the battery.

With the electrical seatpost assembly according to the twenty-second aspect, it is possible to charge the battery via the charging port.

In accordance with a twenty-third aspect of the present invention, the electrical seatpost assembly according to any one of the twentieth to twenty-second aspects is configured so that the battery is provided on a rear side of the cover member in the mounting state.

With the electrical seatpost assembly according to the twenty-third aspect, it is possible to utilize a space disposed around the rear side of the cover member for the battery.

In accordance with a twenty-fourth aspect of the present invention, the electrical seatpost assembly according to any one of the first to twenty-third aspects further comprises a connecting part. The electrical actuator includes a motor. The motor is provided at the second end of the first cylinder. The connecting part electrically connects the electrical device to the motor.

With the electrical seatpost assembly according to the twenty-fourth aspect, it is possible to electrically connect the electrical device to the motor via the connecting part even if the electrical device is arranged apart from the motor.

In accordance with a twenty-fifth aspect of the present invention, the electrical seatpost assembly according to the twenty-fourth aspect is configured so that the connecting part includes an electronic substrate electrically connecting the electrical device to the motor.

With the electrical seatpost assembly according to the twenty-fifth aspect, it is possible to utilize the electronic substrate as a cable electrically connecting the electrical device to the motor. This can make a space for the electronic substrate smaller.

In accordance with a twenty-sixth aspect of the present invention, the electrical seatpost assembly according to the twenty-fourth or twenty-fifth aspect is configured so that the first cylinder includes an accommodation part accommodating the connecting part.

With the electrical seatpost assembly according to the twenty-sixth aspect, it is possible to utilize a part of the first cylinder as a space for accommodating the connecting part. This can maintain the size of the electrical seatpost assembly.

In accordance with a twenty-seventh aspect of the present invention, an electrical seatpost assembly comprises a first cylinder, a second cylinder, a positioning structure, an electrical actuator, and an indicator. The second cylinder is telescopically received in the first cylinder. The positioning structure is to adjustably position the second cylinder relative to the first cylinder in the telescopic direction. The electrical actuator is to actuate the positioning structure in accordance with an electrical signal. The indicator is to indicate seatpost information relating to the electrical seatpost assembly. The indicator is provided on one of the first cylinder and the second cylinder.

With the electrical seatpost assembly according to the twenty-seventh aspect, it is possible to inform the user of the seatpost information relating to the electrical seatpost assembly.

In accordance with a twenty-eighth aspect of the present invention, the electrical seatpost assembly according to the twenty-seventh aspect is configured so that the indicator includes one of a light emitting element and a display.

With the electrical seatpost assembly according to the twenty-eighth aspect, it is possible to easily check the seatpost information for the user via the indicator.

In accordance with a twenty-ninth aspect of the present invention, the electrical seatpost assembly according to the twenty-seventh or twenty-eighth aspect is configured so that the seatpost information includes a remaining battery level of a battery to supply electrical power to the electrical actuator.

With the electrical seatpost assembly according to the twenty-ninth aspect, it is possible to inform the user of the remaining battery level of the battery.

In accordance with a thirtieth aspect of the present invention, the electrical seatpost assembly according to the twenty-ninth aspect further comprises the battery to supply the electrical power to the electrical actuator.

With the electrical seatpost assembly according to the thirtieth aspect, it is possible to omit a power cable.

In accordance with a thirty-first aspect of the present invention, the electrical seatpost assembly according to the twenty-ninth or thirtieth aspect is configured so that the indicator indicates the remaining battery level of the battery when the electrical actuator is turned on.

With the electrical seatpost assembly according to the thirty-first aspect, it is possible to inform the user of the remaining battery level of when the electrical actuator is turned on.

In accordance with a thirty-second aspect of the present invention, the electrical seatpost assembly according to any one of the twenty-ninth to thirty-first aspects is configured so that the indicator indicates the remaining battery level of the battery when the indicator receives an indication command signal.

With the electrical seatpost assembly according to the thirty-second aspect, it is possible to inform the user of the remaining battery level at a specific timing caused by the indication command signal.

In accordance with a thirty-third aspect of the present invention, the electrical seatpost assembly according to the thirty-second aspect further comprises an indication operating device to generate the indication command signal.

With the electrical seatpost assembly according to the thirty-third aspect, it is possible to generate the indication command signal based on a user input via the indication operating device. This allows the user to check the remaining battery level at a desired timing of the user's choice.

In accordance with a thirty-fourth aspect of the present invention, the electrical seatpost assembly according to the thirty-third aspect is configured so that the indication operating device is provided on one of the first cylinder and the second cylinder.

With the electrical seatpost assembly according to the thirty-fourth aspect, it is possible to easily access the indication operating device.

In accordance with a thirty-fifth aspect of the present invention, the electrical seatpost assembly according to any one of the twenty-seventh to thirty-fourth aspects is configured so that the indicator is provided on a front side of one of the first cylinder and the second cylinder in a mounting state where the first cylinder is mounted to a bicycle frame.

With the electrical seatpost assembly according to the thirty-fifth aspect, it is possible to easily check the seatpost information indicated by the indicator for user.

In accordance with a thirty-sixth aspect of the present invention, an electrical seatpost assembly comprises a first cylinder, a second cylinder, a positioning structure, an actuating device, and a changing device. The second cylinder is telescopically received in the first cylinder. The positioning structure is to adjustably position the second cylinder relative to the first cylinder in the telescopic direction. The actuating device is to actuate the positioning structure. The actuating device has an accessible state where the actuating device is controlled in accordance with an electrical signal, and an inaccessible state where the actuating device is not controlled in accordance with an electrical signal. The changing device is to change a state of the actuating device between the accessible state and the inaccessible state.

With the electrical seatpost assembly according to the thirty-sixth aspect, it is possible to manually or automatically switch the state of the actuating device between the accessible state and the inaccessible state using the changing device. This can reduce power consumption of the actuating device.

In accordance with a thirty-seventh aspect of the present invention, the electrical seatpost assembly according to the thirty-sixth aspect is configured so that the changing device includes a manual switch.

With the electrical seatpost assembly according to the thirty-seventh aspect, it is possible to manually switch the state of the actuating device between the accessible state and the inaccessible state using the changing device. This can reduce power consumption of the actuating device.

In accordance with a thirty-eighth aspect of the present invention, the electrical seatpost assembly according to the thirty-seventh aspect is configured so that the manual switch is provided on an outer peripheral surface of one of the first cylinder and the second cylinder.

With the electrical seatpost assembly according to the thirty-eighth aspect, it is possible to easily access the manual switch.

In accordance with a thirty-ninth aspect of the present invention, the electrical seatpost assembly according to any one of the thirty-sixth to thirty-eighth aspects is configured so that the changing device includes a sensor and automatically changes the state of the actuating device between the accessible state and the inaccessible state based on a sensing result of the sensor.

With the electrical seatpost assembly according to the thirty-ninth aspect, it is possible to automatically switch the state of the actuating device between the accessible state and the inaccessible state using the changing device. This can reduce power consumption of the actuating device.

In accordance with a fortieth aspect of the present invention, the electrical seatpost assembly according to the thirty-ninth aspect is configured so that the changing device includes a vibration sensor to sense vibration of a bicycle.

With the electrical seatpost assembly according to the fortieth aspect, it is possible to automatically switch the state of the actuating device between the accessible state and the inaccessible state based on the vibration of the bicycle.

In accordance with a forty-first aspect of the present invention, the electrical seatpost assembly according to the thirty-ninth or fortieth aspect is configured so that the changing device includes a seating sensor to sense that a rider is on a saddle mounted to the electrical seatpost assembly.

With the electrical seatpost assembly according to the forty-first aspect, it is possible to automatically switch the state of the actuating device between the accessible state and the inaccessible state based on the usage state of the electrical seatpost assembly.

In accordance with a forty-second aspect of the present invention, the electrical seatpost assembly according to the forty-first aspect is configured so that the seating sensor includes a strain sensor to sense strain of the electrical seatpost assembly.

With the electrical seatpost assembly according to the forty-second aspect, it is possible to sense that the rider is on the saddle base on the strain of the electrical seatpost assembly.

In accordance with a forty-third aspect of the present invention, the electrical seatpost assembly according to the forty-first or forty-second aspect is configured so that the seating sensor includes an air pressure sensor to sense a pressure in an air chamber of the electrical seatpost assembly.

With the electrical seatpost assembly according to the forty-third aspect, it is possible to sense that the rider is on the saddle base on the pressure of the air chamber.

In accordance with a forty-fourth aspect of the present invention, the electrical seatpost assembly according to any one of the forty-first to forty-third aspects is configured so that the seating sensor includes a hydraulic sensor to sense a pressure in a hydraulic chamber of the electrical seatpost assembly.

With the electrical seatpost assembly according to the forty-fourth aspect, it is possible to sense that the rider is on the saddle base on the pressure of the hydraulic chamber.

In accordance with a forty-fifth aspect of the present invention, the electrical seatpost assembly according to any one of the thirty-ninth to forty-fourth aspects is configured so that the seating sensor is provided in the positioning structure.

With the electrical seatpost assembly according to the forty-fifth aspect, it is possible to determine that the rider is on the saddle based on a state of the positioning structure.

In accordance with a forty-sixth aspect of the present invention, the electrical seatpost assembly according to any one of the thirty-sixth to forty-fifth aspects is configured so that the changing device changes the state of the actuating device from the accessible state to the inaccessible state when the changing device does not receive an input for a waiting time in the accessible state.

With the electrical seatpost assembly according to the forty-sixth aspect, it is possible to automatically switch the state of the actuating device from the accessible state to the inaccessible state. This can reduce power consumption of the actuating device.

In accordance with a forty-seventh aspect of the present invention, the electrical seatpost assembly according to any one of the thirty-sixth to forty-sixth aspects is configured so that the actuating device includes a wireless receiver and an electrical actuator. The wireless receiver is to wirelessly receive a wireless signal. The electrical actuator is to actuate the positioning structure in accordance with the wireless signal. The wireless receiver wirelessly receives the wireless signal in the accessible state of the actuating device.

With the electrical seatpost assembly according to the forty-seventh aspect, it is possible to operate the actuating device using the wireless signal.

In accordance with a forty-eighth aspect of the present invention, the electrical seatpost assembly according to any one of the thirty-sixth to forty-seventh aspects is configured so that the actuating device includes an electrical actuator to actuate the positioning structure based on a wireless signal. The electrical seatpost assembly further comprises an operating switch to operate the electrical actuator to actuate the positioning structure without the wireless signal.

With the electrical seatpost assembly according to the forty-eighth aspect, it is possible to manually operate the electrical actuator via the operating switch even if the electrical actuator does not receive the wireless signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
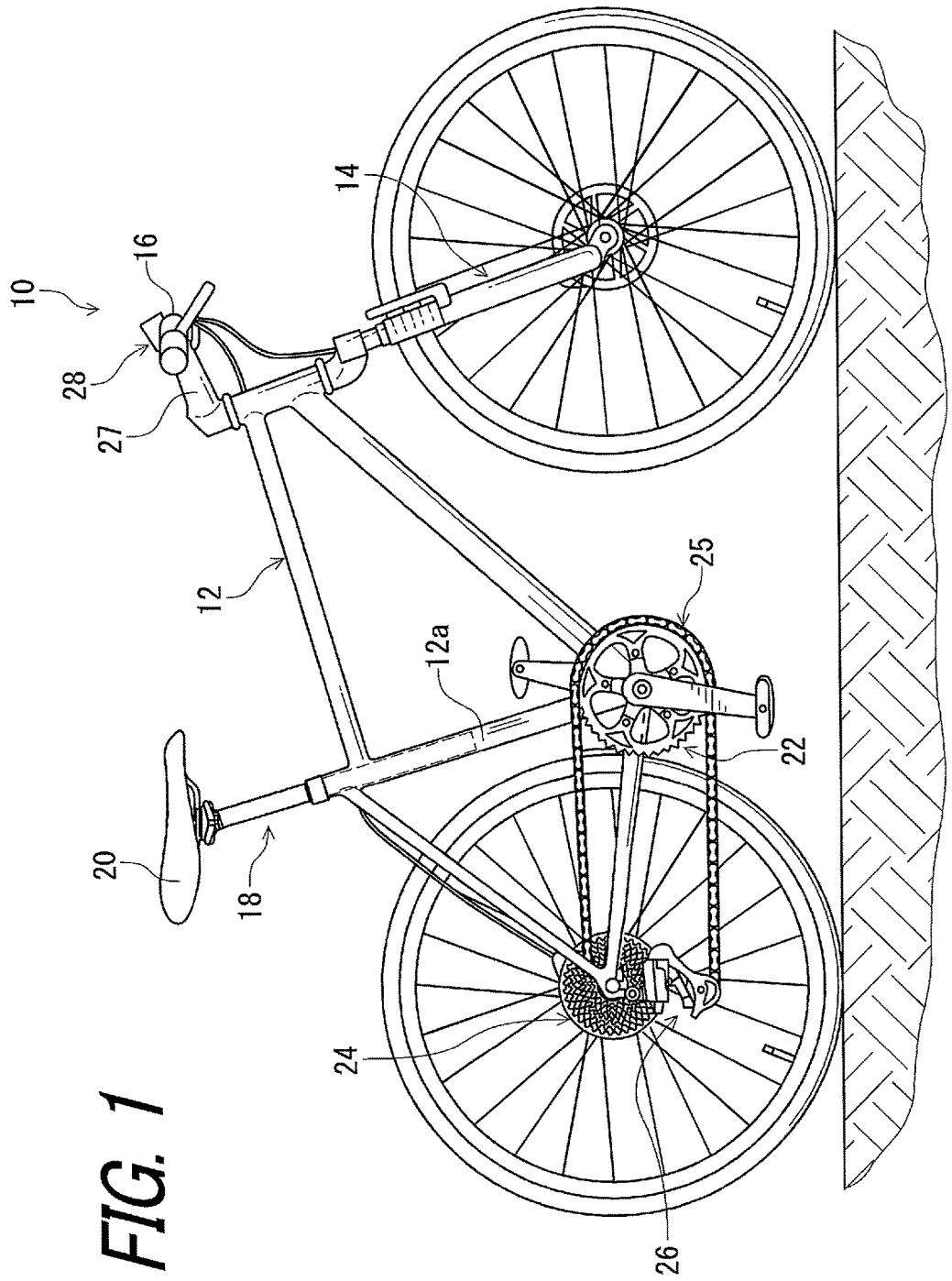
FIG. 1 is a side elevational view of a bicycle in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 in accordance with a first embodiment comprises a bicycle frame 12, a front fork 14, a handlebar 16, an electrical seatpost assembly 18, a saddle 20, a front single sprocket 22, a rear sprocket assembly 24, and a chain 25. The front fork 14 is rotatably mounted to the bicycle frame 12. The handlebar 16 is attached to the front fork 14 via a stem 27. The electrical seatpost assembly 18 is mounted to the bicycle frame 12. The saddle 20 is attached to the electrical seatpost assembly 18. The front single sprocket 22 is rotatably mounted to the bicycle frame 12. The rear sprocket assembly 24 is rotatably mounted to the bicycle frame 12. The chain 25 is engaged with the front single sprocket 22 and the rear sprocket assembly 24. The bicycle 10 comprises a rear derailleur 26 to change a speed stage of the bicycle 10.

Figure 2:
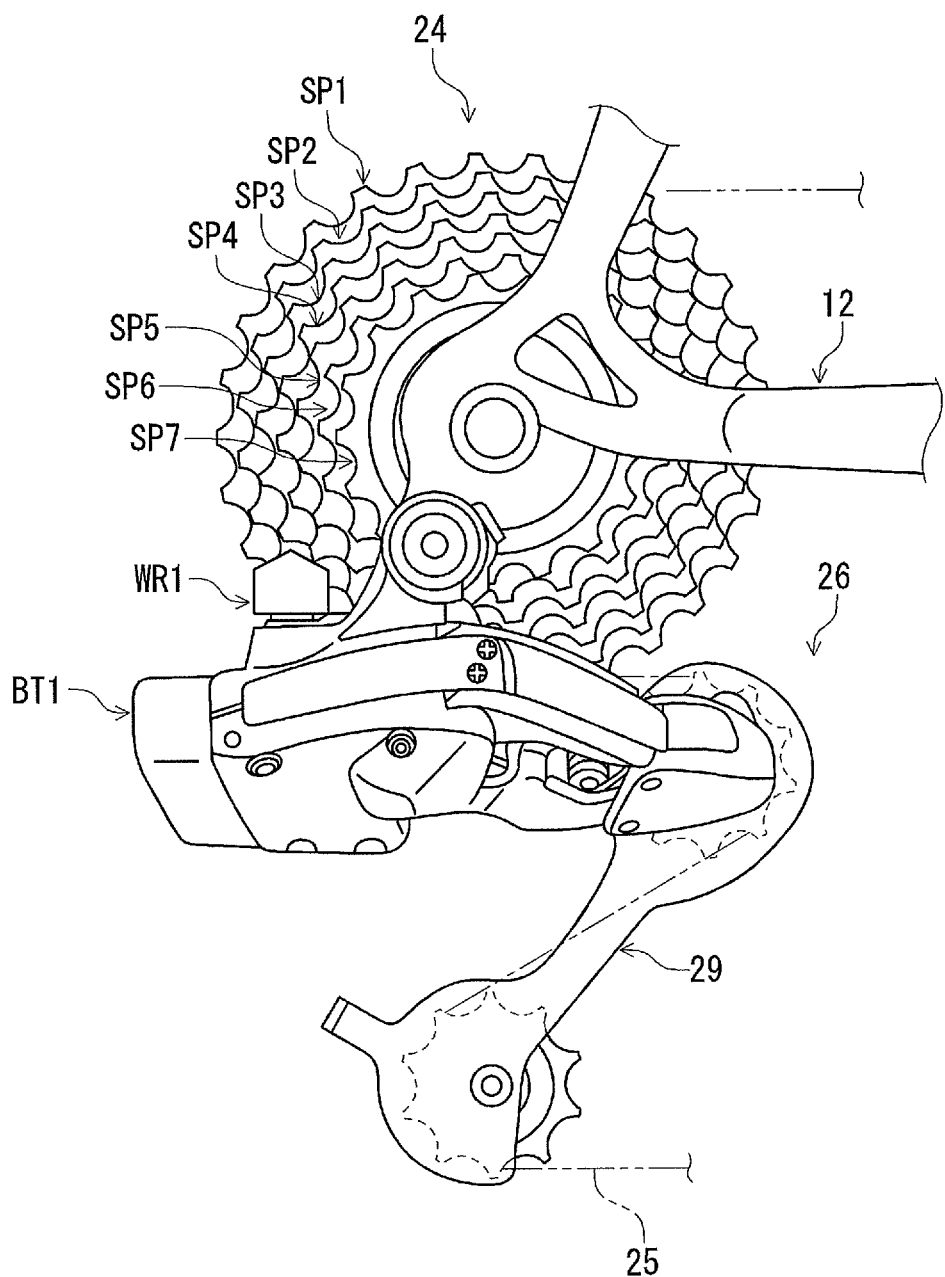
FIG. 2 is a side elevational view of a rear derailleur of the bicycle illustrated in FIG. 1.

As seen in FIG. 2, the rear sprocket assembly 24 includes a plurality of rear sprockets SP1 to SP7. The rear derailleur 26 shifts the chain 25 between the plurality of rear sprockets SP1 to SP7 of the rear sprocket assembly 24. In this embodiment, the rear sprocket assembly 24 includes seven rear sprockets SP1 to SP7. The rear derailleur 26 changes a speed stage of the bicycle 10 among a plurality of speed stages corresponding to the plurality of rear sprockets SP1 to SP7. The bicycle 10 has seven speed stages corresponding to the plurality of rear sprockets SP1 to SP7. A total number of the speed stages is not limited to this embodiment. Furthermore, the bicycle 10 can include a plurality of front sprockets and a front derailleur to shift the chain 25 between the plurality of front sprockets. The front derailleur can be an electrically-operated derailleur. In such an embodiment, the electrically-operated front derailleur can be operated based on a wireless signal and can include a battery and/or a wireless receiver. Also, the electrically-operated front derailleur can be operated based on an electrical signal transmitted via an electrical communication cable.

In the present application, the following directional terms "forward", "rearward", "left", "right", "upward" and "downward" as well as any other similar directional terms refer to those directions which are determined on the basis of the rider who sits on the saddle 20 with facing the handlebar 16. Accordingly, these terms, as utilized to describe the electrical seatpost assembly 18, should be interpreted relative to the bicycle 10 equipped with the electrical seatpost assembly 18 as used in an upright riding position on a horizontal surface.

Figure 3:
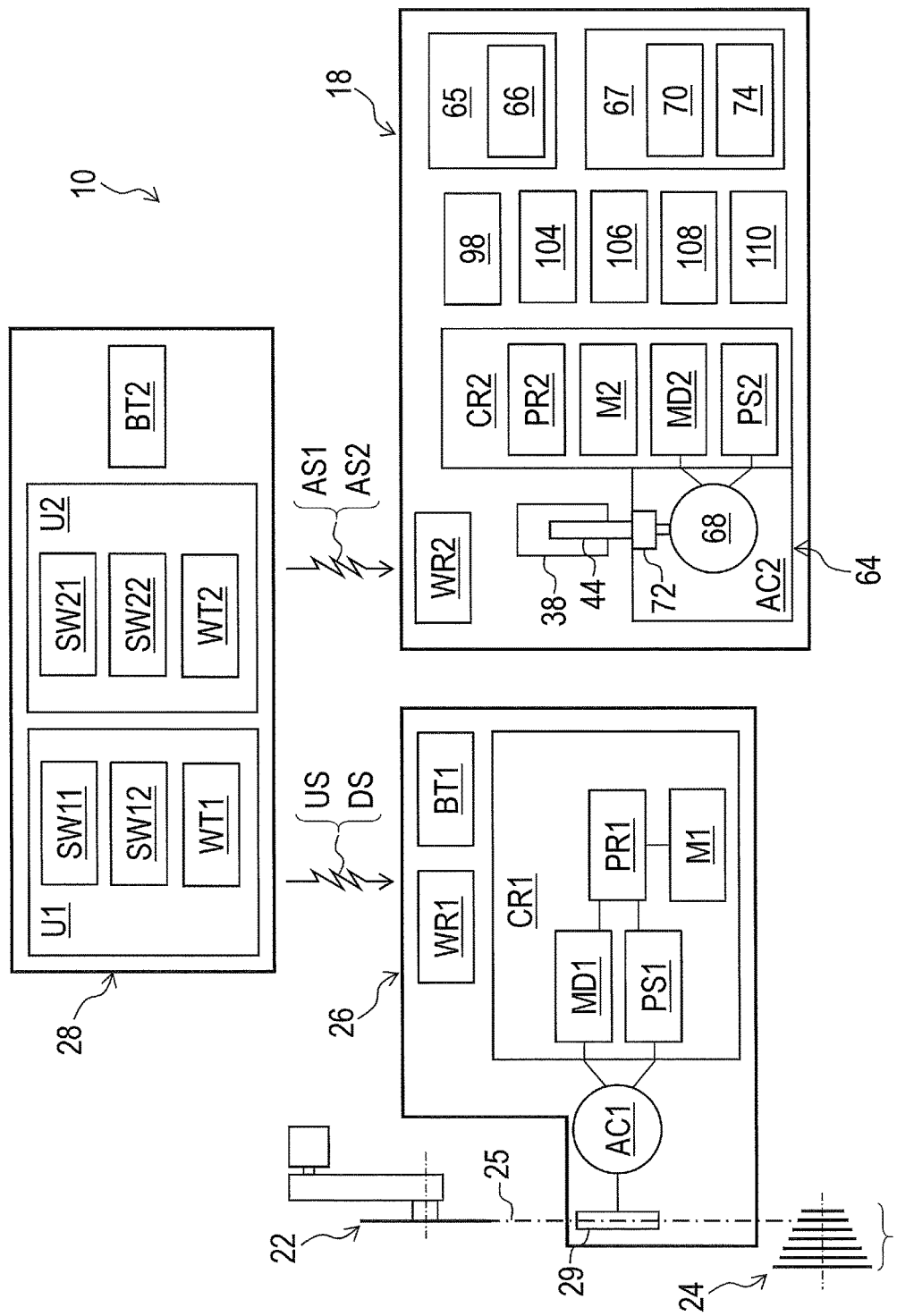
FIG. 3 is a block diagram of the bicycle illustrated in FIG. 1.

As seen in FIG. 3, the bicycle 10 comprises an operating device 28 to wirelessly transmit a wireless signal based on an input operation. The user can operate the electrical seatpost assembly 18 and the rear derailleur 26 via the operating device 28. As seen in FIG. 1, the operating device 28 is mounted to the handlebar 16. The operating device 28 can be mounted to other parts of the bicycle 10.

As seen in FIG. 3, the rear derailleur 26 includes a chain guide 29, an electrical shifting actuator AC1, a shifting controller CR1, and a battery unit BT1. The electrical shifting actuator AC1 moves the chain guide 29 to shift the chain 25 between the rear sprockets SP1 to SP7 of the rear sprocket assembly 24. The shifting controller CR1 controls the electrical shifting actuator AC1 to move the chain guide 29. Examples of the electrical shifting actuator AC1 include a direct current (DC) motor, an alternating current (AC) motor, and a stepper motor. The battery unit BT1 is electrically connected to the electrical shifting actuator AC1 and the shifting controller CR1 to supply electrical power to the electrical shifting actuator AC1 and the shifting controller CR1. Examples of the battery unit BT1 include a rechargeable battery and a dry-cell battery.

The shifting controller CR1 includes a processor PR1 and a memory M1. The processor PR1 is electrically connected to the memory M1. The processor PR1 includes a central processing unit (CPU). The memory M1 stores programs and other information. The memory M1 includes a read only memory (ROM), a random access memory (RAM), and a memory controller. For example, a program stored in the memory M1 is read into the processor PR1, and thereby several functions of the shifting controller CR1 are performed.

The shifting controller CR1 includes a motor driver MD1 and a position sensor PS1. The motor driver MD1 is electrically connected to each of the processor PR1 and the electrical shifting actuator AC1. The position sensor PS1 is electrically connected to the processor PR1. The position sensor PS1 senses a current position of the chain guide 29 relative to the rear sprocket assembly 24 via the electrical shifting actuator AC1 to determine a current gear position of the rear derailleur 26. Examples of the position sensor PS1 include a contact rotational position sensor such as a potentiometer, and a non-contact rotational position sensor such as an optical sensor (e.g., a rotary encoder) and a magnetic sensor (e.g., a hall sensor). The current position of the electrical shifting actuator AC1 is stored in the memory M1. The processor PR1 generates a control signal based on the current position of the electrical shifting actuator AC1 and the wireless signal transmitted from the operating device 28.

The operating device 28 includes a shift operating unit U1. The shift operating unit U1 includes an upshift operating switch SW11, a downshift operating switch SW12, and a wireless transmitter WT1. The upshift operating switch SW11 receives an upshifting input operation as the input operation from the user. The downshift operating switch SW12 receives a downshifting input operation as the input operation from the user.

The wireless transmitter WT1 wirelessly transmits an upshifting signal US and a downshifting signal DS as the wireless signal to the rear derailleur 26 based on the upshifting input operation and the downshifting input operation, respectively. For example, the wireless transmitter WT1 is composed of an ANT module configured to transmit wireless signals to the shifting controller CR1 of the rear derailleur 26 using a predetermined ANT protocol. The wireless transmitter WT1 can include other type of wireless module.

The operating device 28 includes a seatpost operating unit U2. The seatpost operating unit U2 includes a first adjustment operating switch SW21, a second adjustment operating switch SW22, and a wireless transmitter WT2. The first adjustment operating switch SW21 receives a first input adjustment operation as the input operation from the user. The second adjustment operating switch SW22 receives a second input adjustment operation as the input operation from the user.

The wireless transmitter WT2 wirelessly transmits a first adjustment signal AS1 and a second adjustment signal AS2 as the wireless signal to the electrical seatpost assembly 18 based on the first input adjustment operation and the second input adjustment operation, respectively. The first adjustment signal AS1 corresponds to a first adjustable state of the electrical seatpost assembly 18. The second adjustment signal AS2 corresponds to a second adjustable state of the electrical seatpost assembly 18. The first and second adjustable states will be described in detail later. For example, the wireless transmitter WT1 is composed of an ANT module configured to transmit wireless signals to an actuating device 64 of the electrical seatpost assembly 18 using a predetermined ANT protocol. The wireless transmitter WT2 can include other type of wireless module.

While the seatpost operating unit U2 includes the first adjustment operating switch SW21 and the second adjustment operating switch SW22 in this embodiment, the seatpost operating unit U2 can include only one adjustment operating switch. In such an embodiment, the adjustable state can include one of the first adjustable state, the second adjustable state, and another adjustable state. Even if the adjustable state includes two or more adjustable states, it is possible to change the state of the electrical seatpost assembly 18 between the two or more adjustable states using one adjustment operating switch. For example, the two or more adjustable states can be switched by changing how to operate the one adjustment operating switch (e.g., pressing lightly the one adjustment operating switch halfway down, pressing the one adjustment operating switch all the way down, long pressing of the one adjustment operating switch, and short pressing of the one adjustment operating switch).

The operating device 28 includes a battery unit BT2 to supply electrical power to the wireless transmitters WT1 and WT2. The battery unit BT2 is electrically connected to the wireless transmitter WT1 and WT2. Examples of the battery unit BT2 include a rechargeable battery, a dry-cell battery, and a button battery.

While the shift operating unit U1 and the seatpost operating unit U2 share the battery unit BT2 in this embodiment, the operating device 28 can include respective battery units for the shift operating unit U1 and the seatpost operating unit U2.

At least one of the rear derailleur 26 and the electrical seatpost assembly 18 includes at least one wireless receiver WR1 and WR2 to wirelessly receive a wireless signal. At least one of the electrical shifting actuator AC1 and the electrical actuator AC2 is operated based on the at least one wireless signal received by the at least one wireless receiver WR1 and/or WR2. In this embodiment, the electrical shifting actuator AC1 and the electrical actuator AC2 are operated based on the wireless signal received by the at least one wireless receiver WR1 and/or WR2. The at least one wireless receiver WR1 and/or WR2 is electrically connected to the electrical shifting actuator AC1 and the electrical actuator AC2.

The at least one wireless receiver WR1 and/or WR2 includes a first wireless receiver WR1 and a second wireless receiver WR2. The first wireless receiver WR1 is electrically connected to the electrical shifting actuator AC1. The second wireless receiver WR2 is electrically connected to the electrical actuator AC2.

The first wireless receiver WR1 wirelessly receives the wireless signal from the wireless transmitter WT1 of the operating device 28. The second wireless receiver WR2 wirelessly receives the wireless signal from the wireless transmitter WT2 of the operating device 28. The first wireless receiver WR1 can also be referred to as the wireless receiver WR1. The second wireless receiver WR2 can also be referred to as the wireless receiver WR2. The rear derailleur 26 includes the wireless receiver WR1. The electrical seatpost assembly 18 includes the wireless receiver WR2. However, at least one of the first and second wireless receivers WR1 and WR2 can be omitted from the bicycle 10. While the wireless receiver WR1 is provided in the rear derailleur 26 as a part of the rear derailleur 26 in this embodiment, the wireless receiver WR1 can be a separate unit from the rear derailleur 26. While the wireless receiver WR2 is provided in the electrical seatpost assembly 18 as a part of the electrical seatpost assembly 18 in this embodiment, the wireless receiver WR2 can be a separate unit from the electrical seatpost assembly 18.

The wireless receiver WR1 wirelessly receives the wireless signal (e.g., the upshifting signal US and the downshifting signal DS) as the command signal from the wireless transmitter WT1 of the operating device 28. For example, the wireless receiver WR1 is composed of an ANT module configured to receive the wireless signals from the wireless transmitter WT1 of the operating device 28 using the predetermined ANT protocol. The wireless receiver WR1 can include other type of wireless module.

The wireless receiver WR1 is electrically connected to the processor PR1 of the shifting controller CR1. The processor PR1 generates the control signal based on the wireless signal received by the wireless receiver WR1 and the current position sensed by the position sensor PS1. The processor PR1 generates an upshift control signal based on the upshifting signal US received by the wireless receiver WR1. The processor PR1 generates a downshift control signal based on the downshifting signal DS received by the wireless receiver WR1. The motor driver MD1 controls the electrical shifting actuator AC1 based on the control signal generated by the processor PR1. The motor driver MD1 controls the electrical shifting actuator AC1 for upshifting based on the upshifting control signal generated by the processor PR1. The motor driver MD1 controls the electrical shifting actuator AC1 for downshifting based on the downshifting control signal generated by the processor PR1. Thus, the user can wirelessly operate the rear derailleur 26 using the upshift and downshift operating switches SW11 and SW12 of the operating device 28.

The wireless receiver WR2 wirelessly receives the wireless signal (e.g., a first adjustment signal AS1 and a second adjustment signal AS2) as the command signal from the wireless transmitter WT1 of the operating device 28. For example, the wireless receiver WR2 is composed of an ANT module configured to receive the wireless signals from the wireless transmitter WT2 of the actuating device 64 using the predetermined ANT protocol. The wireless receiver WR2 can include other type of wireless module. The wireless receiver WR2 will be described in detail later.

Figure 4:
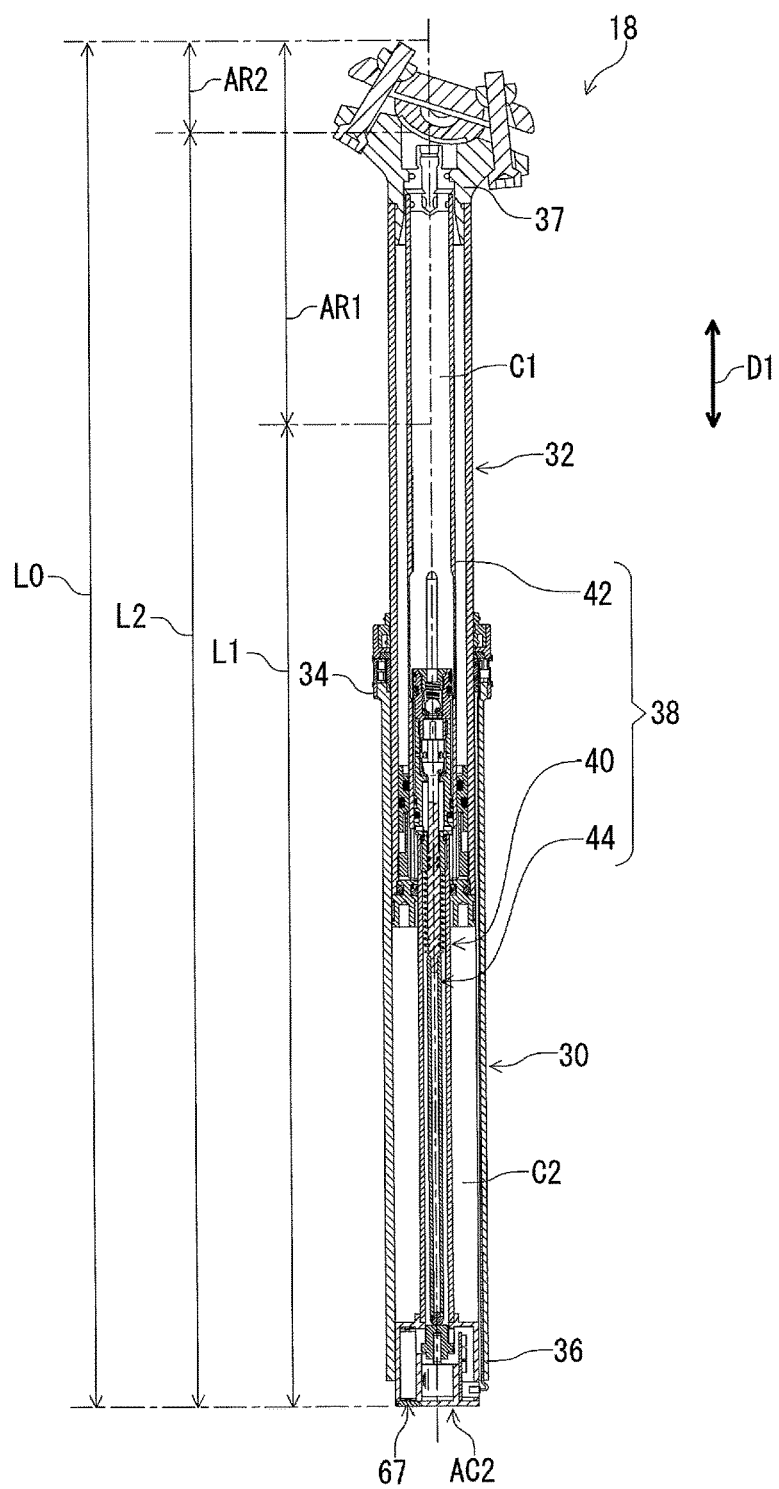
FIG. 4 is a cross-sectional view of an electrical seatpost assembly in accordance with the first embodiment.

As seen in FIG. 4, the electrical seatpost assembly 18 in accordance with the first embodiment comprises a first cylinder 30 and a second cylinder 32. The second cylinder 32 is telescopically received in the first cylinder 30. The first cylinder 30 and the second cylinder 32 are movable relative to each other in a telescopic direction D1. The first cylinder 30 includes a first end 34 and a second end 36 opposite to the first end 34 in the telescopic direction D1. The second cylinder 32 is telescopically received in the first cylinder 30 from the first end 34.

The first cylinder 30 is detachably attached to a seat tube 12a (FIG. 1) of the bicycle frame 12. A mounting portion 37 is secured to an end of the second cylinder 32. The saddle 20 (FIG. 1) is mounted to the mounting portion 37.

As seen in FIG. 4, the electrical seatpost assembly 18 has a maximum overall length L0 and a minimum overall length L1. The overall length of the electrical seatpost assembly 18 is adjustable within a first adjustable range AR1 defined as a difference between the maximum overall length L0 and the minimum overall length L1. The electrical seatpost assembly 18 has an intermediate overall length L2. The intermediate overall length L2 is defined between the maximum overall length L0 and the minimum overall length L1.

In this embodiment, the electrical seatpost assembly 18 has a locked state, the first adjustable state, and the second adjustable state. In the locked state, the overall length of the electrical seatpost assembly 18 is maintained at an adjusted overall length. In the locked state, the first cylinder 30 and the second cylinder 32 are fixedly positioned relative to each other in the telescopic direction D1.

In the first adjustable state, the overall length of the electrical seatpost assembly 18 is continuously adjustable within the first adjustable range AR1 by operating the first adjustment operating switch SW21. Namely, in the first adjustable state, the positional relationship between the first cylinder 30 and the second cylinder 32 is continuously adjustable within the first adjustable range AR1.

In the second adjustable state, the overall length of the electrical seatpost assembly 18 is adjustable to the intermediate overall length L2 by operating the second adjustment operating switch SW22. More specifically, in the second adjustable state, the second cylinder 32 stops relative to the first cylinder 30 at a position corresponding to the intermediate overall length L2 when the second cylinder 32 downwardly moves relative to the first cylinder 30 from a position corresponding to the maximum overall length L0.

Furthermore, in the second adjustable state, the overall length of the electrical seatpost assembly 18 is continuously adjustable within a second adjustable range AR2 by operating the second adjustment operating switch SW22. Namely, in the second adjustable state, the positional relationship between the first cylinder 30 and the second cylinder 32 is continuously adjustable within the second adjustable range AR2. The second adjustable range AR2 is defined as a difference between the maximum overall length L0 and the intermediate overall length L2.

The first adjustable range AR1 and the second adjustable range AR2 are different from each other. More specifically, the second adjustable range AR2 at least partly overlaps with the first adjustable range AR1. In this embodiment, the second adjustable range AR2 entirely overlaps with the first adjustable range AR1 and is included in the first adjustable range AR1.

The second adjustable range AR2 has a total length different from a total length of the first adjustable range AR1. In this embodiment, the total length of the second adjustable range AR2 is shorter than the total length of the first adjustable range AR1.

The adjustable state of the electrical seatpost assembly 18 is not limited to this embodiment. The total length of the electrical seatpost assembly 18 can be stepwise adjusted in the adjustable state. For example, the total length of the electrical seatpost assembly 18 can be stepwise adjusted at each of different lengths.

As seen in FIG. 4, the electrical seatpost assembly 18 comprises a positioning structure 38 to adjustably position the second cylinder 32 relative to the first cylinder 30 in the telescopic direction D1. The positioning structure 38 includes a support member 40, an inner tube 42, and a movable member 44. A lower end of the support member 40 is secured to the first cylinder 30. The support member 40 is movable integrally with the first cylinder 30 relative to the second cylinder 32 in the telescopic direction D1. An upper end of the inner tube 42 is secured to the second cylinder 32. The inner tube 42 is movable integrally with the second cylinder 32 relative to the first cylinder 30 in the telescopic direction D1. The support member 40 is movably provided in the inner tube 42. The movable member 44 is movably provided in the support member 40.

Figure 5:
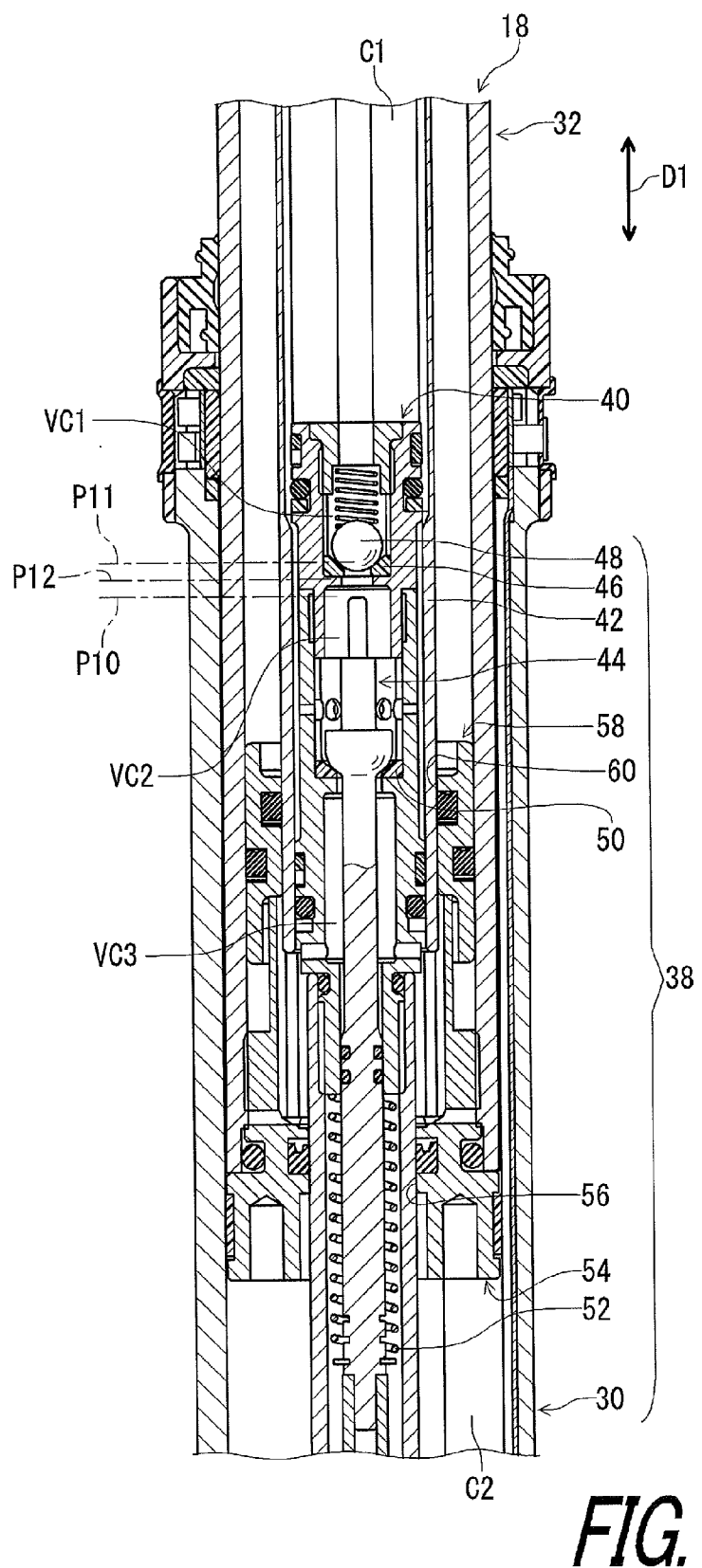
FIG. 5 is a partial cross-sectional view of the electrical seatpost assembly illustrated in FIG. 4 (a closed position).

As seen in FIG. 5, the support member 40 includes a first valve chamber VC1, a second valve chamber VC2, and a third valve chamber VC3. The second valve chamber VC2 is provided between the first valve chamber VC1 and the third valve chamber VC3 in the telescopic direction D1. The valve member 48 is provided in the first valve chamber VC1. The movable member 44 is movably provided in the second valve chamber VC2 and the third valve chamber VC3.

The positioning structure 38 includes a first seal member 46, a valve member 48, and a second seal member 50. The positioning structure 38 has a closed state (FIG. 6), a first open state (FIG. 7), and a second open state (FIG. 8). The closed state corresponds to the locked state of the electrical seatpost assembly 18. The first open state corresponds to the first adjustable state of the electrical seatpost assembly 18. The second open state corresponds to the second adjustable state of the electrical seatpost assembly 18.

The movable member 44 is movable relative to the support member 40 and the first cylinder 30 in the telescopic direction D1 between a closed position P10 and a second open position P12 through a first open position P11. In the closed state (FIG. 6) of the positioning structure 38, the movable member 44 is positioned at the closed position P10. In the first open state (FIG. 7) of the positioning structure 38, the movable member 44 is positioned at the first open position P11. In the second open state (FIG. 8) of the positioning structure 38, the movable member 44 is positioned at the second open position P12. The second open position P12 is provided between the closed position P10 and the first open position P11 in the telescopic direction D1.

The positioning structure 38 includes a biasing element 52 to bias the movable member 44 relative to the support member 40 toward the closed position P10. The movable member 44 is positioned at the closed position P10 by a biasing force of the biasing element 52. The movable member 44 is moved from the closed position P10 toward the first open position P11 relative to the support member 40 against a biasing force of the biasing element 52. The position of the movable member 44 is continuously adjustable relative to the support member 40 between the closed position P10 and the first open position P11 using the operating device 28 (FIG. 3).

As seen in FIG. 5, the positioning structure 38 includes a sealing structure 54 having an annular shape. The sealing structure 54 is secured to a lower end of the second cylinder 32. A lower end of the inner tube 42 is secured to the sealing structure 54. The sealing structure 54 includes a guide hole 56 extending in the telescopic direction D1. The support member 40 extends through the guide hole 56 of the sealing structure 54 in the telescopic direction D1.

The positioning structure 38 includes a piston 58 having an annular shape. The piston 58 includes a guide hole 60 extending in the telescopic direction D1. The inner tube 42 extends through the guide hole 60 of the piston 58 in the telescopic direction D1. The piston 58 is movable relative to the second cylinder 32 and the inner tube 42 in the telescopic direction D1.

As seen in FIG. 4, the positioning structure 38 includes a first chamber C1 and a second chamber C2. The first chamber C1 is defined by the support member 40, the inner tube 42, and the mounting portion 37. The second chamber C2 is defined by the first cylinder 30, the support member 40, and the sealing structure 54. The first chamber C1 is filled with a substantially incompressible fluid (e.g., oil), for example. The second chamber C2 is in communication with an outside of the electrical seatpost assembly 18, for example.

Figure 6:
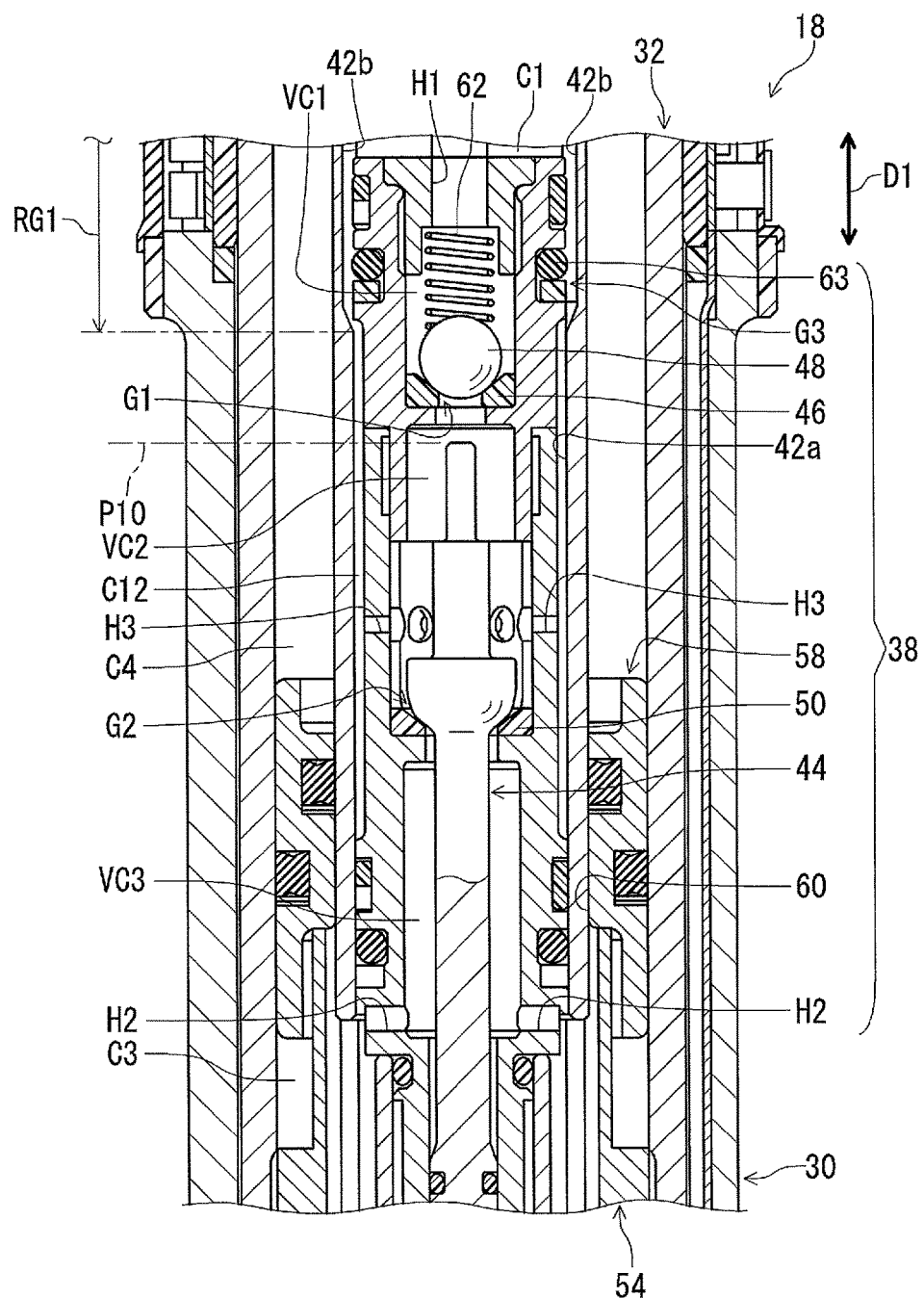
FIG. 6 is an enlarged partial cross-sectional view of the electrical seatpost assembly illustrated in FIG. 4 (the closed position).

As seen in FIG. 6, a third chamber C3 is defined by the second cylinder 32, the inner tube 42, the sealing structure 54, and the piston 58. An intermediate chamber C12 is defined by the support member 40 and the inner tube 42. Each of the third chamber C3 and the intermediate chamber C12 is filled with the substantially incompressible fluid (e.g., oil), for example.

A biasing chamber C4 is defined by the second cylinder 32, the inner tube 42, the piston 58, and the mounting portion 37 (FIG. 4). A compressible fluid (e.g., air or gas other than air) is filled in the biasing chamber C4. The biasing chamber C4 is configured to apply a biasing force to the piston 58 so that the second cylinder 32 upwardly moves relative to the first cylinder 30 in the telescopic direction D1. The compressible fluid is compressed in the biasing chamber C4 in a state where the overall length of the electrical seatpost assembly 18 is the maximum overall length L0 (FIG. 4).

As seen in FIG. 6, the positioning structure 38 includes a valve biasing member 62 to bias the valve member 48 against the first seal member 46. The movable member 44 moves the valve member 48 relative to the first seal member 46 against a biasing force of the valve biasing member 62 to open a first gate G1. The valve member 48 is provided between the first seal member 46 and the valve biasing member 62 in the telescopic direction D1. The valve member 48 is provided between the movable member 44 and the valve biasing member 62 in the telescopic direction D1. The valve biasing member 62 is provided in the first valve chamber VC1.

Figure 7:
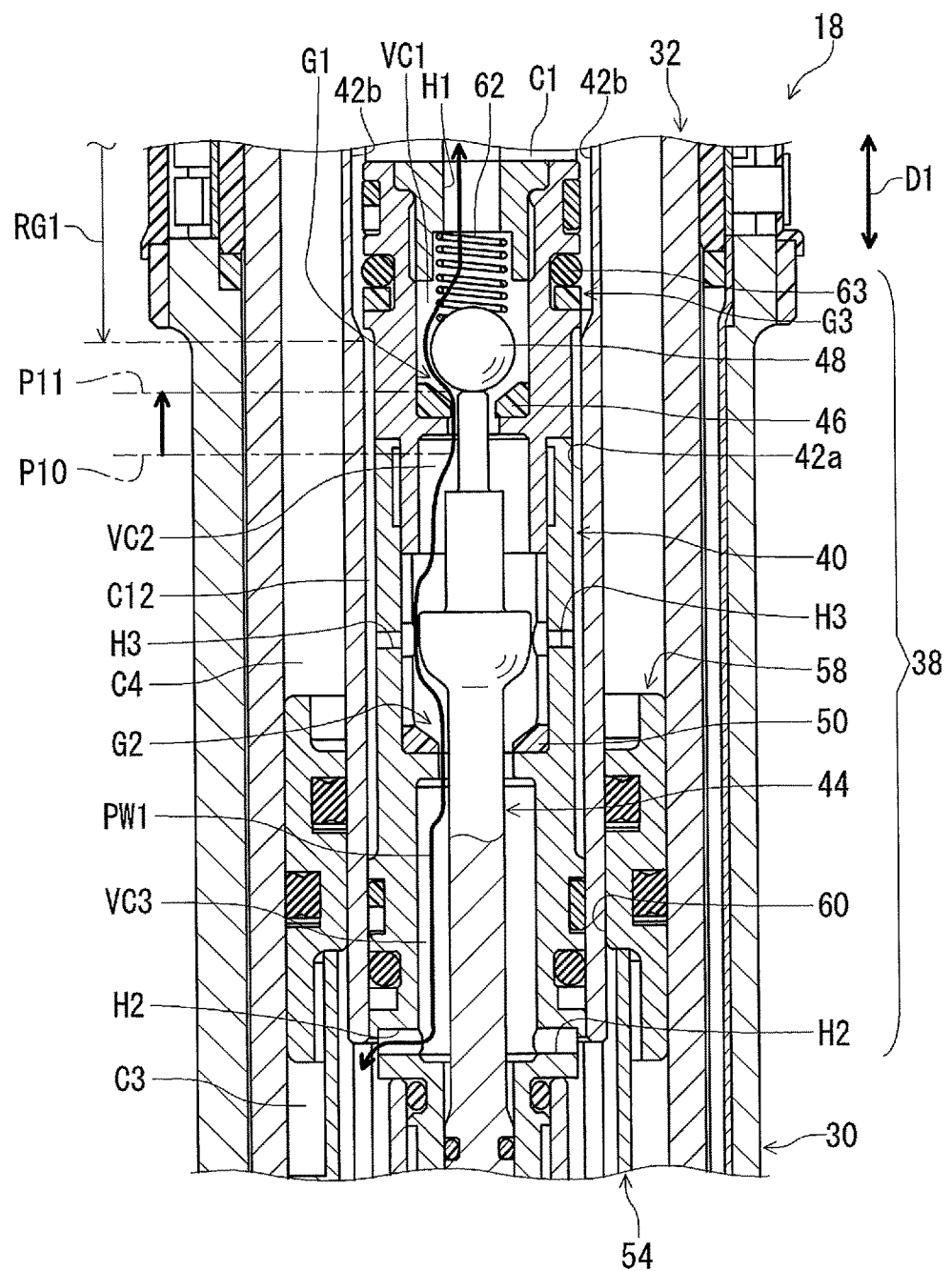
FIG. 7 is an enlarged partial cross-sectional view of the electrical seatpost assembly illustrated in FIG. 4 (a first open position).
Figure 8:
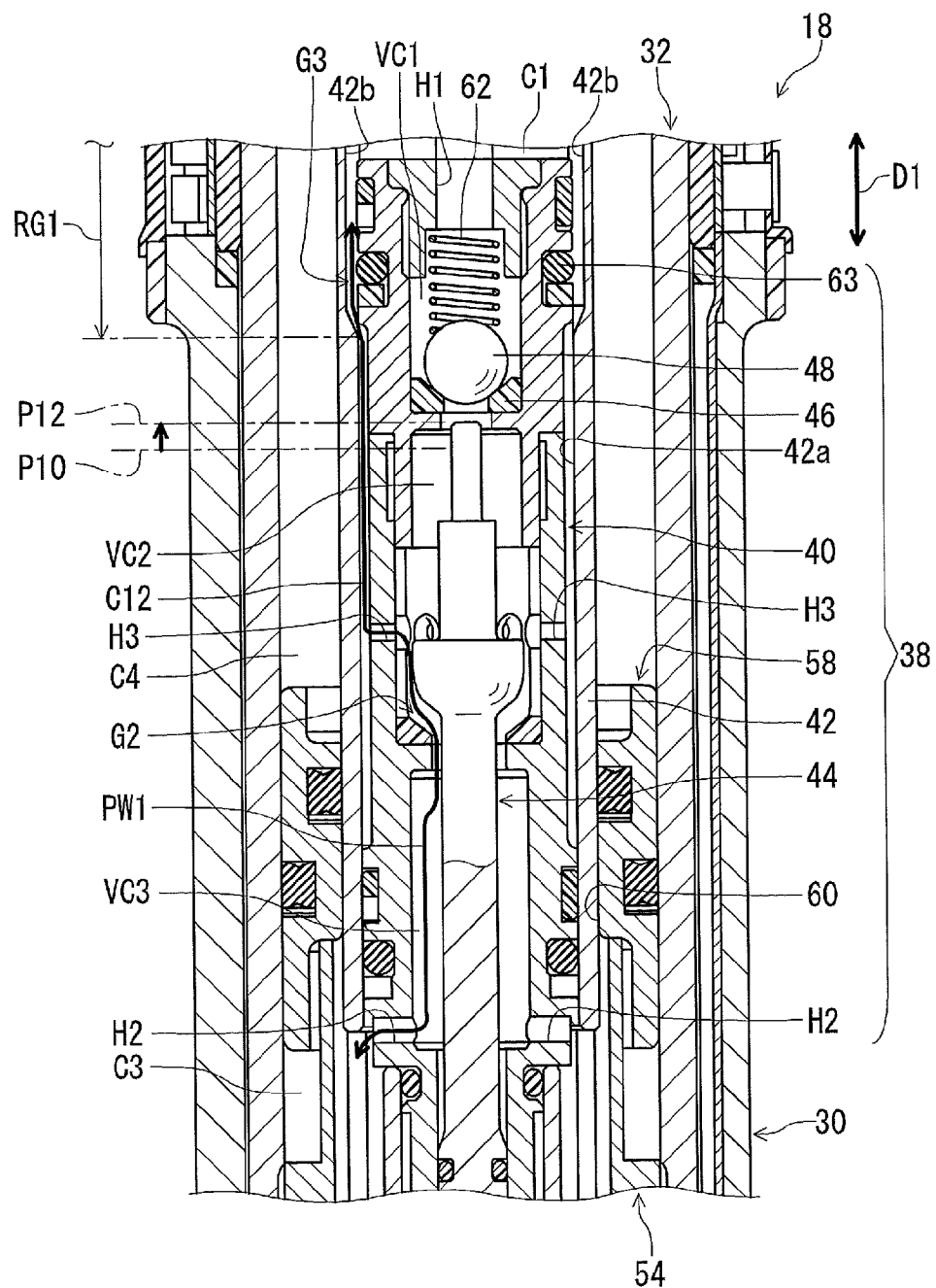
FIG. 8 is an enlarged partial cross-sectional view of the electrical seatpost assembly illustrated in FIG. 4 (a second open position).

As seen in FIGS. 6 and 7, the valve member 48 provides the first gate G1 of a first passageway PW1 together with the first seal member 46. The valve member 48 is contactable with the first seal member 46 to close the first gate G1. The movable member 44 moves the valve member 48 relative to the first seal member 46 to open the first gate G1. The first valve chamber VC1 is in communication with the second valve chamber VC2 via the first gate G1 in a state where the first gate G1 is open.

When the movable member 44 is positioned at the closed position P10, the valve member 48 is in contact with the first seal member 46 to close the first gate G1. When the movable member 44 is positioned at the first open position P11, the valve member 48 is spaced apart from the first seal member 46 to open the first gate G1.

As seen in FIG. 6, the second seal member 50 provides a second gate G2 of a second passageway PW2 together with the movable member 44. The second valve chamber VC2 is in communication with the third valve chamber VC3 via the second gate G2 in a state where the second gate G2 is open.

When the movable member 44 is positioned at the closed position P10, the movable member 44 is in contact with the second seal member 50 to close the second gate G2. When the movable member 44 is positioned at the second open position P12, the movable member 44 is spaced apart from the second seal member 50 to open the second gate G2.

As seen in FIG. 7, the first passageway PW1 connects the first chamber C1 to the third chamber C3. More specifically, the support member 40 includes a first through-hole H1, second through-holes H2, and third through-holes H3. The first through-hole H1 connects the first chamber C1 to the first valve chamber VC1. The second through-holes H2 connects the third valve chamber VC3 to the third chamber C3. The third through-holes H3 connects the third valve chamber VC3 to the intermediate chamber C12. The first passageway PW1 includes the first through-hole H1, the first to third valve chambers VC1 to VC3, and the second through-holes H2.

Figure 9:
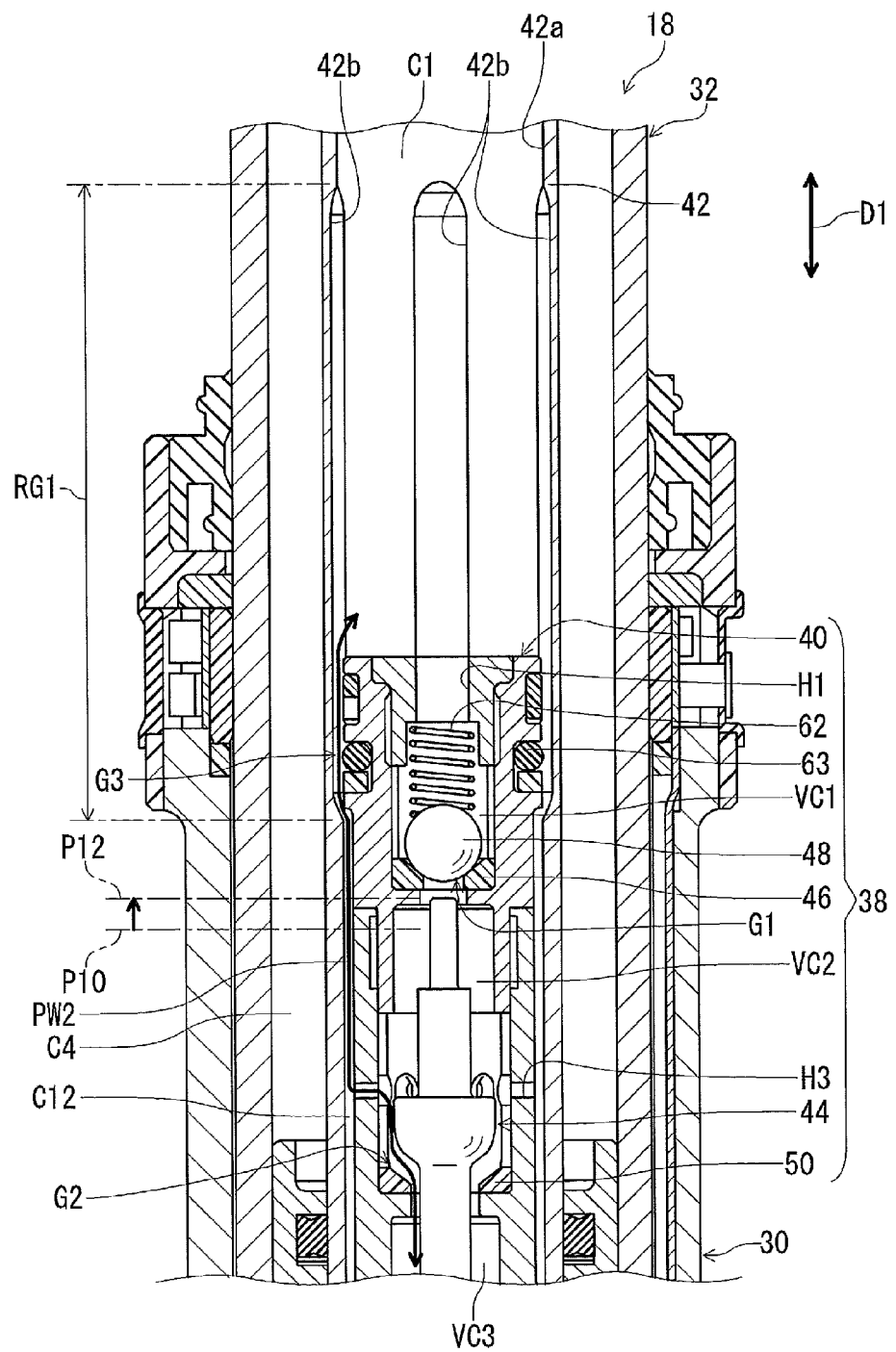
FIG. 9 is an enlarged partial cross-sectional view of the electrical seatpost assembly illustrated in FIG. 4 (the second open position).

As seen in FIG. 9, the inner tube 42 includes an inner peripheral surface 42a and recesses 42b recessed from the inner peripheral surface 42a. The positioning structure 38 includes a third seal member 63 provided on an outer periphery of the support member 40.

The recesses 42b extend in the telescopic direction D1 and are circumferentially spaced apart from each other. The third seal member 63 is contactable with the inner peripheral surface 42a of the inner tube 42. The third seal member 63 provides a third gate G3 of the second passageway PW2 between the third seal member 63 and the inner tube 42. The third gate G3 is open in a state where the third seal member 63 is disposed within a range RG1 where the recesses 42b are provided.

Figure 10:
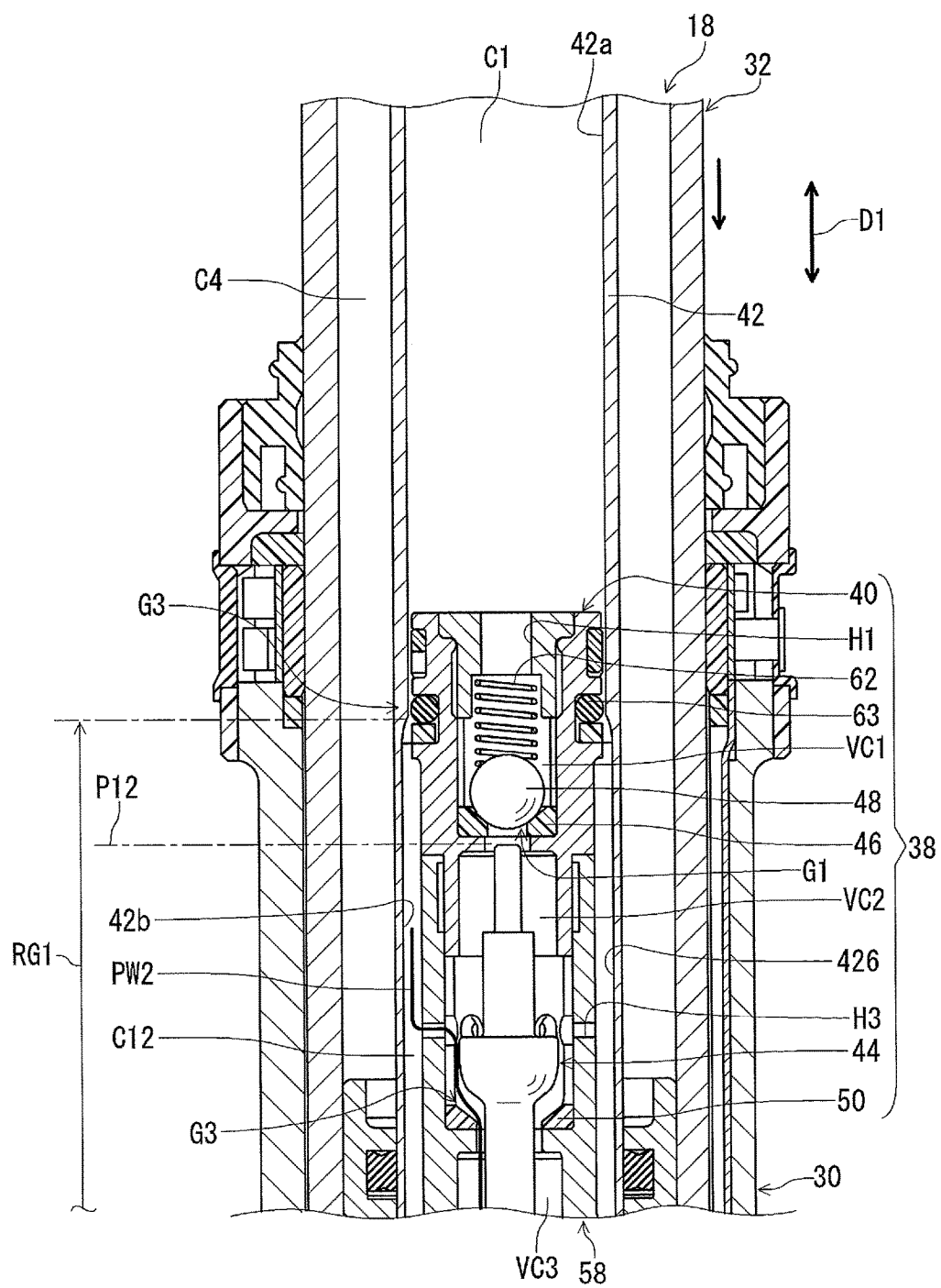
FIG. 10 is an enlarged partial cross-sectional view of the electrical seatpost assembly illustrated in FIG. 4 (the second open position).

As seen in FIG. 10, the third gate G3 is closed in a state where the third seal member 63 is disposed outside the range RG1. For example, the third seal member 63 is in contact with the inner peripheral surface 42a of the inner tube 42 along an inner whole periphery of the inner tube 42 in a state where the third seal member 63 is disposed on an upper side of the recesses 42b. In this state, the third gate G3 is closed so that the first chamber C1 is not in communication with the third chamber C3 via the second passageway PW2. In this state, the total length of the electrical seatpost assembly 18 is the intermediate overall length L2 (FIG. 3).

While the positioning structure 38 has a hydraulic structure in this embodiment, the positioning structure 38 can have other structures such as a mechanical structure and an electrical structure.

Figure 11:
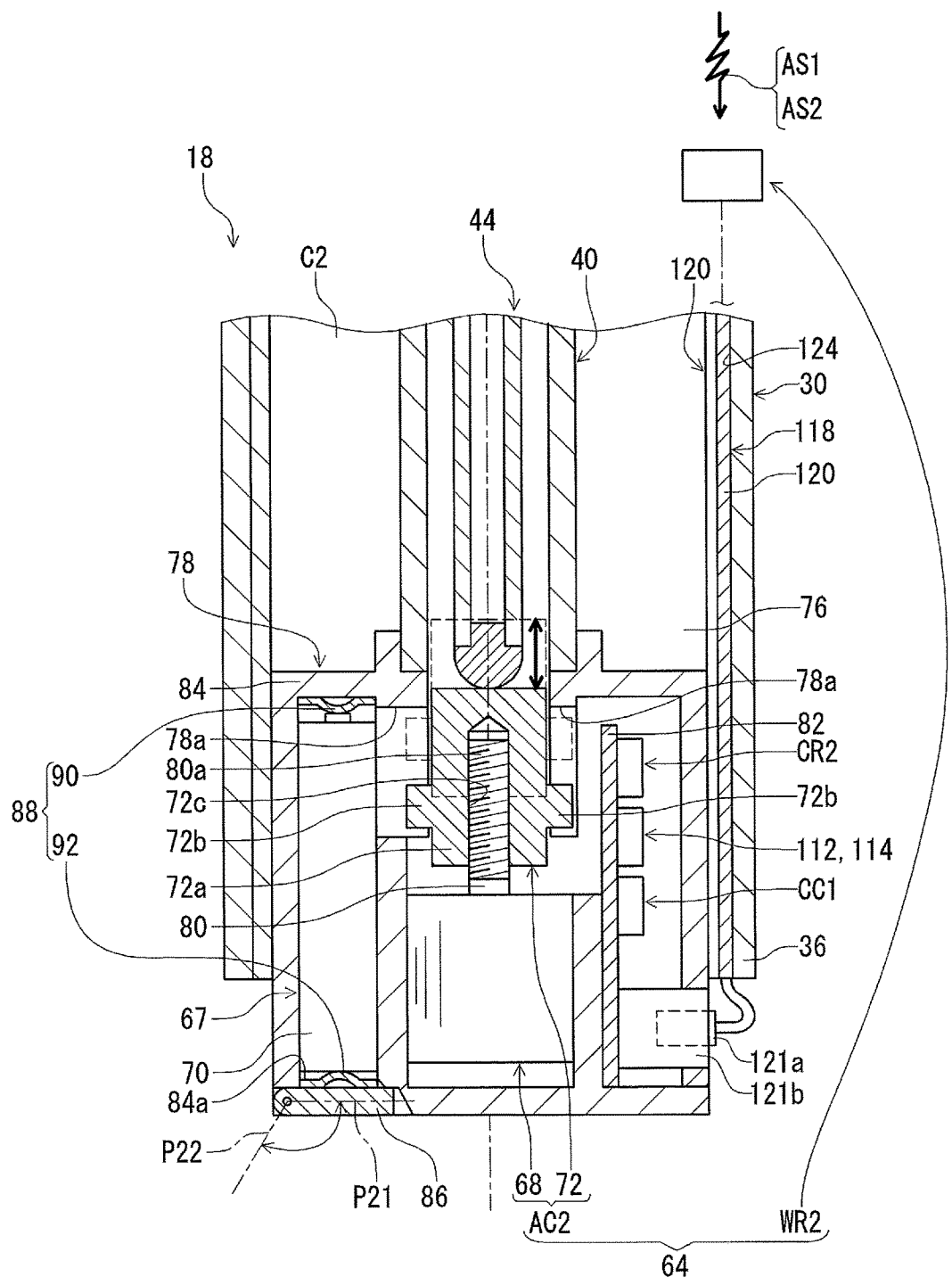
FIG. 11 is an enlarged partial cross-sectional view of the electrical seatpost assembly illustrated in FIG. 4.
Figure 12:
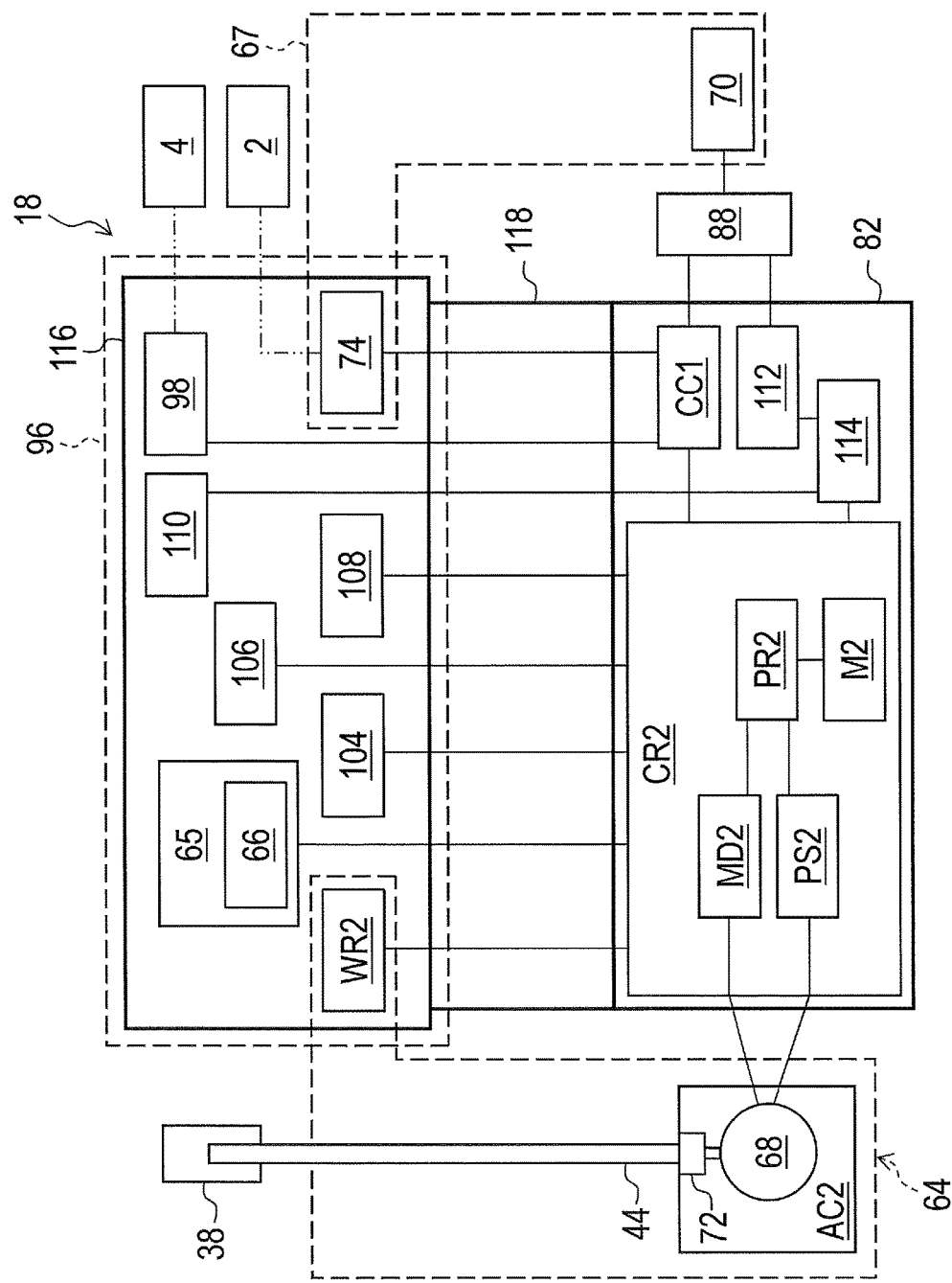
FIG. 12 is a block diagram of the electrical seatpost assembly illustrated in FIG. 4.

As seen in FIGS. 11 and 12, the electrical seatpost assembly 18 comprises the actuating device 64 to actuate the positioning structure 38. In this embodiment, the actuating device 64 moves the movable member 44 of the positioning structure 38 in the telescopic direction D1. The actuating device 64 is controlled based on the wireless signal transmitted from the operating device 28. In this embodiment, the actuating device 64 of the electrical seatpost assembly 18 includes the wireless receiver WR2 to wirelessly receive the wireless signal (e.g., the first adjustment signal AS1 and the second adjustment signal AS2).

The actuating device 64 has an accessible state where the actuating device 64 is controlled in accordance with an electrical signal, and an inaccessible state where the actuating device 64 is not controlled in accordance with an electrical signal. In this embodiment, the actuating device 64 is controlled in accordance with the wireless signal in the accessible state. The actuating device 64 is not controlled in accordance with the wireless signal in the inaccessible state.

The actuating device 64 includes an electrical actuator AC2 to actuate the positioning structure 38 (FIG. 5) in accordance with the wireless signal. In other words, the electrical seatpost assembly 18 comprises the electrical actuator AC2 to actuate the positioning structure 38 (FIG. 5) in accordance with the electrical signal. In this embodiment, the electrical actuator AC2 moves the movable member 44 in the telescopic direction D1 in accordance with the wireless signal transmitted from the seatpost operating unit U2 of the operating device 28 (FIG. 3).

The wireless receiver WR2 wirelessly receives the wireless signal in the accessible state of the actuating device 64. For example, the wireless receiver WR2 periodically or always listens to the wireless signal in the accessible state. The wireless receiver WR2 is unresponsive to the wireless signal in the inaccessible state of the actuating device 64. The inaccessible state of the actuating device 64 corresponds to a sleep mode of the wireless receiver WR2. A power consumption of the actuating device 64 in the inaccessible state is lower than a power consumption of the actuating device 64 in the accessible state.

As seen in FIG. 12, the actuating device 64 includes a seatpost controller CR2. The seatpost controller CR2 controls the electrical actuator AC2 to move the movable member 44. Examples of the electrical actuator AC2 include a DC motor, an AC motor, and a stepper motor.

The seatpost controller CR2 includes a processor PR2 and a memory M2. The processor PR2 is electrically connected to the memory M2. The processor PR2 includes a CPU. The memory M2 stores programs and other information. The memory M2 includes a ROM, a RAM, and a memory controller. For example, a program stored in the memory M2 is read into the processor PR2, and thereby several functions of the seatpost controller CR2 are performed.

The seatpost controller CR2 includes a motor driver MD2 and a position sensor PS2. The motor driver MD2 is electrically connected to each of the processor PR2 and the electrical actuator AC2. The position sensor PS2 is electrically connected to the processor PR2. The processor PR2 generates a control signal based on the wireless signal transmitted from the wireless transmitter WT2 of the operating device 28. The motor driver MD2 controls the electrical actuator AC2 based on the control signal. Specifically, the motor driver MD2 changes a rotational direction of the electrical actuator AC2 and stops rotation of the electrical actuator AC2.

The position sensor PS2 senses a current position of the movable member 44 relative to the first cylinder 30 via the electrical actuator AC2 to determine a current state of the positioning structure 38. Examples of the position sensor PS2 include a contact rotational position sensor such as a potentiometer, and a non-contact rotational position sensor such as an optical sensor (e.g., a rotary encoder) and a magnetic sensor (e.g., a hall sensor). The current position of the electrical actuator AC2 is stored in the memory M2. The processor PR2 generates the control signal based on the control command and the current position of the electrical actuator AC2.

The wireless receiver WR2 is electrically connected to the processor PR2. The processor PR2 generates the control signal based on the wireless signal received by the wireless receiver WR2 and the current position sensed by the position sensor PS2. The processor PR2 generates a first adjustment control signal based on the first adjustment signal AS1 (FIG. 3) received by the wireless receiver WR2 and the current position sensed by the position sensor PS2. The processor PR2 generates a second adjustment control signal based on the second adjustment signal AS2 (FIG. 3) received by the wireless receiver WR2 and the current position sensed by the position sensor PS2.

The first adjustment control signal and the first adjustment signal AS1 correspond to each of the first open state of the positioning structure 38 and the first adjustable state of the electrical seatpost assembly 18. The second adjustment control signal and the second adjustment signal AS2 correspond to each of the second open state of the positioning structure 38 and the second adjustable state of the electrical seatpost assembly 18.

The motor driver MD2 controls the electrical actuator AC2 based on the control signal generated by the processor PR2. The motor driver MD2 controls the electrical actuator AC2 to move the movable member 44 from the closed position P10 to the first open position P11 based on the first adjustment control signal generated by the processor PR2. The motor driver MD2 controls the electrical actuator AC2 to move the movable member 44 from the closed position P10 to the second open position P12 based on the second adjustment control signal generated by the processor PR2. Thus, the user can wirelessly operate the electrical seatpost assembly 18 using the first and second adjustment operating switches SW21 and SW22 of the operating device 28.

In this embodiment, as seen in FIG. 3, the wireless transmitter WT2 keeps transmitting the first adjustment signal AS1 while the first adjustment operating switch SW21 is operated by the user. The wireless transmitter WT2 keeps transmitting the second adjustment signal AS2 while the second adjustment operating switch SW22 is operated by the user. However, the wireless transmitter WT2 can transmit the first adjustment signal AS1 every time the first adjustment operating switch SW21 is operated by the user. The wireless transmitter WT2 can transmit the second adjustment signal AS2 every time the second adjustment operating switch SW22 is operated by the user.

The processor PR2 generates the first adjustment control signal based on the first adjustment signal AS1 received by the wireless receiver WR2. The processor PR2 generates the second adjustment control signal based on the second adjustment signal AS2 received by the wireless receiver WR2. Specifically, the processor PR2 keeps generating the first adjustment control signal while the wireless receiver WR2 receives the first adjustment signal AS1 (e.g., based on a time period during which the wireless receiver WR2 receives the first adjustment signal AS1). The processor PR2 keeps generating the second adjustment control signal while the wireless receiver WR2 receives the second adjustment signal AS2 (e.g., based on a time period during which the wireless receiver WR2 receives the second adjustment signal AS2). However, the processor PR2 can generate the first adjustment control signal every time the wireless receiver WR2 receives the first adjustment signal AS1. The processor PR2 can generate the second adjustment control signal every time the wireless receiver WR2 receives the second adjustment signal AS2. Furthermore, the processor PR2 can keep generating the first adjustment control signal for a predetermined time period every time the wireless receiver WR2 receives the first adjustment signal AS1. The processor PR2 can keep generating the second adjustment control signal for a predetermined time period every time the wireless receiver WR2 receives the second adjustment signal AS2.

As seen in FIG. 12, the motor driver MD2 controls the electrical actuator AC2 to position the movable member 44 at the closed position P10 (FIG. 5) while the motor driver MD2 receives neither the first adjustment control signal nor the second adjustment signal. The motor driver MD2 controls the electrical actuator AC2 to position the movable member 44 at the first open position P11 (FIG. 5) while the motor driver MD2 receives the first adjustment control signals periodically generated by the processor PR2. The motor driver MD2 controls the electrical actuator AC2 to position the movable member 44 at the second open position P12 (FIG. 5) while the motor driver MD2 receives the second adjustment control signals periodically generated by the processor PR2.

Namely, the movable member 44 is positioned at the closed position P10 (FIG. 5) while neither the first adjustment operating switch SW21 nor the second adjustment operating switch SW22 is operated by the user. The movable member 44 is positioned at the first open position P11 (FIG. 5) while the first adjustment operating switch SW21 is operated by the user. The movable member 44 is positioned at the second open position P12 (FIG. 5) while the second adjustment operating switch SW22 is operated by the user. However, the movable member 44 can be positioned at the first open position P11 for a predetermined time period every time the first adjustment operating switch SW21 is operated by the user. The movable member 44 can be positioned at the second open position P12 for a predetermined time period every time the second adjustment operating switch SW22 is operated by the user.

As seen in FIG. 12, the electrical seatpost assembly 18 comprises a changing device 65 to change a state of the actuating device 64 between the accessible state and the inaccessible state. In this embodiment, the changing device 65 includes a manual switch 66. The manual switch 66 is provided on the outer peripheral surface of one of the first cylinder 30 and the second cylinder 32. In this embodiment, the changing device 65 changes a state of the wireless receiver WR2 between the accessible state and the inaccessible state.

The changing device 65 changes the state of the actuating device 64 from the accessible state to the inaccessible state when the wireless receiver WR2 does not receive a wireless signal for a waiting time in the accessible state. In this embodiment, the changing device 65 is electrically connected to the wireless receiver WR2 to receive the wireless signal from the wireless receiver WR2. The changing device 65 changes the state of the actuating device 64 (the state of the wireless receiver WR2) from the accessible state to the inaccessible state when the changing device 65 does not receive the wireless signal for the waiting time in the accessible state. The changing device 65 changes the state of the actuating device 64 (the state of the wireless receiver WR2) from the inaccessible state to the accessible state when the manual switch 66 is operated by the user.

Figure 13:
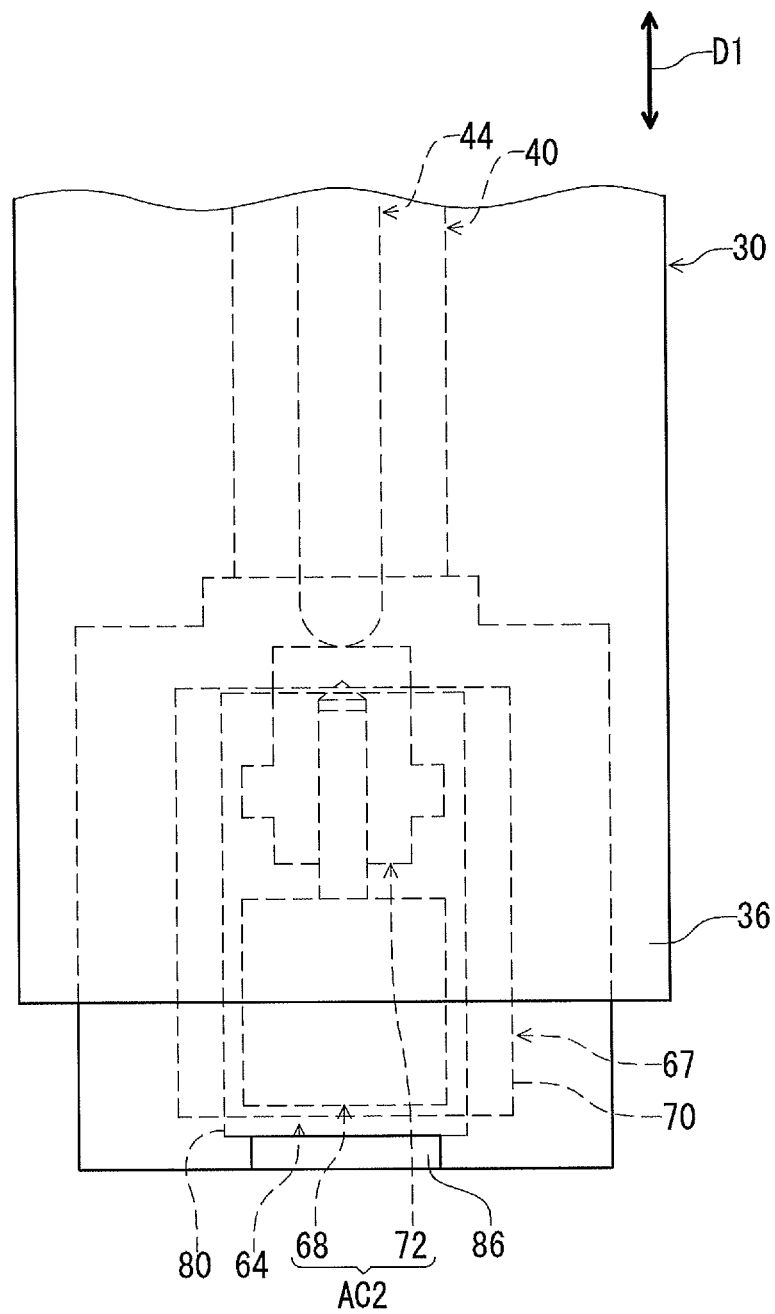
FIG. 13 is a partial rear view of the electrical seatpost assembly illustrated in FIG. 4.

As seen in FIGS. 11 and 12, the electrical seatpost assembly 18 comprises a power supply 67 to supply electrical power to the electrical actuator AC2. As seen in FIG. 13, the power supply 67 and the electrical actuator AC2 are disposed in one of the first cylinder 30 and the second cylinder 32 to at least partly overlap with each other when viewed from a direction perpendicular to the telescopic direction D1. In this embodiment, the power supply 67 and the electrical actuator AC2 are disposed in the first cylinder 30 to partly overlap with each other when viewed from the direction perpendicular to the telescopic direction D1. However, the power supply 67 and the electrical actuator AC2 can be disposed in the second cylinder 32 to at least partly overlap with each other when viewed from the direction perpendicular to the telescopic direction D1.

As seen in FIGS. 11 and 12, the electrical actuator AC2 includes a motor 68. The power supply 67 includes a battery 70. In other words, the electrical seatpost assembly 18 further comprises the battery 70 to supply the electrical power to the electrical actuator AC2. The battery 70 includes a rechargeable battery. However, the battery 70 can include other batteries such as a dry-cell battery. The motor 68 is provided at the second end 36 of the first cylinder 30. The power supply 67 is provided at the second end 36 of the first cylinder 30. The motor 68 is electrically connected to the battery 70.

While the electrical actuator AC2 includes the motor 68 in this embodiment, the electrical actuator AC2 can include other actuators such as a solenoid. While the power supply 67 includes the battery 70 in this embodiment, the power supply 67 can include other power supplies such as a power generating unit. The battery 70 can be a separate unit from the electrical seatpost assembly 18.

The electrical actuator AC2 includes an output member 72. The output member 72 is movable relative to the motor 68. The output member 72 is in contact with the movable member 44. The motor 68 moves the movable member 44 relative to the first cylinder 30 in the telescopic direction D1 via the output member 72. The motor 68 includes a speed reducer (not shown) therein.

Figure 14:
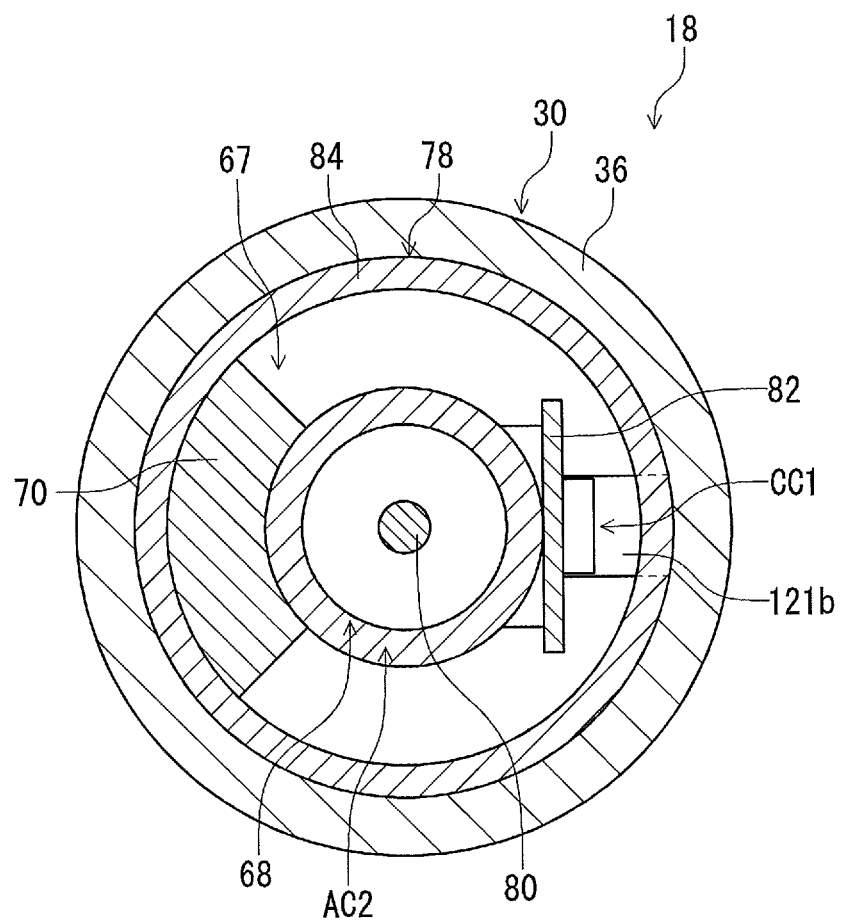
FIG. 14 is a cross-sectional view of the electrical seatpost assembly illustrated in FIG. 4.
Figure 15:
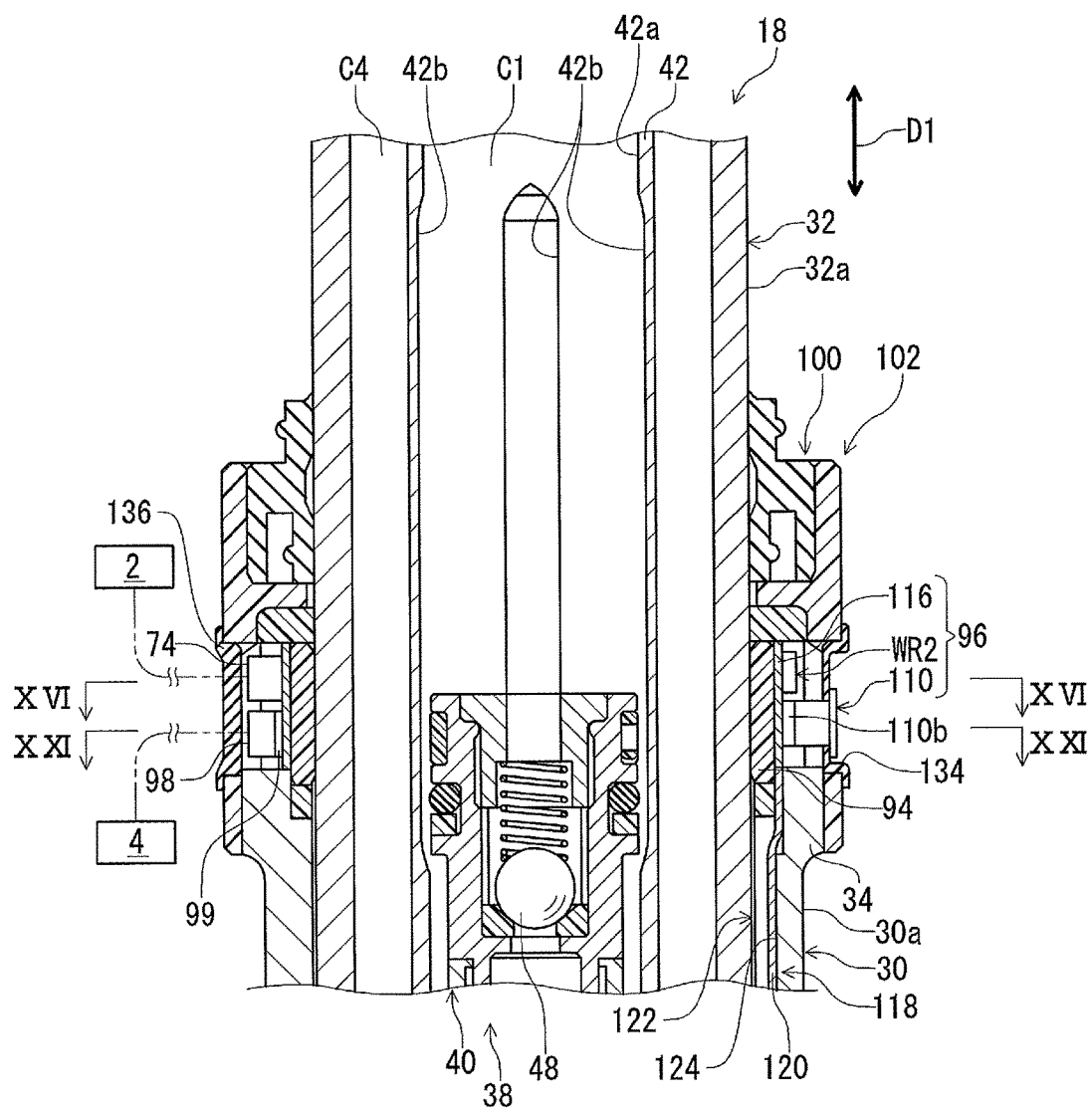
FIG. 15 is a partial cross-sectional view of the electrical seatpost assembly taken along line XV-XV of FIG. 16.

As seen in FIGS. 12 and 14, the power supply 67 includes a charging port 74 to receive electrical power to charge the battery 70. The charging port 74 is electrically connected to the battery 70. As seen in FIG. 15, the charging port 74 is provided on an outer peripheral surface of the one of the first cylinder 30 and the second cylinder 32. In this embodiment, the charging port 74 is provided on an outer peripheral surface 32a of the second cylinder 32. The charging port 74 is provided at the first end 34 of the first cylinder 30. However, the charging port 74 can be provided on an outer peripheral surface 30a (FIG. 14) of the first cylinder 30. The charging port 74 can be provided at the second end 36 of the first cylinder 30.

As seen in FIG. 11, the first cylinder 30 includes an internal space 76. The power supply 67 and the electrical actuator AC2 are provided in the internal space 76 of the first cylinder 30. The internal space 76 includes the second chamber C2. The power supply 67 and the electrical actuator AC2 are provided at the second end 36 of the first cylinder 30. As seen in FIG. 4, the power supply 67 and the electrical actuator AC2 are provided below the positioning structure 38 in a mounting state where the first cylinder 30 is mounted to the bicycle frame 12 (FIG. 1).

As seen in FIG. 11, the electrical seatpost assembly 18 further comprises a housing 78 provided in the one of the first cylinder 30 and the second cylinder 32. The power supply 67 and the electrical actuator AC2 are provided in the housing 78. In this embodiment, the housing 78 is provided in the first cylinder 30. However, the housing 78 can be provided in the second cylinder 32. Specifically, the housing 78 is secured to the second end 36 of the first cylinder 30. A lower end of the support member 40 is secured to the housing 78.

The motor 68 includes an output shaft 80 having external threads 80a. The output member 72 includes a main body 72a and protruding parts 72b. The main body 72a includes a threaded hole 72c. The external threads 80a of the output shaft 80 are threadedly engaged with the threaded hole 72c. The protruding parts 72b protrude from the main body 72a. The housing 78 includes guide grooves 78a extending in the telescopic direction D1. The protruding parts 72b are respectively provided in the guide grooves 78a to prevent the output member 72 from rotating relative to the housing 78. The output member 72 is in contact with the movable member 44. Rotation of the output shaft 80 of the motor 68 moves the output member 72 relative to the housing 78 in the telescopic direction D1. This moves the movable member 44 relative to the support member 40 between the closed position P10 (FIG. 6) and the first open position P11 (FIG. 7) through the second open position P12 (FIG. 8). While the electrical actuator AC2 includes the output member 72 in this embodiment, the electrical actuator AC2 can include other structures such as a cam structure.

As seen in FIGS. 11 and 12, the electrical seatpost assembly 18 further comprises a control substrate 82. As seen in FIG. 13, the control substrate 82 at least partly overlaps with at least one of the power supply 67 and the electrical actuator AC2 when viewed from the direction perpendicular to the telescopic direction D1. In this embodiment, the control substrate 82 partly overlaps with the power supply 67 and the electrical actuator AC2 when viewed from the direction perpendicular to the telescopic direction D1. However, the control substrate 82 can be disposed to entirely overlap with at least one of the power supply 67 and the electrical actuator AC2 when viewed from the direction perpendicular to the telescopic direction D1. As seen in FIGS. 11 and 12, the seatpost controller CR2 is mounted on the control substrate 82.

As seen in FIG. 11, the power supply 67 is detachably attached to the one of the first cylinder 30 and the second cylinder 32. In this embodiment, the power supply 67 is detachably attached to the first cylinder 30. However, the power supply 67 can be detachably attached to the second cylinder 32. The housing 78 includes a housing body 84 and a lid 86. The housing body 84 is provided in the first cylinder 30. The power supply 67 and the electrical actuator AC2 are provided in the housing body 84 of the housing 78. The lid 86 is pivotally coupled to the housing body 84 between a closed position P21 and an open position P22. The housing body 84 includes an opening 84a. The lid 86 covers the opening 84a in a state where the lid 86 is disposed at the closed position P21. The power supply 67 is detachable from the housing body 84 via the opening 84a in a state where the lid 86 is disposed at the open position P22.

The electrical seatpost assembly 18 further comprises an electrical terminal 88. The power supply 67 is detachably connected to the electrical terminal 88. In this embodiment, the electrical terminal 88 includes a first terminal 90 and a second terminal 92. The first terminal 90 and the second terminal 92 are provided in the housing 78. The first terminal 90 is secured to the housing body 84. The second terminal 92 is secured to the lid 86. The battery 70 is provided between the first terminal 90 and the second terminal 92. The first terminal 90 and the second terminal 92 are electrically connected to the control substrate 82.

As seen in FIGS. 11 and 12, the power supply 67 includes a charging controller CC1 to control electrical power inputted via the charging port 74 to the battery 70. The charging controller CC1 is mounted on the control substrate 82 and is electrically connected to the charging port 74 and the electrical terminal 88. The charging controller CC1 respectively controls electrical power (e.g., voltages) supplied from the battery 70 to the electrical actuator AC2 and the seatpost controller CR2.

As seen in FIG. 14, the battery 70 has an arc shape when viewed from the telescopic direction D1. The battery 70 is provided along an outer periphery of the motor 68. The control substrate 82 is provided on an opposite side of the battery 70 with respect to the motor 68. The shape and/or arrangement of the battery 70 and the control substrate 82 are not limited to this embodiment.

As seen in FIG. 15, the electrical seatpost assembly 18 comprises a guide member 94 disposed between the first cylinder 30 and the second cylinder 32 to slidably guide the second cylinder 32 with respect to the first cylinder 30. The guide member 94 is provided at the first end 34. The guide member 94 is provided between the first end 34 and the second cylinder 32. The guide member 94 is in slidable contact with the outer peripheral surface 32*a* of the second cylinder 32. Examples of the guide member 94 include a bushing and a bearing. In this embodiment, the guide member 94 is the bushing.

Figure 16:
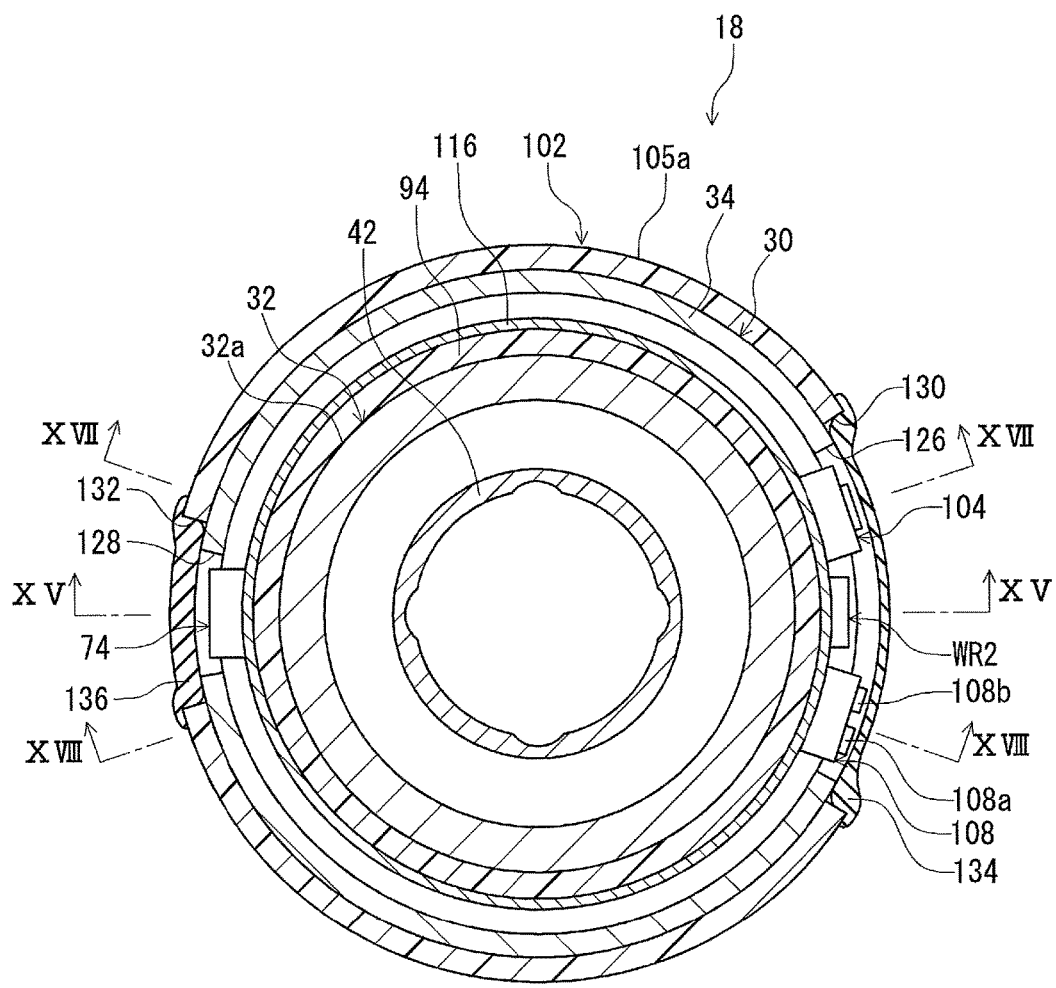
FIG. 16 is a partial cross-sectional view of the electrical seatpost assembly taken along line XVI-XVI of FIG. 15.

In this embodiment, as seen in FIG. 16, the guide member 94 has an annular shape and is integrally provided as a one-piece unitary member and has an annular shape. However, the guide member 94 can have other shapes such as an arch shape and can include separate parts.

As seen in FIGS. 12, 15, 17, and 18, the electrical seatpost assembly 18 comprises an electrical device 96 mounted to the first cylinder 30. In this embodiment, several electrical components may be installed in the electrical seatpost assembly 18 as the electrical device 96. An upper end of the electrical device 96 is disposed above a lower end of the guide member 94 in the telescopic direction D1 in a mounting state where the first cylinder 30 is mounted to the bicycle frame 12.

Figure 19:
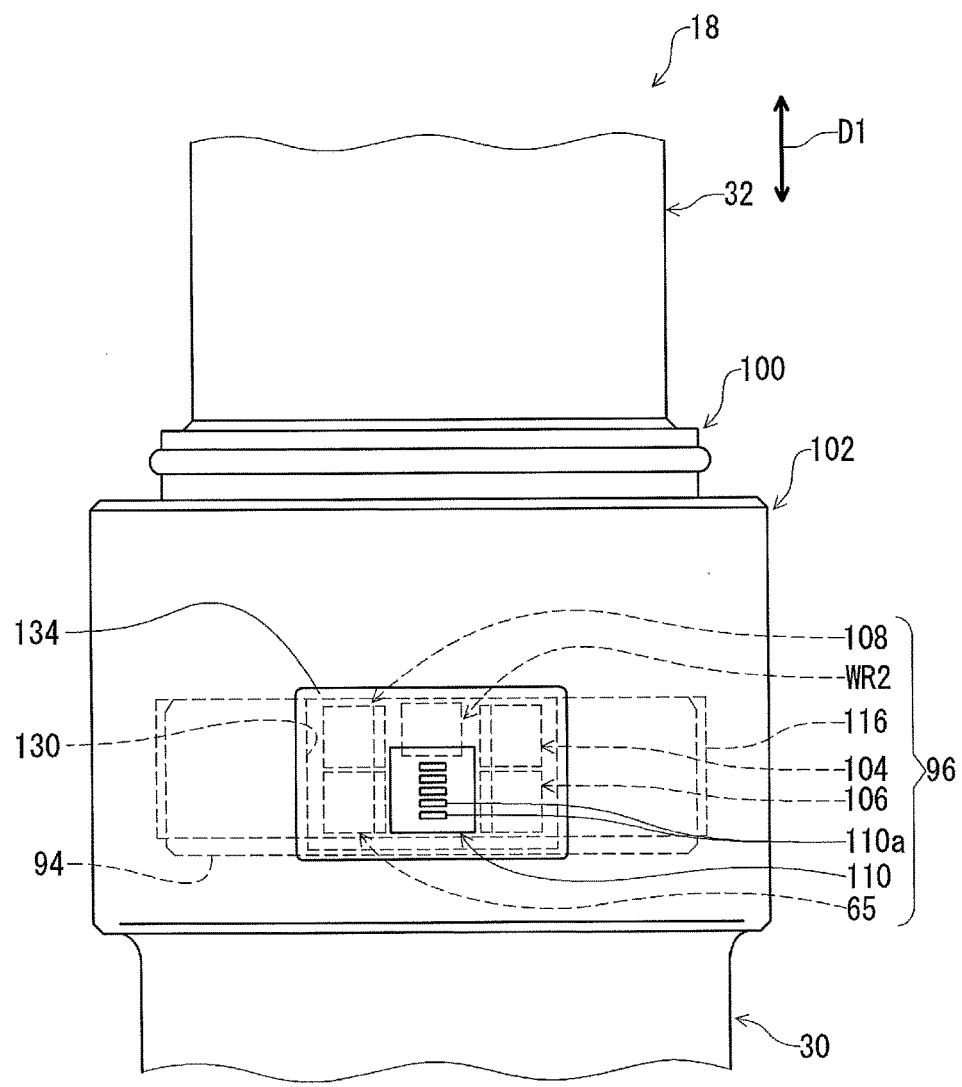
FIG. 19 is a partial front view of the electrical seatpost assembly illustrated in FIG. 4.
Figure 20:
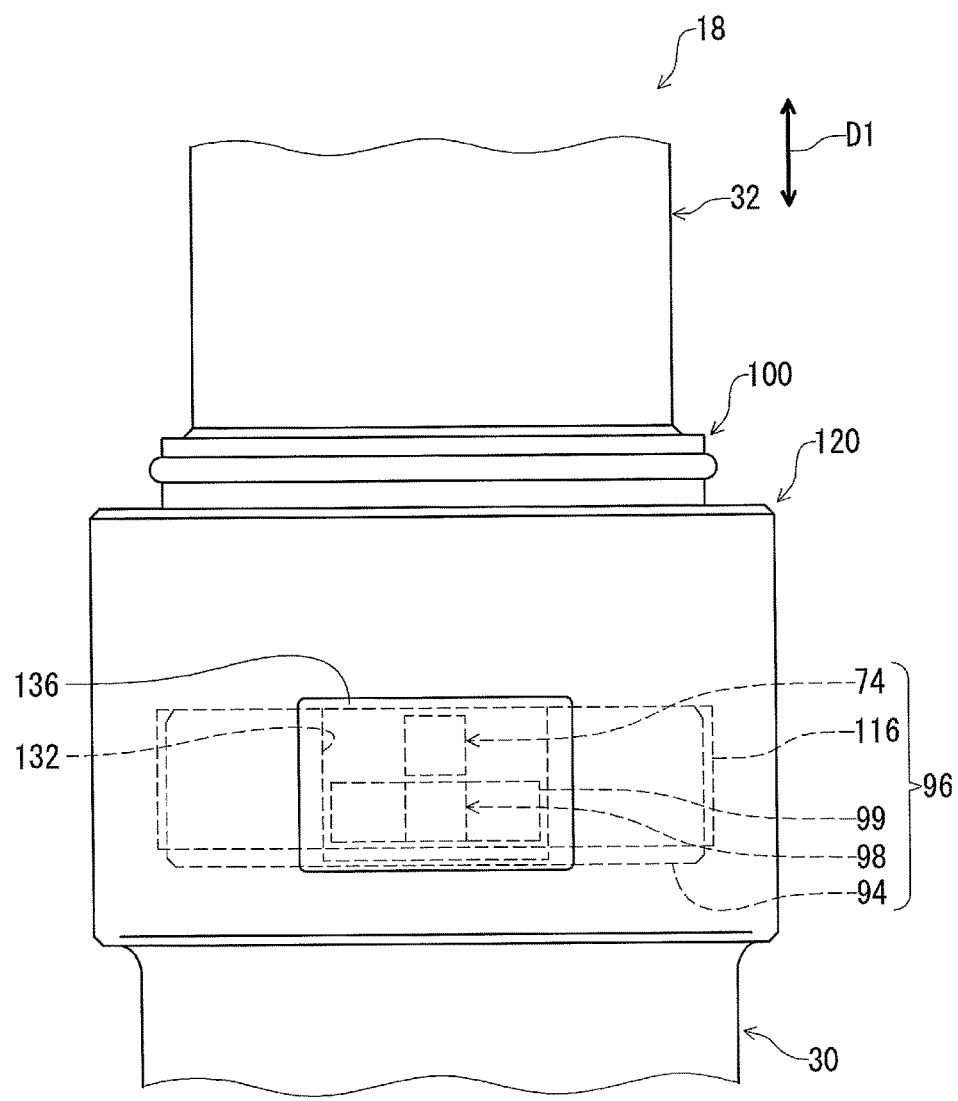
FIG. 20 is a partial rear view of the electrical seatpost assembly illustrated in FIG. 4.

In this embodiment, as seen in FIGS. 19 and 20, the electrical device 96 at least partly overlaps with the guide member 94 when viewed from the direction perpendicular to the telescopic direction D1. Specifically, the electrical device 96 partly overlaps with the guide member 94 when viewed from the direction perpendicular to the telescopic direction D1. However, the electrical device 96 entirely overlaps with the guide member 94 when viewed from the direction perpendicular to the telescopic direction D1. Furthermore, a lower end of the electrical device 96 can be provided above an upper end of the guide member 94. Namely, the electrical device 96 can be provided not to overlap with the guide member 94 when viewed from the direction perpendicular to the telescopic direction D1.

As seen in FIG. 15, the electrical device 96 includes at least one power receiving port 98 to receive electrical power from an external power supply 4. In this embodiment, the electrical device 96 includes a power receiving port 98. Namely, the electrical seatpost assembly 18 further comprises the power receiving port 98 to receive electrical power from the external power supply 4. The power receiving port 98 is provided at the first end 34 of the first cylinder 30. Examples of the external power supply 4 includes the battery unit BT1 of the rear derailleur 26 or other bicycle battery. In this embodiment, the power receiving port 98 receives electrical power from the battery unit BT1.

As seen in FIG. 12, the power receiving port 98 is electrically connected to the charging controller CC1. The charging controller CC1 controls electrical power supplied from the external power supply 4 to the electrical actuator AC2 and the seatpost controller CR2. The charging controller CC1 preferentially selects the battery 70 as power supply when the remaining battery level is not zero and when the external power supply 4 is connected to the power receiving port 98. The charging controller CC1 transmits electrical power from the battery 70 to the electrical actuator AC2 and the seatpost controller CR2 and interrupts electrical power from the power receiving port 98. The power receiving port 98 can be omitted from the electrical seatpost assembly 18.

Figure 17:
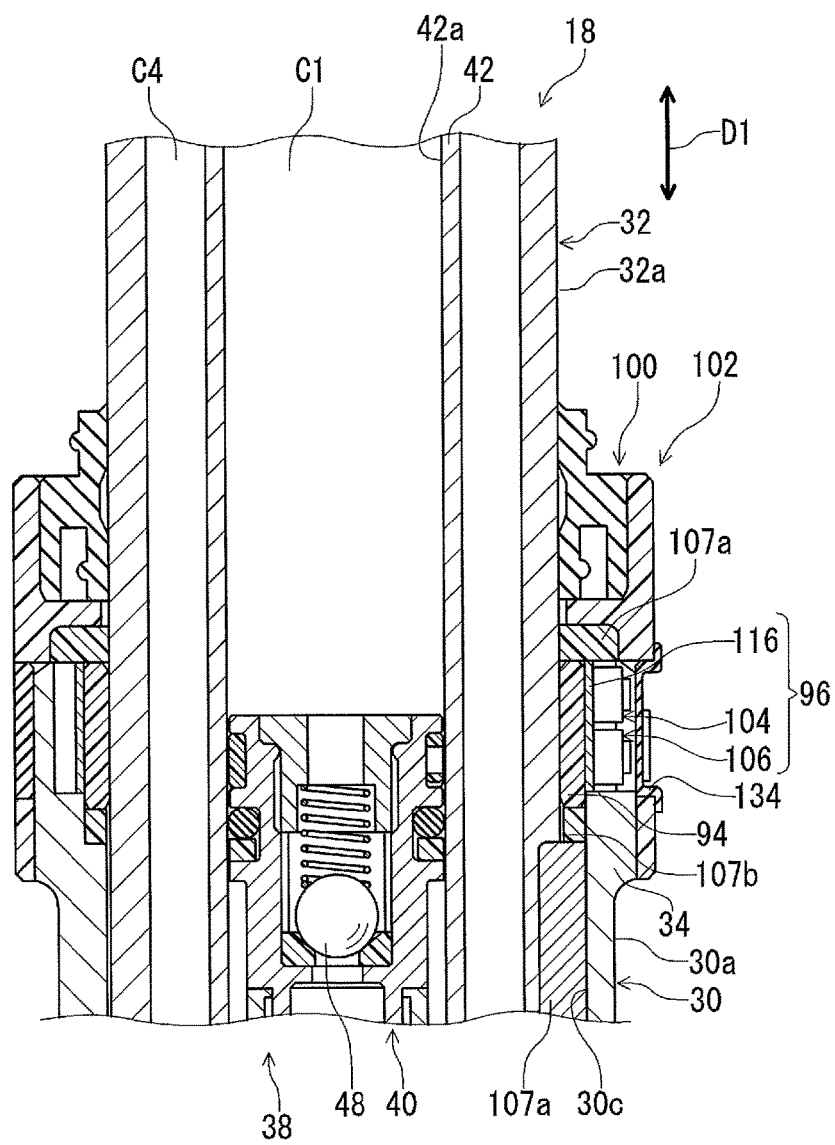
FIG. 17 is a partial cross-sectional view of the electrical seatpost assembly taken along line XVII-XVII of FIG. 16.
Figure 18:
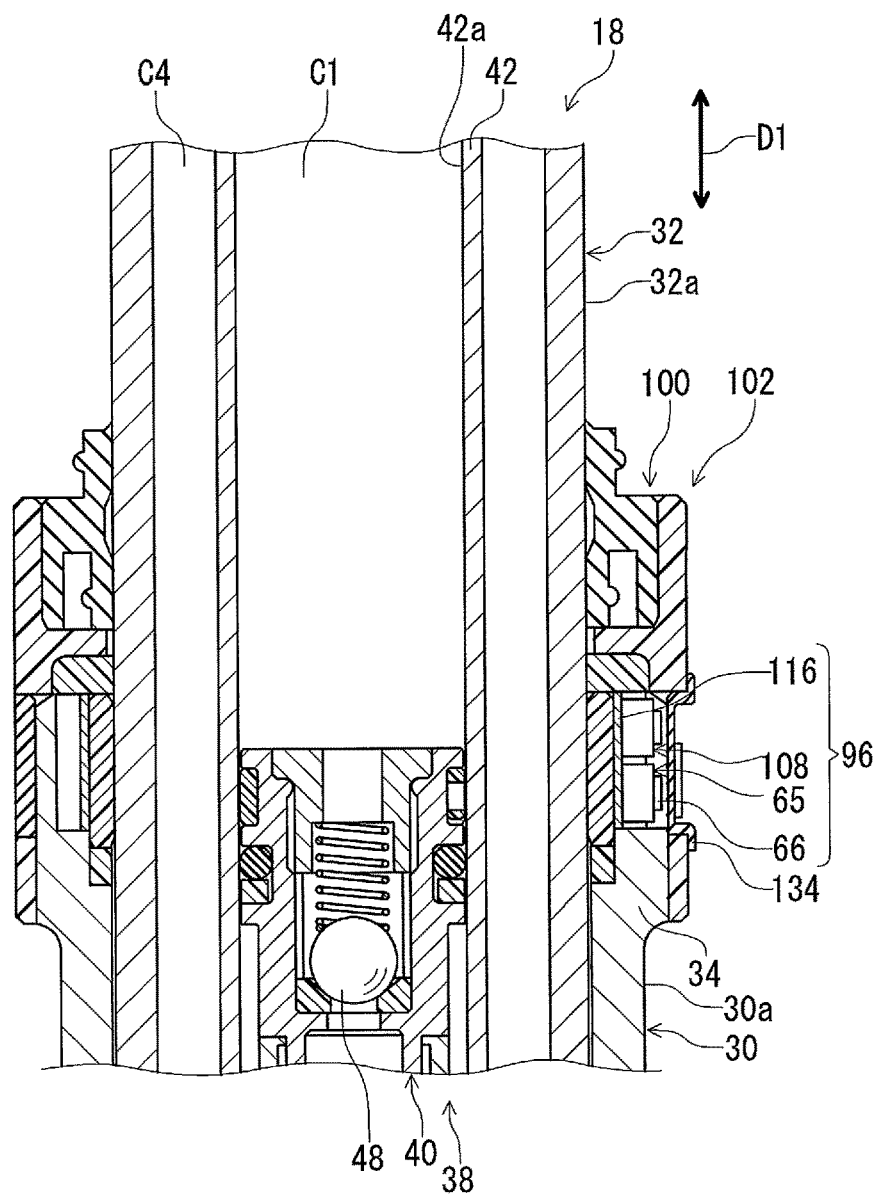
FIG. 18 is a partial cross-sectional view of the electrical seatpost assembly taken along line XVIII-XVIII of FIG. 16.

As seen in FIGS. 15, 17, and 18, the electrical seatpost assembly 18 further comprises a seal 100 provided at the first end 34 to seal a gap between the first and second cylinders 30 and 32. The upper end of the electrical device 96 is disposed above a lower end of the seal 100 in the telescopic direction D1 in the mounting state.

The first cylinder 30 includes a cover member 102 provided at the first end 34. At least one of the guide member 94 and the seal 100 is disposed between the cover member 102 and the second cylinder 32 in the direction perpendicular to the telescopic direction D1. In this embodiment, the guide member 94 and the seal 100 are disposed between the cover member 102 and the second cylinder 32 in the direction perpendicular to the telescopic direction D1. The cover member 102 includes a resin material. Specifically, the cover member 102 is made of synthetic resin. However, the cover member 102 can include other materials. While the cover member 102 is a separate member from the first cylinder 30 in this embodiment, the cover member 102 can be integrally provided with the first cylinder 30 as a one-piece unitary member.

In this embodiment, as seen in FIGS. 12 and 15, one of the electrical device 96 and the cover member 102 includes the charging port 74 to receive electrical power to charge the battery 70. In this embodiment, the electrical device 96 includes the charging port 74 to receive electrical power to charge the battery 70. However, the cover member 102 can include the charging port 74 to receive electrical power to charge the battery 70. The charging port 74 can be mounted to the cover member 102.

The charging port 74 receives electrical power from an external power source 2 to charge the battery 70. Examples of the external power source 2 include a domestic power source. The charging port 74 is electrically connected to the battery 70 via the electrical terminal 88 in a state where the battery 70 is mounted to the housing 78. An upper end of the charging port 74 is disposed above the lower end of the guide member 94 in the telescopic direction D1 in the mounting state.

The electrical device 96 is configured to receive at least one of an electrical input and a mechanical input. In this embodiment, the electrical device 96 is configured to receive the electrical input. Specifically, as seen in FIG. 15, the electrical device 96 includes the wireless receiver WR1 to wirelessly receive the wireless signal. The wireless receiver WR1 receives the wireless signal as the electrical input. An upper end of the wireless receiver WR1 is disposed above the lower end of the guide member 94 in the telescopic direction D1 in the mounting state. The electrical device 96 can include electrical components configured to receive the mechanical input by the user, i.e. a manual switch.

As seen in FIGS. 12 and 17, the electrical device 96 includes a pairing switch 104 to switch a mode of the wireless receiver WR2 to a pairing mode. The pairing switch 104 is electrically connected to the wireless receiver WR1. An upper end of the pairing switch 104 is disposed above the lower end of the guide member 94 in the telescopic direction D1 in the mounting state. The pairing switch 104 receives the mechanical input from the user.

The wireless receiver WR2 has the pairing mode in which the wireless receiver WR2 establishes a wireless communication between the wireless transmitter WT2 and the wireless receiver WR2. The wireless receiver WR2 enters the pairing mode when the pairing switch 104 is operated by the user. When the first adjustment operating switch SW21 is held down by the user, the wireless transmitter WT2 enters the pairing mode in which the wireless communication between the wireless transmitter WT2 and the wireless receiver WR2. The wireless transmitter WT2 repeatedly transmits a pairing demand signal indicating identifying information of the seatpost operating unit U2 during the pairing mode. The wireless receiver WR2 scans wireless signals on specific channels during the pairing mode. The wireless receiver WR2 receives the pairing demand signal. The memory M2 stores reference ID data and reference signal patterns corresponding to the reference ID data in the memory M2. The reference ID data indicate device IDs of operating units which are configured to establish a wireless communication with the electrical seatpost assembly 18.

The wireless receiver WR2 compares the identifying information of the seatpost operating unit U2 with the reference ID data. The wireless receiver WR2 selects, among the reference signal patterns, a target signal pattern corresponding to the identifying information received by the wireless receiver WR2. The memory M2 temporarily stores the identifying information of the seatpost operating unit U2 and the target signal pattern in the memory M2. The wireless receiver WR2 interprets, using the target signal pattern, the wireless signals transmitted from the wireless transmitter WT2 as separate signals from wireless signals transmitted from other devices (e.g., the wireless transmitter WT1 of the shift operating unit U1). Thus, the wireless receiver WR2 establishes the wireless communication with the seatpost operating unit U2.

In this embodiment, the wireless receiver WR2 wirelessly transmits a pairing completion signal to the wireless transmitter WT2. The wireless transmitter WT2 finishes the pairing mode when receiving the pairing completion signal from the wireless receiver WR2. The wireless receiver WR2 finishes the pairing mode after transmitting the pairing completion signal to the wireless transmitter WT2.

The electrical device 96 includes a start switch 106 to turn the electrical actuator AC2 on. An upper end of the start switch 106 is disposed above the lower end of the guide member 94 in the telescopic direction D1 in the mounting state. The start switch 106 receives the mechanical input from the user. The start switch 106 generates a start signal when the start switch 106 is operated by the user. The start switch 106 is electrically connected to the charging controller CC1 to receive the start signal from the start switch 106. Examples of the start switch 106 include a mechanical switch such as a contact switch and a non-contact switch. Examples of the contact switch includes a tact switch. Examples of the non-contact switch includes a magnetic switch.

The charging controller CC1 starts to supply electrical power from the battery 70 to the electrical actuator AC2, the seatpost controller CR2, and the wireless receiver WR2 when the charging controller CC1 receives the start signal in an ON-state where the electrical seatpost assembly 18 is turned on. The charging controller CC1 stops to supply electrical power from the battery 70 to the electrical actuator AC2, the seatpost controller CR2, and the wireless receiver WR2 when the charging controller CC1 receives the start signal in an OFF-state where the electrical seatpost assembly 18 is turned off. Thus, the electrical actuator AC2 is turned on and off via the start switch 106. In the OFF-state, the electrical seatpost assembly 18 is completely turned off to reduce the power consumption of the electrical seatpost assembly 18 to zero. The OFF-state is substantially equal to a state where the battery 70 is detached from the electrical terminal 88.

As seen in FIG. 17, the electrical seatpost assembly 18 includes stoppers 107a, first ring 107b, and a second ring 107c. FIG. 7 depicts one of the stoppers 107a. The stoppers 107a are fastened to the second cylinder 32 and are circumferentially spaced apart from each other. The first ring 107b is provided between the guide member 94 and the cover member 102. The second ring 107c is provided below the guide member 94 and is contactable with the stoppers 107a. The stoppers 107a and the second ring 107c define the maximum overall length L0 (FIG. 4). The first cylinder 30 includes grooves 30c extending in the telescopic direction D1. The stoppers 107a are provided in the grooves 30c to prevent the second cylinder 32 from rotating relative to the first cylinder 30.

As seen in FIGS. 12, 16, and 18, the electrical device 96 includes an operating switch 108 to operate the electrical actuator AC2 to actuate the positioning structure 38. Namely, the electrical seatpost assembly 18 further comprises the operating switch 108 to operate the electrical actuator AC2 to actuate the positioning structure 38 without the wireless signal. The operating switch 108 is electrically connected to the seatpost controller CR2. An upper end of the operating switch 108 is disposed above the lower end of the guide member 94 in the telescopic direction D1 in the mounting state. The operating switch 108 receives the mechanical input from the user.

The operating switch 108 is used to operate the electrical actuator AC2 without the operating device 28. For example, the operating switch 108 is used when a remaining battery capacity of the battery unit BT2 of the operating device 28 is zero. As seen in FIG. 16, the operating switch 108 includes a first button 108a and a second button 108b. The first button 108a corresponds to the first adjustment operating switch SW21 (FIG. 3). The second button 108b corresponds to the second adjustment operating switch SW22 (FIG. 3). The seatpost controller CR2 controls the electrical actuator AC2 to position the movable member 44 at the first open position P11 while the first button 108a is operated by the user. The seatpost controller CR2 controls the electrical actuator AC2 to position the movable member 44 at the second open position P12 while the second button 108b is operated by the user. Thus, the electrical seatpost assembly 18 is operated by the user via the operating switch 108 without the operating device 28.

As seen in FIGS. 12 and 15, the electrical device 96 includes an indicator 110 provided outside the first cylinder 30 and the second cylinder 32 to indicate seatpost information relating to the electrical seatpost assembly 18. The indicator 110 is provided on one of the first cylinder 30 and the second cylinder 32. In this embodiment, the indicator 110 is provided on the first cylinder 30. An upper end of the indicator 110 is disposed above the lower end of the guide member 94 in the telescopic direction D1 in the mounting state. The seatpost information includes a remaining battery level of the battery 70 to supply electrical power to the electrical actuator AC2. The indicator 110 indicates the remaining battery level of the battery 70.

While the seatpost information includes the remaining battery level of the battery 70 in this embodiment, the seatpost information can include other information such as a mode of the electrical seatpost assembly 18, a state of signals of the electrical seatpost assembly 18, and an error or trouble of the electrical seatpost assembly 18.

The indicator 110 includes one of a light emitting element and a display. In this embodiment, as seen in FIG. 19, the indicator 110 includes a plurality of light emitting elements 110*a*. Examples of the light emitting element 110*a* include light emitting diode (LED). However, the indicator 110 can include the display such as a liquid crystal display (LCD). A total number of the light emitting elements 110*a* that emit light indicate the remaining battery level of the battery 70. For example, all of the light emitting elements 110*a* emit light when the remaining battery level of the battery 70 is full. None of the light emitting elements 110*a* emit light when the remaining battery level is zero.

While the indicator 110 indicates the remaining battery level using the total number of the light emitting elements 110*a* in this embodiment, the indicator 110 can indicate the remaining battery level using a color and/or a change in a state of lights instead of or in addition to the total number of the light emitting elements 110*a*.

The indicator 110 indicates the remaining battery level of the battery 70 when the electrical actuator AC2 is turned on. Specifically, as seen in FIG. 12, the electrical seatpost assembly 18 includes a battery sensor 112. The battery sensor 112 senses the remaining battery level of the battery 70. Examples of a sensing system of the battery sensor 112 include voltage measuring, coulomb counter, fuel-cell modeling, and impedance track. The battery sensor 112 includes circuits to sense the remaining battery level of the battery 70. The battery sensor 112 is electrically connected to the battery 70 via the electrical terminal 88. The indicator 110 is electrically connected to the battery sensor 112. The battery sensor 112 is at least partly mounted on the control substrate 82.

As seen in FIG. 12, the electrical seatpost assembly 18 includes an indication controller 114. The indication controller 114 controls the indicator 110 to indicate the remaining battery level of the battery 70 when the electrical actuator AC2 is turned on. The indication controller 114 is electrically connected to the indicator 110 and the electrical actuator AC2. The indication controller 114 senses turning on and off of the electrical actuator AC2. The indication controller 114 controls the indicator 110 not to indicate the remaining battery level of the battery 70 when the electrical actuator AC2 is turned off. The indication controller 114 controls the indicator 110 to keep indicating the remaining battery level of the battery 70 while the electrical actuator AC2 is ON. The indication controller 114 is mounted on the control substrate 82. The indicator 110 receives an indication control signal as the mechanical input from the indication controller 114.

As seen in FIGS. 12, 15, 17, and 18, the electrical device 96 includes a control substrate 116. In this embodiment, the control substrate 116 is a separate member from the control substrate 82. However, the control substrate 116 can be integrally provided with the control substrate 82 as a one-piece unitary member. As seen in FIG. 16, the control substrate 116 has an annular shape and is radially outwardly of the guide member 94.

The wireless receiver WR1, the changing device 65, the pairing switch 104, the start switch 106, the operating switch 108, and the indicator 110 are mounted on the control substrate 116 and are electrically connected to the control substrate 116. An upper end of the control substrate 116 is disposed above the lower end of the guide member 94 in the telescopic direction D1 in the mounting state.

In this embodiment, as seen in FIG. 15, a connector 110*b* is mounted on the control substrate 116. The indicator 110 is detachably connected to the connector 110*b*. The indicator 110 is electrically connected to the control substrate 116 via the connector 110. For example, the indicator 110 is connected to the connector 110*b* after the cover member 102 is attached to the first cylinder 30.

As seen in FIG. 12, the electrical device 96 includes the changing device 65 to change the state of the actuating device 64 between the accessible state and the inaccessible state. The changing device 65 is electrically connected to the seatpost controller CR2. As seen in FIG. 18, an upper end of the changing device 65 is disposed above the lower end of the guide member 94 in the telescopic direction D1 in the mounting state.

As seen in FIGS. 12, 16, and 18, the changing device 65 is mounted on the control substrate 116 and is electrically connected to the control substrate 116. The manual switch 66 is mounted on the control substrate 116. The changing device 65 receives the mechanical input from the user.

Figure 21:
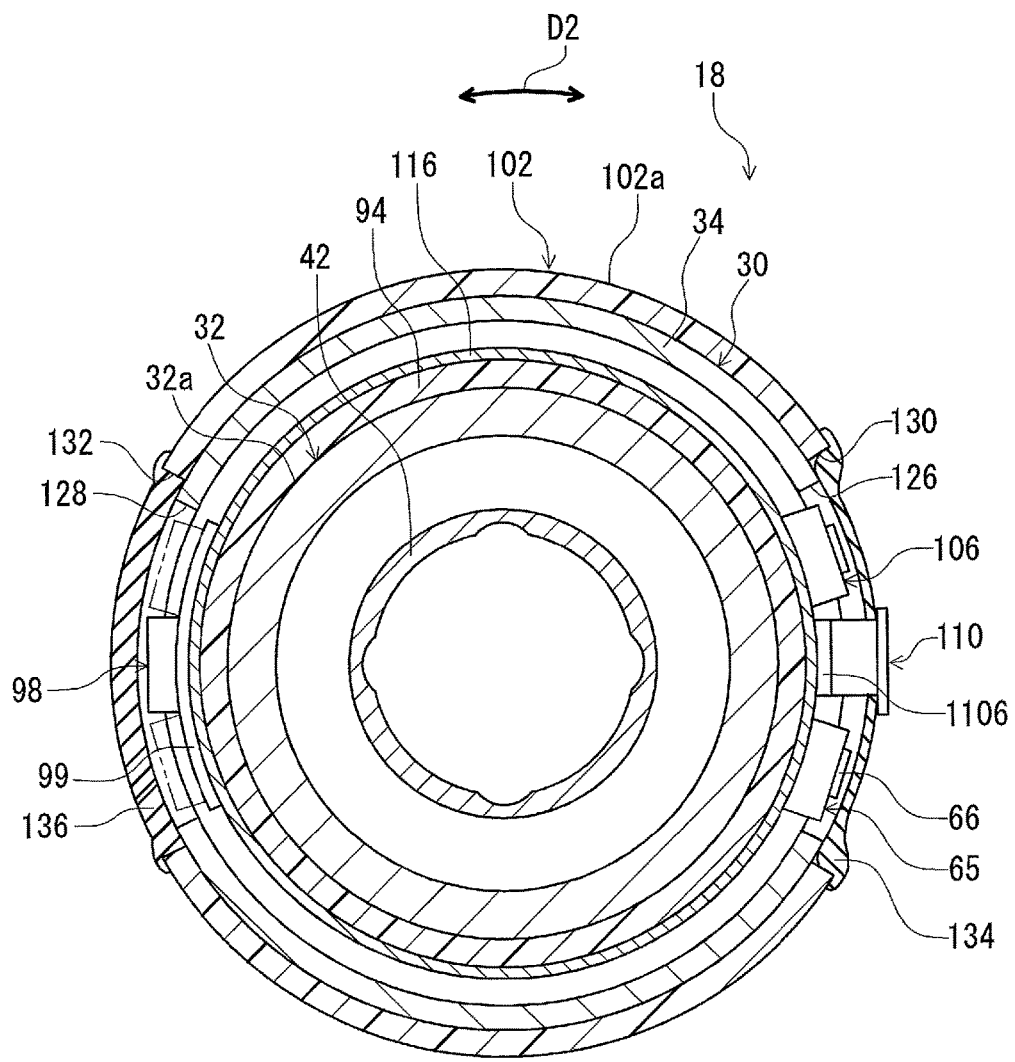
FIG. 21 is a partial cross-sectional view of the electrical seatpost assembly taken along line XXI-XXI of FIG. 15.

As seen in FIG. 21, the at least one power receiving port 98 is movably mounted relative to the first cylinder 30 in a circumferential direction D2 of the first cylinder 30. The power receiving port 98 is mounted on the control substrate 116. The power receiving port 98 is movably mounted relative to the first end 34 of the first cylinder 30 in the circumferential direction D2 of the first cylinder 30. Specifically, the electrical device 96 includes a slider 99 movably coupling the power receiving port 98 to the control substrate 116. The slider 99 is mounted on the control substrate 116. The slider 99 electrically connects the power receiving port 98 to the control substrate 116 regardless of a position of the power receiving port 98 relative to the control substrate 116.

As seen in FIGS. 12, 17, and 18, the electrical device 96 is provided on a front side of the guide member 94 in the mounting state. The electrical device 96 is at least partly provided on the front side of the guide member 94 in the mounting state. In this embodiment, the wireless receiver WR2, the changing device 65, the pairing switch 104, the start switch 106, the operating switch 108, and the indicator 110 are provided on the front side of the guide member 94 in the mounting state.

The indicator 110 is provided on a front side of one of the first cylinder 30 and the second cylinder 32 in the mounting state where the first cylinder 30 is mounted to the bicycle frame 12 (FIG. 1). In this embodiment, the indicator 110 is provided on the front side of the first cylinder 30 and the second cylinder 32 in the mounting state.

In this embodiment, as seen in FIG. 12, the electrical device 96 includes the wireless receiver WR2, the changing device 65, the charging port 74, the power receiving port 98, the pairing switch 104, the start switch 106, the operating switch 108, the indicator 110, and the control substrate 116. However, the electrical device 96 is not limited to these electrical components. The electrical device 96 can include other type of electrical components.

As seen in FIGS. 16 and 21, the cover member 102 includes an outer peripheral surface 102*a*. The electrical device 96 is provided not to protrude radially outwardly from the outer peripheral surface 102*a* of the cover member 102. The electrical device 96 is provided inside the outer peripheral surface 102*a* of the cover member 102 when viewed from the telescopic direction D1. In this embodiment, the wireless receiver WR2, the changing device 65, the charging port 74, the pairing switch 104, the start switch 106, the operating switch 108, the indicator 110, and the control substrate 116 are provided not to protrude radially outwardly from the outer peripheral surface 102a of the cover member 102. The wireless receiver WR2, the charging device 65, the charging port 74, the pairing switch 104, the start switch 106, the operating switch 108, the indicator 110, and the control substrate 116 are provided inside the outer peripheral surface 102a of the cover member 102. However, at least one of these components can be provide to protrude radially outwardly from the outer peripheral surface 102a of the cover member 102.

As seen in FIGS. 11 and 15, the electrical seatpost assembly 18 further comprises a connecting part 118. The connecting part 118 electrically connects the electrical device 96 to the motor 68. In this embodiment, the connecting part 118 electrically connects the start switch 106 and the operating switch 108 to the motor 68. The connecting part 118 includes an electronic substrate 120 electrically connecting the electrical device 96 to the motor 68. In this embodiment, the electronic substrate 120 electrically connects the start switch 106 and the operating switch 108 to the motor 68. The electronic substrate 120 extends in the telescopic direction D1. While the connecting part 118 includes the electronic substrate 120 in this embodiment, the connecting part 118 can include an electrical cable or other electrical elements instead of or in addition to the electronic substrate 120.

As seen in FIG. 11, the connecting part 118 includes a first connector 121a and a second connector 121b. The first connector 121a is electrically connected to an end of the electronic substrate 120. The second connector 121b is mounted on the control substrate 82. The second connector 121b is electrically connected to the electrical actuator AC2, the seatpost controller CR2, and other electrical components via the control substrate 82. The first connector 121a is electrically and mechanically connected to the second connector 121b. The first connector 121a is detachably connected to the second connector 121b. For example, the first connector 121a is connected to the second connecter 121b after the housing 78 is secured to the first cylinder 30.

The first cylinder 30 includes an accommodation part 122 accommodating the connecting part 118. In this embodiment, the accommodation part 122 includes an accommodation groove 124 extending in the telescopic direction D1. The connecting part 118 is provided in the accommodation groove 124. The electronic substrate 120 is provided in the accommodation groove 124. The first cylinder 30 includes an inner peripheral surface 30b. The accommodation groove 124 is provided on the inner peripheral surface 30b of the first cylinder 30.

As seen in FIGS. 16 and 21, the first cylinder 30 includes a first opening 126 and a second opening 128. The first opening 126 is provided on the front side of the guide member 94 in the mounting state. The second opening 128 is provided on the rear side of the guide member 94 in the mounting state. The cover member 102 includes a third opening 130 and a fourth opening 132. The third opening 130 is provided on the front side of the guide member 94 in the mounting state. The fourth opening 132 is provided on the rear side of the guide member 94 in the mounting state. The charging port 74 is provided at a position corresponding to the second opening 128 and the fourth opening 132. It is possible to access the charging port 74 via the second opening 128 and the fourth opening 132.

The electrical seatpost assembly 18 includes a first cover 134 and a second cover 136. The first cover 134 is detachably attached to the cover member 102 to cover the first opening 126 and the third opening 130. The second cover 136 is detachably attached to the cover member 102 to cover the second opening 128 and the fourth opening 132. The first cover 134 is made of a flexible material such as rubber. The user can operate each of the charging port 74, the pairing switch 104, the start switch 106, and the operating switch 108 from outside of the electrical seatpost assembly 18 via the first cover 134. When the charging port 74 is used, the second cover 136 is detached from the cover member 102.

As seen in FIG. 21, the indicator 110 is partly provided outside the first cover 134. The user can check the remaining battery level of the battery 70 on the indicator 110 from outside of the electrical seatpost assembly 18. In a case where the first cover 134 is made of a transparent material or a semi-transparent material, the indicator 110 can be provided in the first cover 134.

The operation of the electrical seatpost assembly 18 will be described in detail below.

As seen in FIG. 4, in a state where the overall length of the electrical seatpost assembly 18 is the maximum overall length L0, the third seal member 63 is disposed radially inward of the recesses 42b of the inner tube 42. In this state, as seen in FIG. 6, the third gate G3 is open to connect the first chamber C1 to the intermediate chamber C12. The first chamber C1 is in communication with the second valve chamber VC2 via the third gate G3, the intermediate chamber C12, and the third through-holes H3 in the closed state where the movable member 44 is positioned at the closed position P10.

As seen in FIG. 8, the movable member 44 is moved from the closed position P10 to the second open position P12 when the second adjustment switch SW22 (FIG. 3) of the operating device 28 is operated by the user. This opens the second gate G2 to connect the first chamber C1 to the third chamber C3 via the second passageway PW2. This allows the substantially incompressible fluid to flow between the first chamber C1 and the third chamber C3 via the second passageway PW2.

When the rider's weight is applied to the second cylinder 32 via the mounting portion 37 (FIG. 4), fluid pressure increases in the first chamber C1. This causes the substantially incompressible fluid to flow from the first chamber C1 to the third chamber C3 via the second passageway PW2. At this time, the piston 58 is pressed toward the biasing chamber C4 relative to the first cylinder 30, causing the compressible fluid to be compressed in the biasing chamber C4. This allows the second cylinder 32 to be downwardly moved relative to the first cylinder 30 using the rider's weight (FIGS. 9 and 10).

On the other hand, when the rider's weight is released from the second cylinder 32, the compressible fluid compressed in the biasing chamber C4 biases the second cylinder 32 to upwardly move relative to the first cylinder 30 in the telescopic direction D1. This causes the substantially incompressible fluid to flow from the third chamber C3 to the first chamber C1 via the second passageway PW2. The second cylinder 32 is upwardly moved relative to the first cylinder 30 while the rider's weight is released from the second cylinder 32.

As seen in FIG. 6, the second gate G2 is closed when the movable member 44 returns to the closed position P10, causing the substantially incompressible fluid to stop flowing between the first chamber C1 and the third chamber C3 via the second passageway PW2 (FIG. 8). This allows the second cylinder 32 to be positioned at any position within the second adjustable range AR2 (FIG. 4) corresponding to the range RG1 of the recesses 42b.

As seen in FIG. 10, when the third seal member 63 reaches the upper side of the recesses 42b, the third seal member 63 comes in contact with the inner peripheral surface 42a of the inner tube 42 along the inner whole periphery of the inner tube 42. This causes the third gate G3 to be closed so that the substantially incompressible fluid stops flowing from the first chamber C1 to the third chamber C3. This allows the second cylinder 32 to be positioned at a position corresponding to the intermediate total length L2 (FIG. 4) relative to the first cylinder 30 by operating the second adjustment operating switch SW22. The second cylinder 32 does not move relative to the first cylinder 30 in the telescopic direction D1 until the first gate G1 is open.

As seen FIG. 7, the movable member 44 is moved from the closed position P10 to the first open position P11 when the first adjustment switch SW21 (FIG. 3) of the operating device 28 is operated by the user. This opens the first gate G1 and the second gate G2 to connect the first chamber C1 to the third chamber C3 via the first passageway PW1. This allows the substantially incompressible fluid to flow between the first chamber C1 and the second chamber C2 via the first passageway PW1 and the second passageway PW2. However, the positioning structure 38 can have such a construction that the second passageway PW2 is closed in a state where the first passageway PW1 is open.

When the rider's weight applied to the second cylinder 32, the fluid pressure increases in the first chamber C1. This causes the substantially incompressible fluid to flow from the first chamber C1 to the third chamber C3 via the first passageway PW1. At this time, the piston 58 is pressed toward the biasing chamber C4 relative to the first cylinder 30, causing the compressible fluid to be compressed in the biasing chamber C4. This allows the second cylinder 32 to be downwardly moved relative to the first cylinder 30 using the rider's weight.

On the other hand, when the rider's weight is released from the second cylinder 32, the compressible fluid compressed in the biasing chamber C4 biases the second cylinder 32 to upwardly move relative to the first cylinder 30 in the telescopic direction D1. This causes the substantially incompressible fluid to flow from the third chamber C3 to the first chamber C1 via the first passageway PW1. The second cylinder 32 is upwardly moved relative to the first cylinder 30 while the rider's weight is released from the second cylinder 32.

The first gate G1 and the second gate G2 are closed when the movable member 44 returns to the closed position P10 (FIG. 6), causing the substantially incompressible fluid to stop flowing between the first chamber C1 and the third chamber C3 via the first passageway PW1 (FIG. 7). Accordingly, a relative position between the first cylinder 30 and the second cylinder 32 can be continuously adjusted regardless of the recesses 42b in the first open state where the movable member 44 is disposed at the first open position P11.

The bicycle 10 and the electrical seatpost assembly 18 have the following features.

(A-1) The power supply 67 and the electrical actuator AC2 are disposed in one of the first cylinder 30 and the second cylinder 32 to at least partly overlap with each other when viewed from the direction perpendicular to the telescopic direction D1. Accordingly, it is possible to shorten the total length of the electrical seatpost assembly 18 in the telescopic direction D1.

(A-2) Since the electrical actuator AC2 includes the motor 68, it is possible to make the electrical actuator AC2 more compact.

(A-3) Since the power supply 67 includes the battery 70, it is possible to make the power supply 67 more compact.

(A-4) Since the battery 70 includes the rechargeable battery, it is possible to charge the battery 70 without replacing the battery 70 with another battery.

(A-5) Since the power supply 67 includes the charging port 74 to receive electrical power to charge the battery 70, it is possible to easily charge the battery 70 via the charging port 74.

(A-6) Since the charging port 74 is provided on the outer peripheral surface of the one of the first cylinder 30 and the second cylinder 32, it is possible to easily access the charging port 74.

(A-7) Since the power supply 67 and the electrical actuator AC2 are provided in the internal space 76 of the first cylinder 30, it is possible to utilize the internal space 76 of the first cylinder 30 as a space for the power supply 67 and the electrical actuator AC2.

(A-8) Since the power supply 67 and the electrical actuator AC2 are provided at the second end 36 of the first cylinder 30, it is possible to utilize the second end 36 of the first cylinder 30 as a space for the power supply 67 and the electrical actuator AC2.

(A-9) Since the power supply 67 and the electrical actuator AC2 are provided below the positioning structure 38 in the mounting state, it is possible to arrange a center of gravity of the electrical seatpost assembly 18 at a lower position in the state where the first cylinder 30 is mounted on the bicycle frame 12.

(A-10) Since the power supply 67 and the electrical actuator AC2 are provided in the housing 78, it is possible to deal the power supply 67 and the electrical actuator AC2 as a single unit.

(A-11) The control substrate 82 at least partly overlaps with at least one of the power supply 67 and the electrical actuator AC2 when viewed from the direction perpendicular to the telescopic direction D1. Accordingly, it is possible to shorten the total length of the electrical seatpost assembly 18 in the telescopic direction D1.

(A-12) Since the power supply 67 is detachably attached to the one of the first cylinder 30 and the second cylinder 32, it is possible to detach the power supply 67 for maintenance.

(A-13) Since the power supply 67 is detachably connected to the electrical terminal 88, it is possible to electrically connect the power supply 67 to an electrical element (e.g., the electrical actuator AC2 or the seatpost controller CR2) via the electrical terminal 88.

(A-14) Since the electrical seatpost assembly 18 further comprises the power receiving port 98 to receive electrical power from the external power supply 4, it is possible to utilize the electrical power of the external power supply 4 in addition to or instead of the power supply 67. This can make the capacity of the power supply 67 smaller.

(A-15) The rear derailleur 26 includes the electrical shifting actuator AC1, and the electrical seatpost assembly 18 includes the electrical actuator AC2. Accordingly, it is possible to electrically operate the rear derailleur 26 and the electrical seatpost assembly 18. This can simplify the operating device 28 to operate the rear derailleur 26 and the electrical seatpost assembly 18.

(A-16) At least one of the electrical shifting actuator AC1 and the electrical actuator AC2 is operated based on the at least one wireless signal received by the at least one wireless receiver WR1 and/or WR2. Accordingly, it is possible to omit an electrical cable connecting the operating device 28 to the at least one of the rear derailleur 26 and the electrical seatpost assembly 18. This can simplify the bicycle 10.

(A-17) The electrical shifting actuator AC1 and the electrical actuator AC2 are operated based on the wireless signal received by the at least one wireless receiver WR1 and/or WR2. Accordingly, it is possible to omit an electrical cable connecting the operating device 28 to the rear derailleur 26 and the electrical seatpost assembly 18. This can simplify the bicycle 10.

(A-18) The at least one wireless receiver WR1 and/or WR2 is electrically connected to the electrical shifting actuator AC1 and the electrical actuator AC2 via at least one electrical cable. Accordingly, it is possible to arrange the at least one wireless receiver WR1 and/or WR2 at a desired position in the bicycle 10.

(A-19) Since the at least one wireless receiver WR1 and/or WR2 includes the first wireless receiver WR1 and the second wireless receiver WR2, it is possible to respectively operate the electrical shifting actuator AC1 and the electrical actuator AC2 via the first wireless receiver WR1 and the second wireless receiver WR2.

(B-1) The upper end of the electrical device 96 is disposed above the lower end of the guide member 94 in the telescopic direction D1 in the mounting state where the first cylinder 30 is mounted to the bicycle frame 12. Accordingly, it is possible to utilize a space disposed around the guide member 94, allowing the electrical seatpost assembly 18 to be compact.

(B-2) Since the guide member 94 is provided at the first end 34, it is possible to utilize a space disposed around the first end 34 of the first cylinder 30, allowing the electrical seatpost assembly 18 to be compact without making a total length of the electrical seatpost assembly 18 in the telescopic direction D1.

(B-3) Since the upper end of the electrical device 96 is disposed above the lower end of the seal 100 in the telescopic direction D1 in the mounting state, it is possible to utilize a space disposed around the seal 100 provided at the first end 34, allowing the electrical seatpost assembly 18 to be compact.

(B-4) At least one of the guide member 94 and the seal 100 is disposed between the cover member 102 and the second cylinder 32 in the direction perpendicular to the telescopic direction D1. Accordingly, it is possible to protect at least one of the guide member 94 and the seal 100 by the cover member 102.

(B-5) The electrical device 96 is configured to receive at least one of the electrical input and the mechanical input. Accordingly, it is possible to operate the electrical seatpost assembly 18 using at least one of the electrical input and the mechanical input.

(B-6) Since the electrical device 96 includes the wireless receiver WR2 to wirelessly receive the wireless signal, it is possible to operate the electrical seatpost assembly 18 using the wireless signal.

(B-7) Since the electrical device 96 includes the pairing switch 104 to switch the mode of the wireless receiver WR2 to the pairing mode, it is possible to easily perform the pairing between the wireless receiver WR2 and an external operating device (e.g., the operating device 28).

(B-8) Since the cover member 102 includes the resin material, it is possible to maintain the intensity of the wireless signal even if the cover member 102 is disposed to cover the wireless receiver WR2.

(B-9) Since the electrical device 96 includes the start switch 106 to turn the electrical actuator AC2 on, it is possible to manually start the electrical actuator AC2 via the start switch 106.

(B-10) Since the electrical device 96 includes the operating switch 108 to operate the electrical actuator AC2 to actuate the positioning structure 38, it is possible to manually operate the electrical actuator AC2 via the operating switch 108.

(B-11) Since the electrical device 96 includes the control substrate 116, it is possible to install electrical elements on the control substrate 116 in accordance with the desired specification of the electrical seatpost assembly 18.

(B-12) The indicator 110 is provided outside the first cylinder 30 and the second cylinder 32 to indicate the seatpost information relating to the electrical seatpost assembly 18. Accordingly, it is possible to inform the user of the seatpost information relating to the electrical seatpost assembly 18.

(B-13) Since the seatpost information includes the remaining battery level of the battery 70, it is possible to inform the user of the remaining battery level of the battery 70.

(B-14) Since the electrical device 96 includes the charging port 74 to receive electrical power to charge the battery 70, it is possible to charge the battery 70 via the charging port 74.

(B-15) Since the electrical device 96 is provided on the front side of the guide member 94 in the mounting state, it is possible to easily operate or check the electrical device 96 for the user during cycling.

(B-16) The electrical device 96 is provided not to protrude radially outwardly from the outer peripheral surface 102a of the cover member 102. Accordingly, it is possible to prevent the interference between the electrical device 96 and the bicycle frame 12 when the first cylinder 30 is mounted to the bicycle frame 12.

(B-17) The electrical device 96 includes at least one power receiving port 98 to receive electrical power from the external power supply 4. Accordingly, it is possible to utilize the electrical power of the external power supply 4.

(B-18) The at least one power receiving port 98 is movably mounted relative to the first cylinder 30 in the circumferential direction of the first cylinder 30. Accordingly, it is possible to adjust a position of the at least one power receiving port 98 in the circumferential direction. This allows the user to select a preferable route of an electrical cable.

(B-19) The electrical device 96 includes the charging port 74 to receive electrical power to charge the battery 70. Accordingly, it is possible to charge the battery 70 via the charging port 74.

(B-20) Since the connecting part 118 electrically connects the electrical device 96 to the motor 68, it is possible to electrically connect the electrical device 96 to the motor 68 via the connecting part 118 even if the electrical device 96 is arranged apart from the motor 68.

(B-21) The connecting part 118 includes the electronic substrate 120 electrically connecting the electrical device 96 to the motor 68. Accordingly, it is possible to utilize the electronic substrate 120 as a cable electrically connecting the electrical device 96 to the motor 68. This can make a space for the electronic substrate 120 smaller.

(B-22) Since the first cylinder 30 includes the accommodation part 122 accommodating the connecting part 118, it is possible to utilize a part of the first cylinder 30 as a space for accommodating the connecting part 118. This can maintain the size of the electrical seatpost assembly 18.

(B-23) The electrical seatpost assembly 18 comprises the indicator 110 to indicate seatpost information relating to the electrical seatpost assembly 18. The indicator 110 is provided on one of the first cylinder 30 and the second cylinder 32. Accordingly, it is possible to inform the user of the seatpost information relating to the electrical seatpost assembly 18.

(B-24) Since the indicator 110 includes one of the light emitting element and the display, it is possible to easily check the seatpost information for the user via the indicator 110.

(B-25) Since the seatpost information includes the remaining battery level of the battery 70 to supply electrical power to the electrical actuator AC2, it is possible to inform the user of the remaining battery level of the battery 70.

(B-26) Since the electrical seatpost assembly 18 further comprises the battery 70 to supply the electrical power to the electrical actuator AC2, it is possible to omit a power cable.

(B-27) Since the indicator 110 indicates the remaining battery level of the battery 70 when the electrical actuator AC2 is turned on, it is possible to inform the user of the remaining battery level of when the electrical actuator AC2 is turned on.

(B-28) Since the indicator 110 indicates the remaining battery level of the battery 70 when the indicator 110 receives the indication command signal, it is possible to inform the user of the remaining battery level at a specific timing caused by the indication command signal.

(B-29) The indicator 110 is provided on the front side of one of the first cylinder 30 and the second cylinder 32 in the mounting state where the first cylinder 30 is mounted to the bicycle frame 12. Accordingly, it is possible to easily check the seatpost information indicated by the indicator 110 for user.

(B-30) The electrical seatpost assembly 18 comprises the changing device 65 to change the state of the actuating device 64 between the accessible state and the inaccessible state. Accordingly, it is possible to manually or automatically switch the state of the actuating device 64 between the accessible state and the inaccessible state using the switch device. This can reduce power consumption of the actuating device 64.

(B-31) Since the changing device 65 includes the manual switch 66, it is possible to manually switch the state of the actuating device 64 between the accessible state and the inaccessible state using the changing device 65. This can reduce power consumption of the actuating device 64.

(B-32) Since the manual switch 66 is provided on the outer peripheral surface 30a or 32a of one of the first cylinder 30 and the second cylinder 32, it is possible to easily access the manual switch 66.

(B-33) The changing device 65 changes the state of the actuating device 64 from the accessible state to the inaccessible state when the changing device 65 does not receive the input for the waiting time in the accessible state. Accordingly, it is possible to automatically switch the state of the actuating device 64 from the accessible state to the inaccessible state. This can reduce power consumption of the actuating device 64.

(B-34) Since the wireless receiver WR2 wirelessly receives the wireless signal in the accessible state of the actuating device 64, it is possible to operate the actuating device 64 using the wireless signal.

(B-35) The electrical seatpost assembly 18 further comprises the operating switch 108 to operate the electrical actuator AC2 to actuate the positioning structure 38 without the wireless signal. Accordingly, it is possible to manually operate the electrical actuator AC2 via the operating switch 108 even if the electrical actuator AC2 does not receive the wireless signal.

Second Embodiment

An electrical seatpost assembly 218 in accordance with a second embodiment will be described below referring to FIG. 22. The electrical seatpost assembly 218 has substantially the same structure and/or configuration as that of the electrical seatpost assembly 18 except for the shape and arrangement of the battery 70 and the control substrate 82. Thus, elements having substantially the same function as those in the first embodiment will be numbered the same here, and will not be described and/or illustrated again in detail here for the sake of brevity.

Figure 22:
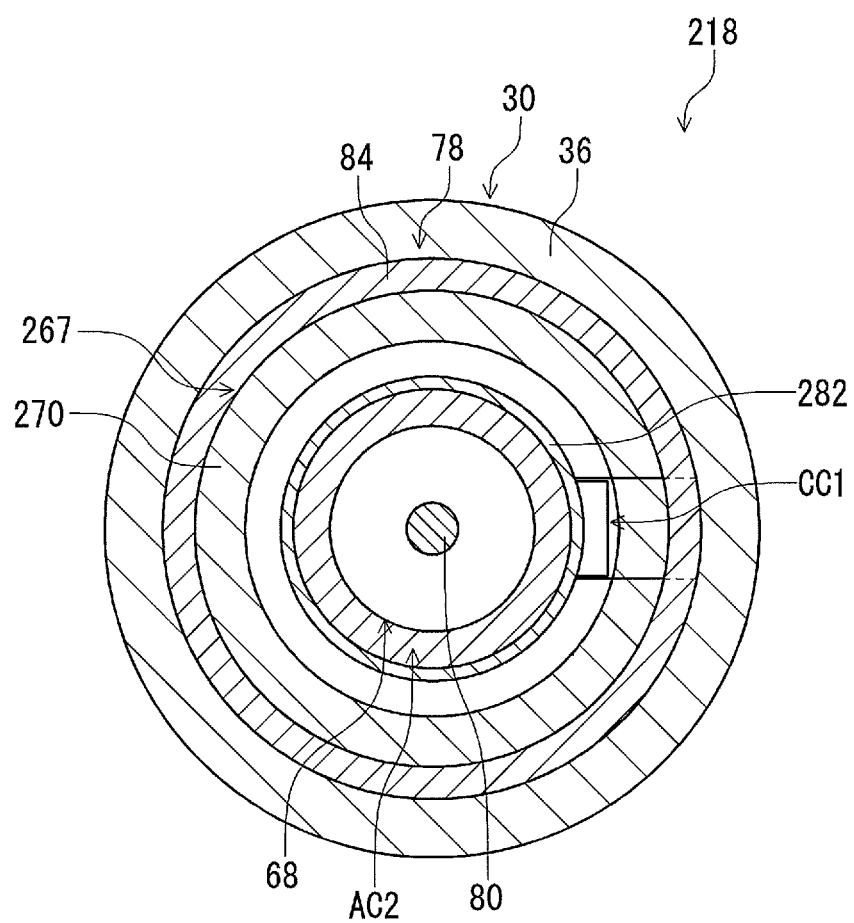
FIG. 22 is a cross-sectional view of an electrical seatpost assembly in accordance with a second embodiment.
Figure 23:
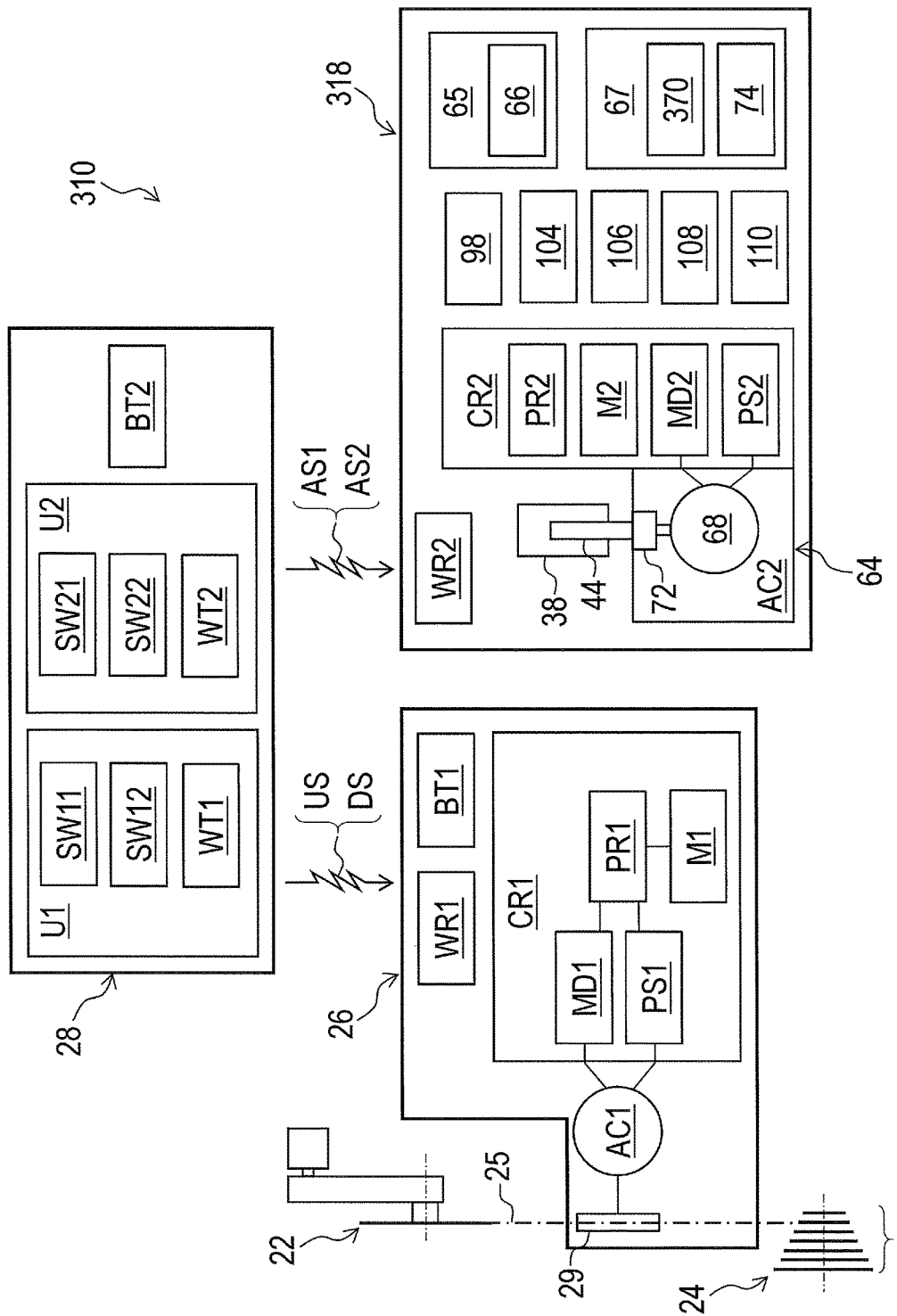
FIG. 23 is a block diagram of a bicycle in accordance with a third embodiment.

As seen in FIG. 22, the electrical seatpost assembly 218 comprises a power supply 267 and a control substrate 282. The power supply 267 includes a battery 270. The battery 270 has substantially the same function as that of the battery 70 of the first embodiment. The control substrate 282 has substantially the same function as that of the control substrate 82 of the first embodiment. However, the battery 270 has a tubular shape when viewed from the telescopic direction D1. The control substrate 282 has a tubular shape when viewed from the telescopic direction D1. The control substrate 282 is provided between the motor 68 and the battery 370. Since the control substrate 282 has the tubular shape, it is possible to effectively utilize an internal space of the first cylinder 30.

With the electrical seatpost assembly 218, it is possible to obtain substantially the same effects as those of the electrical seatpost assembly 18 in accordance with the first embodiment.

Third Embodiment

A bicycle 310 including an electrical seatpost assembly 318 in accordance with a third embodiment will be described below referring to FIGS. 23 to 26. The bicycle 310 has substantially the same structure and/or configuration as that of the bicycle 10 except for the arrangement of the power supply 67. Thus, elements having substantially the same function as those in the above embodiments will be numbered the same here, and will not be described and/or illustrated again in detail here for the sake of brevity.

Figure 24:
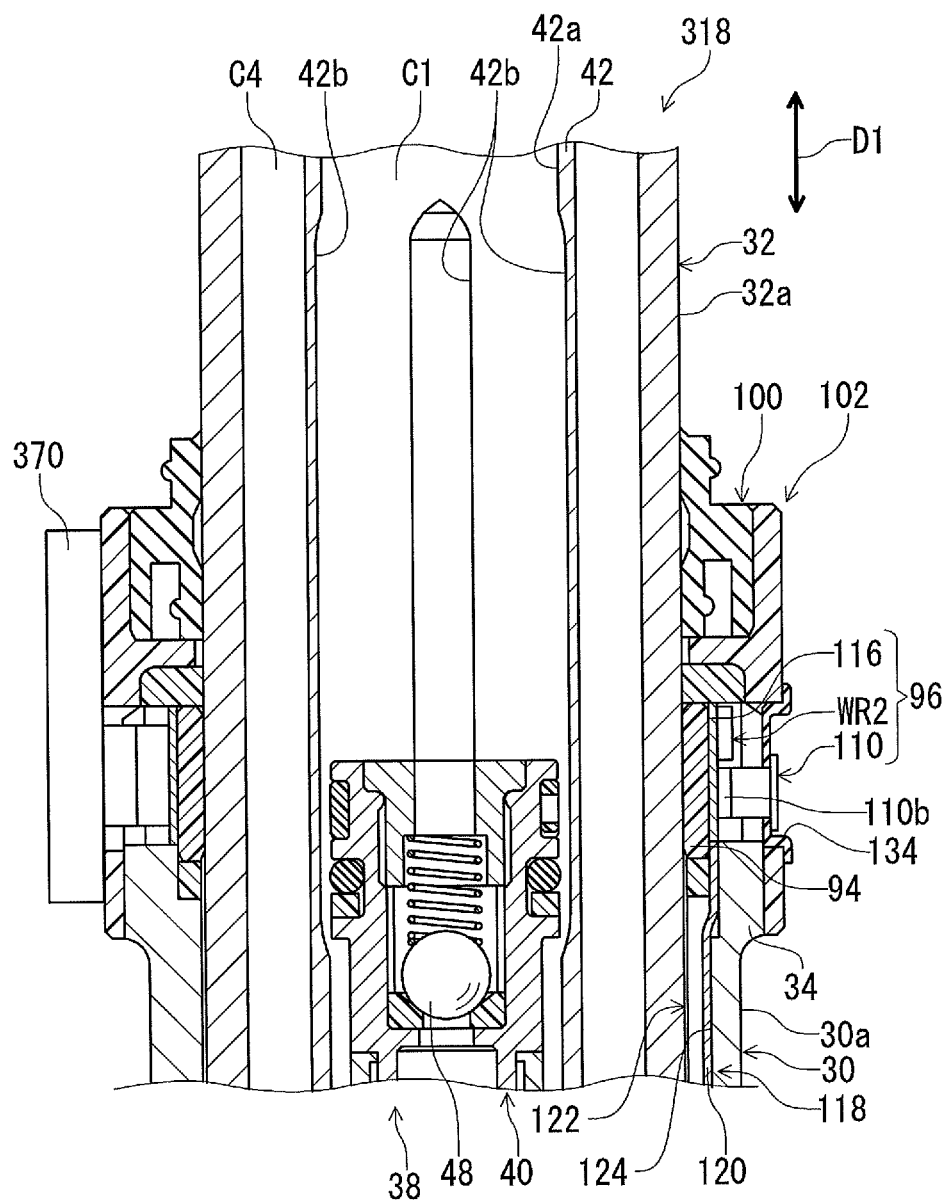
FIG. 24 is a partial cross-sectional view of an electrical seatpost assembly of the bicycle illustrated in FIG. 23.

As seen in FIGS. 23 to 26, in the electrical seatpost assembly 318, the electrical device 96 includes a battery 370. The battery 370 has substantially the same structure as that of the battery 70 of the first embodiment. As seen in FIG. 24, however, an upper end of the battery 370 is disposed above the lower end of the guide member 94 in the telescopic direction D1 in the mounting state where the first cylinder 30 is mounted to the bicycle frame 12. In this embodiment, the battery 370 is detachably attached to the cover member 102. The battery 370 is provided on the rear side of the cover member 102 in the mounting state.

Figure 25:
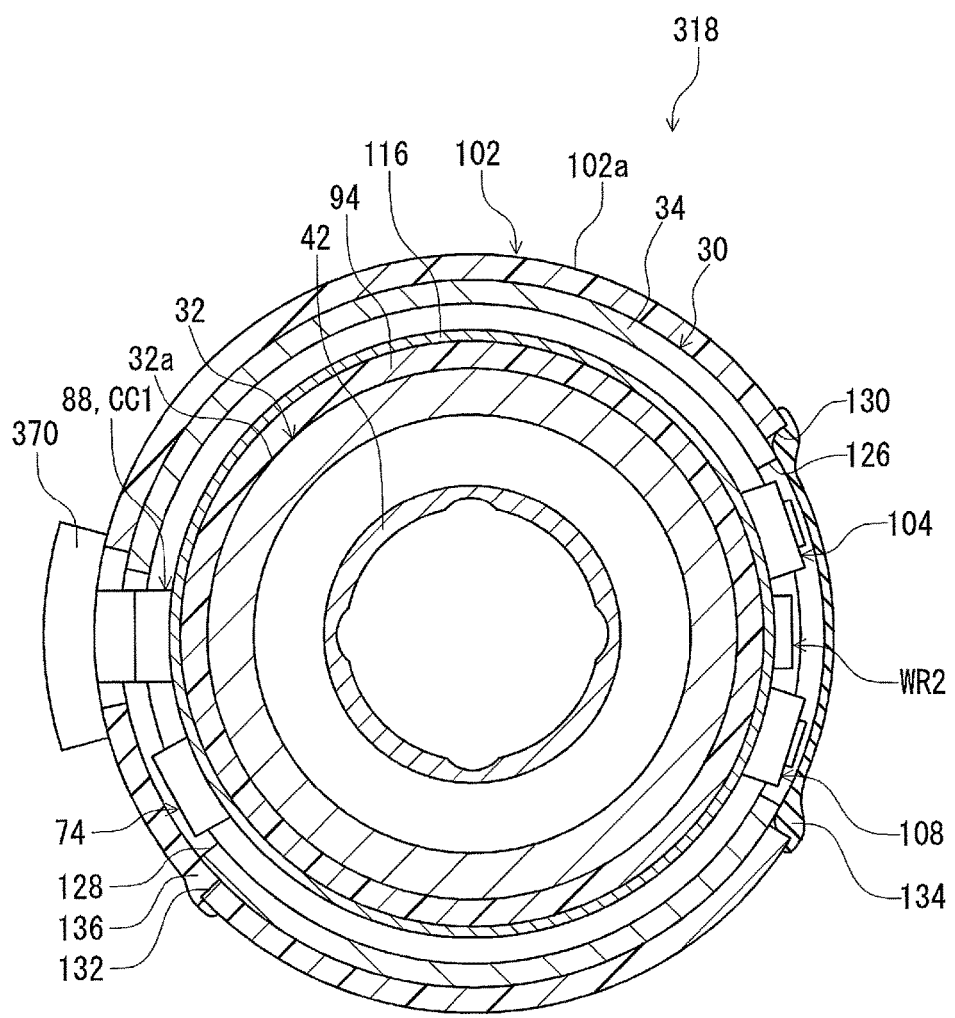
FIG. 25 is a cross-sectional view of the electrical seatpost assembly illustrated in FIG. 24.
Figure 26:
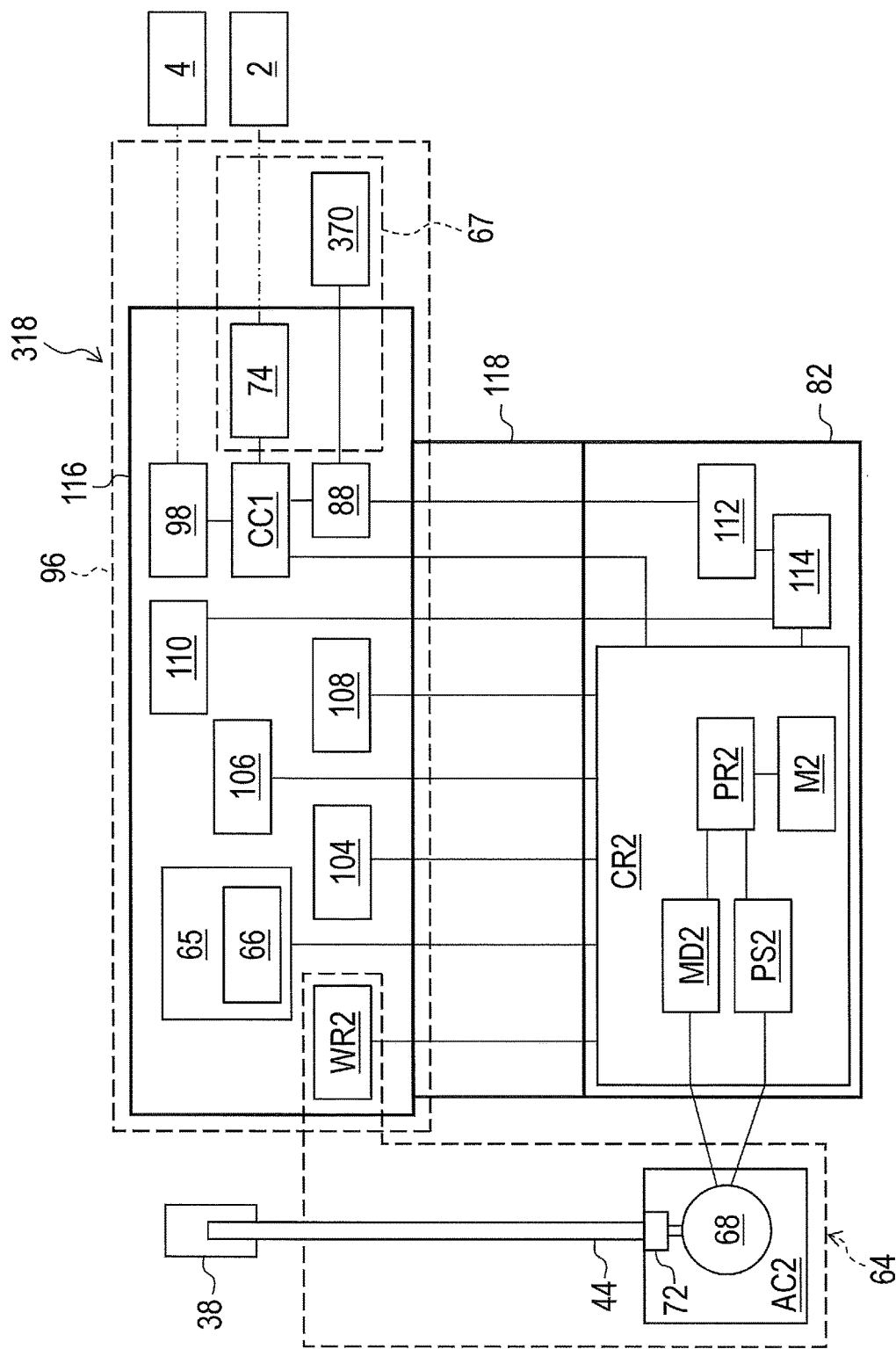
FIG. 26 is a block diagram of the electrical seatpost assembly illustrated in FIG. 24.

As seen in FIGS. 24 and 25, the electrical terminal 88 (the first terminal 90 and the second terminal 92) and the charging controller CC1 are mounted on the control substrate 116. The battery 370 is electrically and mechanically connected to the electrical terminal 88. As seen in FIG. 26, the electrical terminal 88 is electrically connected to the charging controller CC1 via the control substrate 116. The charging controller CC1 is electrically connected to the seatpost controller CR2 via the connecting part 118 and the control substrate 82.

With the bicycle 310 and the electrical seatpost assembly 318, it is possible to obtain substantially the same effects as those of the bicycle 10 and the electrical seatpost assembly 18 in accordance with the first embodiment.

Since the electrical device 96 includes the battery 370, it is possible to utilize a space disposed around the guide member 94 for the battery 370, allowing the electrical seatpost assembly 318 to be compact.

Since the battery 370 is detachably attached to the cover member 102, it is possible to detach and attach the battery 370 from and to the cover member 102 in the mounting state.

Furthermore, since the battery 370 is provided on the rear side of the cover member 102 in the mounting state, it is possible to utilize a space disposed around the rear side of the cover member 102 for the battery 370.

Fourth Embodiment

A bicycle 410 including an electrical seatpost assembly 418 in accordance with a fourth embodiment will be described below referring to FIGS. 27 and 28. The bicycle 410 has substantially the same structure and/or configuration as that of the bicycle 10 except for the power supply 67. Thus, elements having substantially the same function as those in the above embodiments will be numbered the same here, and will not be described and/or illustrated again in detail here for the sake of brevity.

Figure 27:
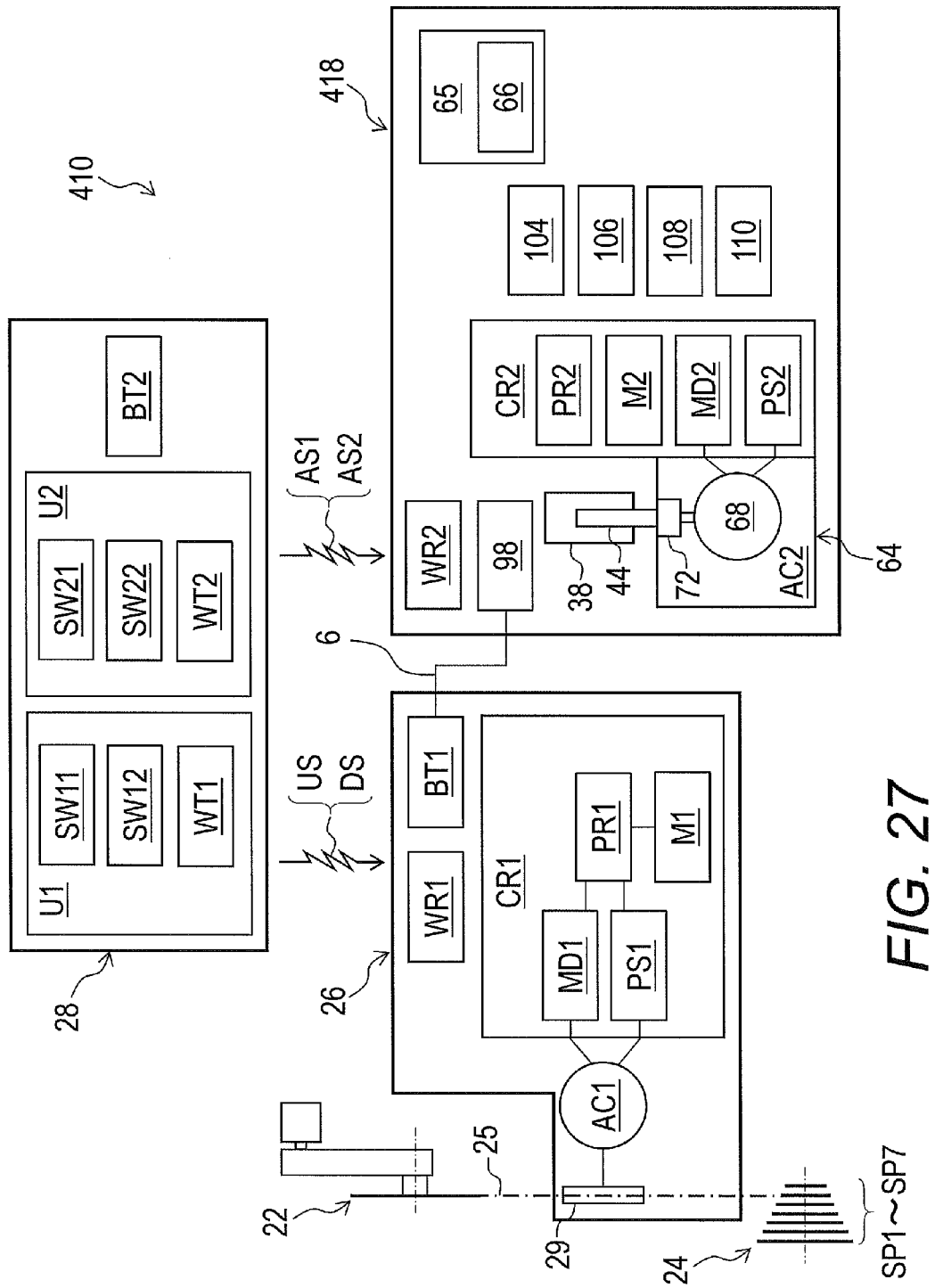
FIG. 27 is a block diagram of a bicycle in accordance with a fourth embodiment.
Figure 28:
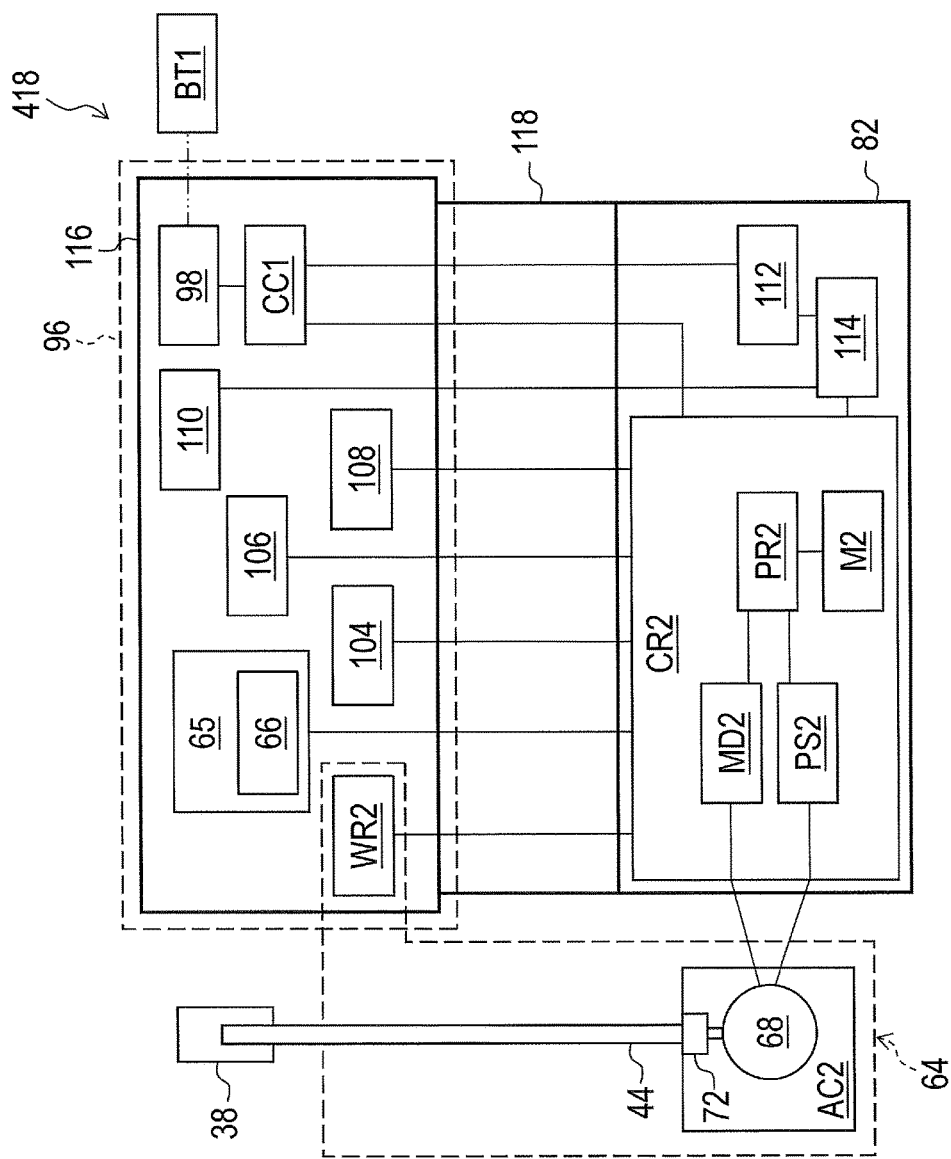
FIG. 28 is a block diagram of an electrical seatpost assembly of the bicycle illustrated in FIG. 27.

As seen in FIGS. 27 and 28, in the electrical seatpost assembly 418, the power receiving port 98 is electrically connected to the battery unit BT1 of the rear derailleur 26 via an electrical cable 6. The power supply 67 and the electrical terminal 88 are omitted from the electrical seatpost assembly 418. The electrical power is supplied from the battery unit BT1 to the electrical seatpost assembly 418 via the electrical cable 6 and the power receiving port 98. The battery unit BT1 is shared between the rear derailleur 26 and the electrical seatpost assembly 418. In this embodiment, the battery sensor 112 senses the remaining battery level of the battery unit BT1. The indication controller 114 controls the indicator 110 to indicate the remaining battery level of the battery unit BT1. The battery sensor 112 and the indication controller 114 can be omitted from the electrical seatpost assembly 418.

With the bicycle 410 and the electrical seatpost assembly 418, it is possible to obtain substantially the same effects as those of the bicycle 10 and the electrical seatpost assembly 18 in accordance with the first embodiment.

Fifth Embodiment

A bicycle 510 including an electrical seatpost assembly 518 in accordance with a sixteenth embodiment will be described below referring to FIGS. 29 and 30. The bicycle 510 has substantially the same structure and/or configuration as that of the bicycle 10 except for the electrical seatpost assembly 18 and the rear derailleur 26. Thus, elements having substantially the same function as those in the above embodiments will be numbered the same here, and will not be described and/or illustrated again in detail here for the sake of brevity.

Figure 29:
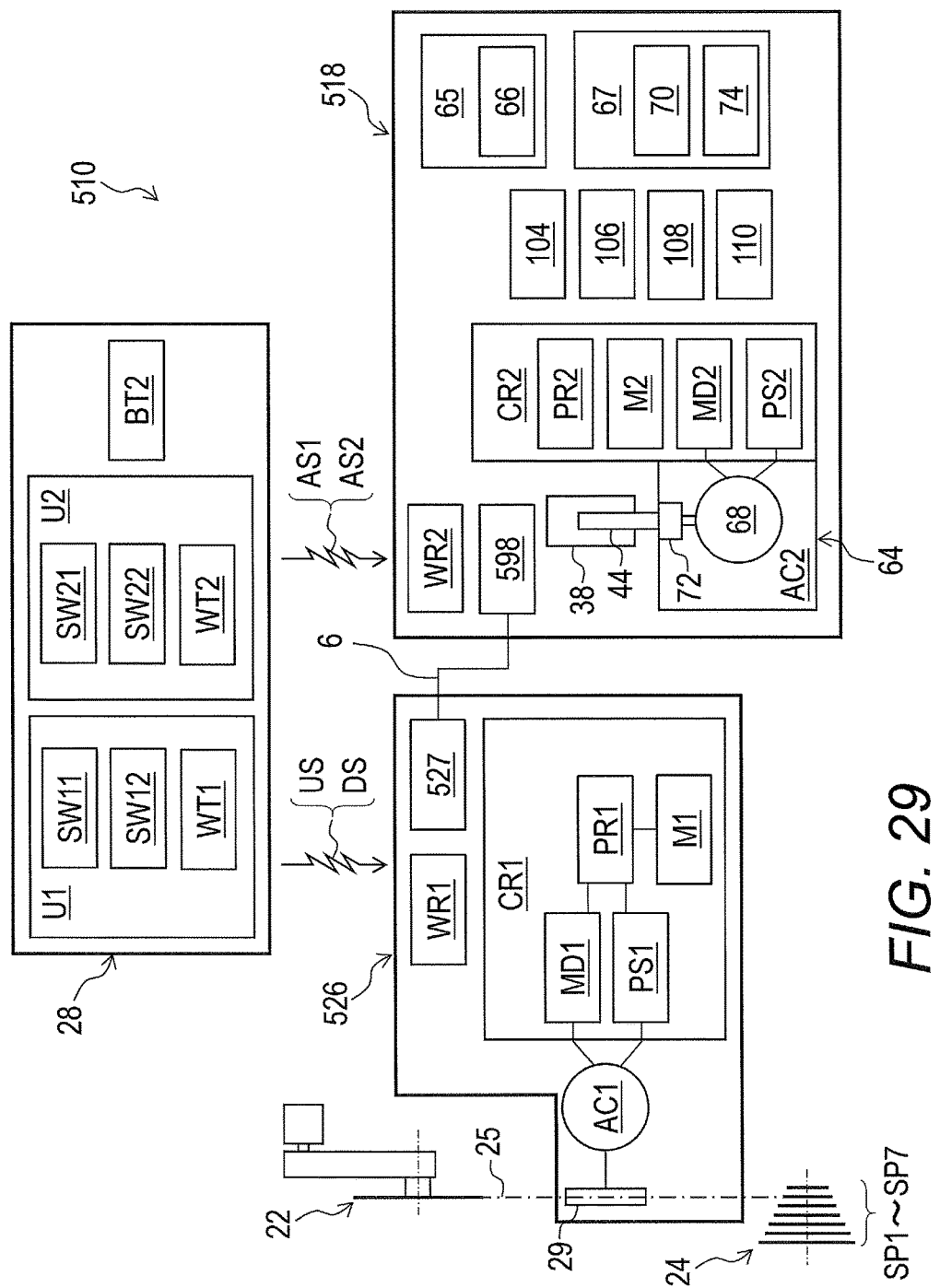
FIG. 29 is a block diagram of a bicycle in accordance with a fifth embodiment.
Figure 30:
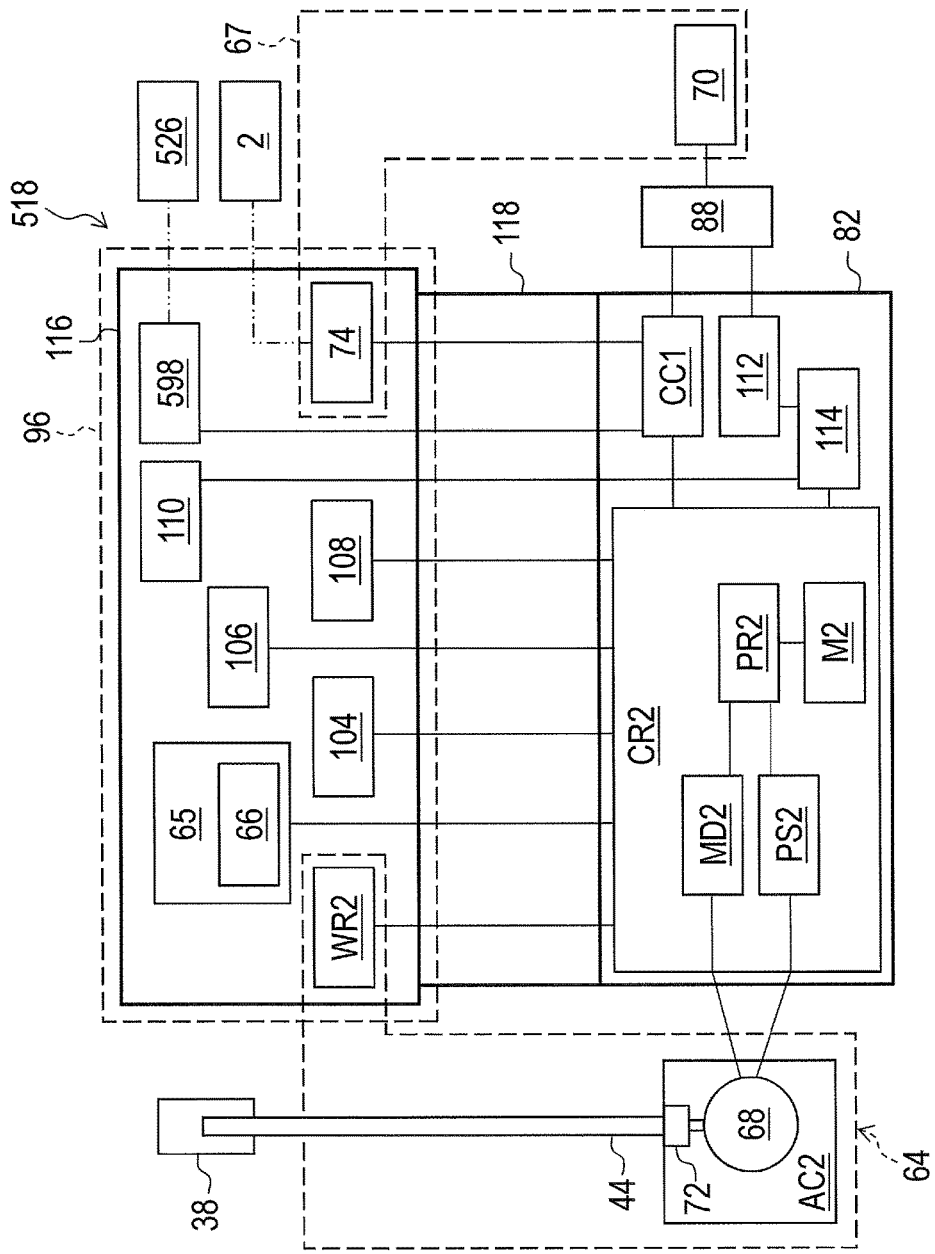
FIG. 30 is a block diagram of an electrical seatpost assembly of the bicycle illustrated in FIG. 29.

As seen in FIG. 29, the bicycle 510 comprises the electrical seatpost assembly 518 and a rear derailleur 526. The electrical seatpost assembly 518 has substantially the same structure as that of the electrical seatpost assembly 18 of the first embodiment. The rear derailleur 526 has substantially the same structure as that of the rear derailleur 26 of the first embodiment.

In the electrical seatpost assembly 518, the power supply 67 is configured to be detachably connected to an additional electrical bicycle component to supply electrical power to an additional electrical actuator of the additional electrical bicycle component. Examples of the additional electrical bicycle component includes the rear derailleur 526. Examples of the additional electrical actuator includes the shifting electrical actuator AC1 of the rear derailleur 526. In this embodiment, the power supply 67 is configured to be detachably connected to the rear derailleur 526 to supply electrical power to the shifting electrical actuator AC1 of the rear derailleur 526.

In this embodiment, the power supply 67 is configured to be detachably connected to the rear derailleur 526 to supply electrical power to the electrical shifting actuator AC1 of the rear derailleur 526. The rear derailleur 526 can also be referred to as the additional electrical bicycle component 526. The electrical shifting actuator AC1 can also be referred to as the additional electrical bicycle actuator AC1.

The power supply 67 is electrically connected to the rear derailleur 526 via the electrical cable 6. The power supply 67 supplies electrical power to the rear derailleur 526 via the electrical cable 6. The battery unit BT1 is omitted from the rear derailleur 526.

The electrical seatpost assembly 518 includes a power output port 598 electrically connected to the rear derailleur 526 via the electrical cable 6. The electrical cable 6 is detachably connected to the power output port 598. The power output port 598 is electrically connected to the charging controller CC1. The charging controller CC1 controls electrical power supplied to the rear derailleur 528.

The rear derailleur 526 includes a receiving port 527 electrically connected to the rear derailleur 526 via the electrical cable 6. The electrical cable 6 is detachably connected to the receiving port 527. The receiving port 527 is electrically connected to the shifting controller CR1, the wireless receiver WR1, and the shifting electrical actuator AC1.

With the bicycle 510 and the electrical seatpost assembly 518, it is possible to obtain substantially the same effects as those of the bicycle 10 and the electrical seatpost assembly 18 in accordance with the first embodiment.

Furthermore, it is possible to share the power supply 67 with the electrical actuator AC2 and the additional electrical bicycle component (e.g., the shifting electrical actuator AC1). This can simplify the bicycle system including the electrical seatpost assembly 518 and the additional electrical bicycle component (e.g., the rear derailleur 526). Furthermore, in a case where batteries are respectively mounted to the electrical seatpost assembly 18 and the additional electrical seatpost assembly, the sharing of the power supply 67 allows a battery of one of the electrical seatpost assembly 18 and the additional electrical bicycle component to be replaced with another battery of the other of the electrical seatpost assembly 18 and the additional electrical bicycle component when the battery of the one of the electrical seatpost assembly 18 and the additional electrical bicycle component is empty.

Sixth Embodiment

A bicycle 610 including an electrical seatpost assembly 618 in accordance with a sixth embodiment will be described below referring to FIGS. 31 and 32. The bicycle 610 has substantially the same structure and/or configuration as that of the bicycle 10 except for the power supply 67. Thus, elements having substantially the same function as those in the above embodiments will be numbered the same here, and will not be described and/or illustrated again in detail here for the sake of brevity.

Figure 31:
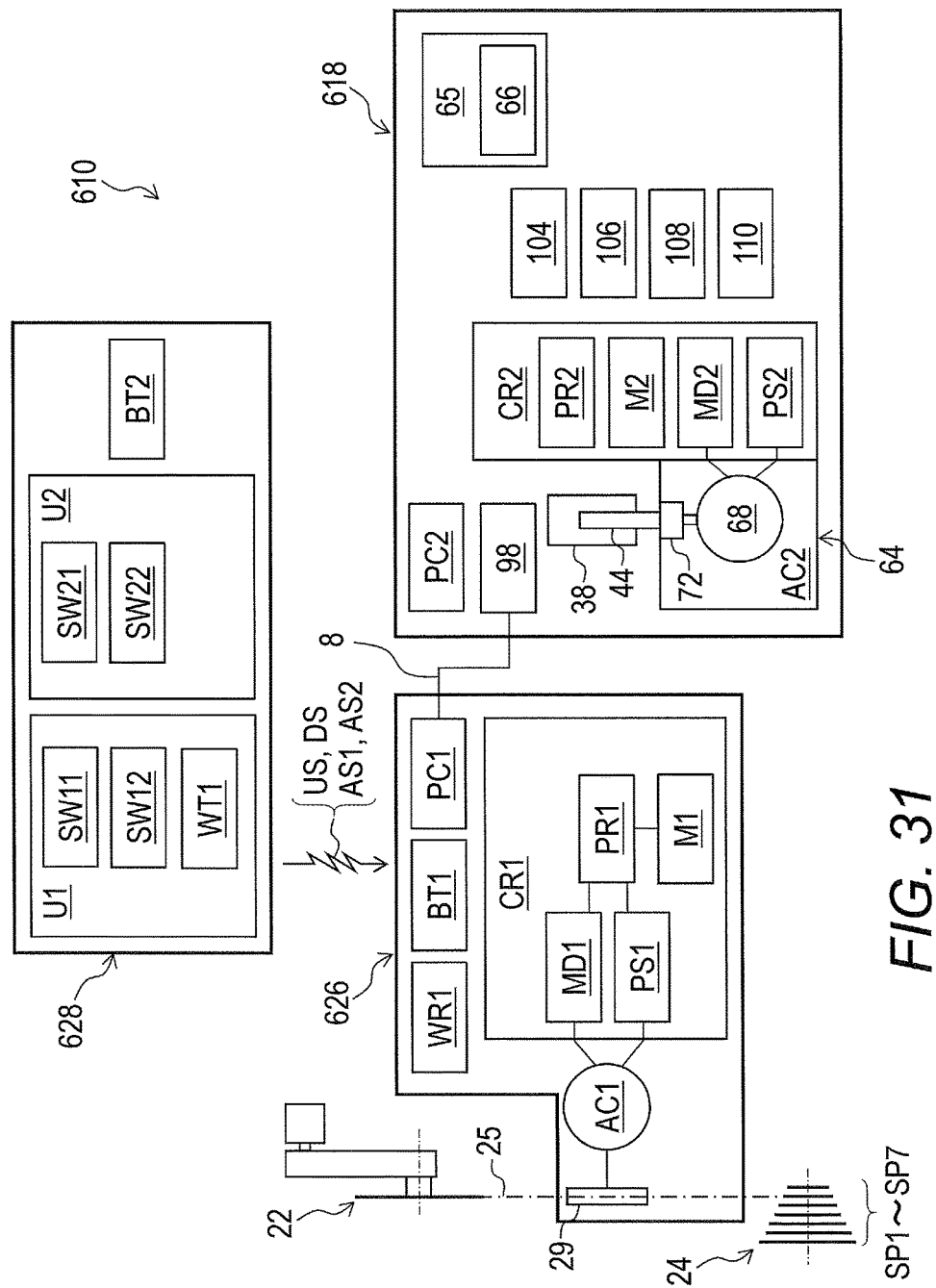
FIG. 31 is a block diagram of a bicycle in accordance with a sixth embodiment.
Figure 32:
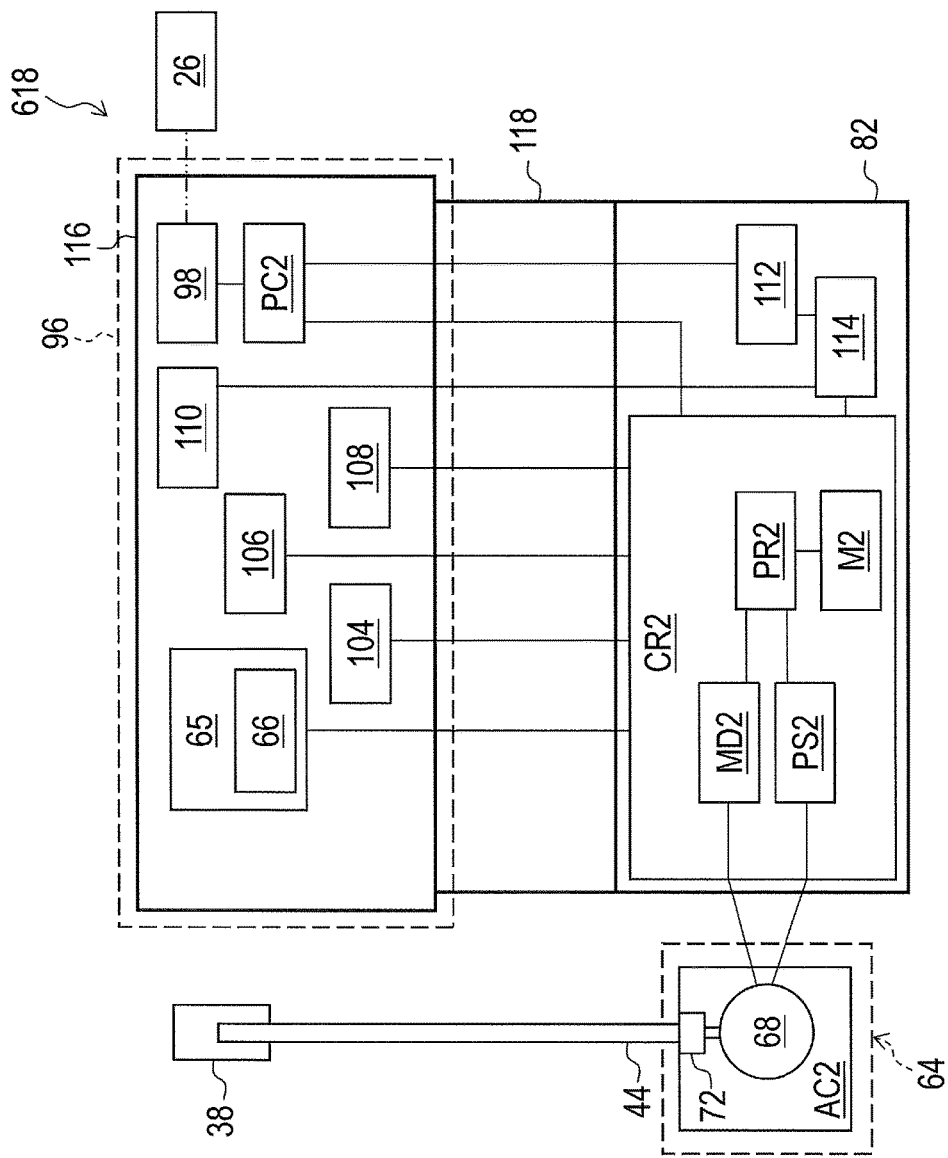
FIG. 32 is a block diagram of an electrical seatpost assembly of the bicycle illustrated in FIG. 31.

As seen in FIGS. 31 and 32, in the electrical seatpost assembly 618, the power receiving port 98 is electrically connected to the rear derailleur 26 via an electrical communication cable 8 using power line communication technology. Power line communication (PLC) carries data on a conductor that is also used simultaneously for electric power transmission or electric power distribution to the electric component. The rear derailleur 26 includes a first PLC controller PC1. The first PLC controller PC1 is electrically connected to the wireless receiver WR1 and the battery unit BT1. The first PLC controller PC1 receives the first adjustment signal AS1 and the second adjustment signal AS2 from the wireless receiver WR1. The first PLC controller PC1 superimposes the first adjustment signal AS1 or the second adjustment signal AS2 on a power source voltage flowing in the electrical communication cable 8.

As seen in FIG. 32, the electrical seatpost assembly 618 includes a second PLC controller PC2. The second PLC controller PC2 separates an input power source voltage into a power source voltage and control signals (the first adjustment signal AS1 and the second adjustment signal AS2). The second PLC controller PC2 regulates the power source voltage to a level at which various components of the electrical seatpost assembly 618 can properly operate. The second PLC controller PC2 outputs the control signals to the seatpost controller CR2. Thus, the first adjustment signal AS1 and the second adjustment signal AS2 are transmitted from the operating device 28 to the electrical seatpost assembly 618 via the rear derailleur 26.

With the bicycle 610 and the electrical seatpost assembly 618, it is possible to obtain substantially the same effects as those of the bicycle 10 and the electrical seatpost assembly 18 in accordance with the first embodiment.

Seventh Embodiment

A bicycle 710 in accordance with a seventh embodiment will be described below referring to FIG. 33. The bicycle 710 has substantially the same structure and/or configuration as that of the bicycle 10 except for the rear derailleur 26. Thus, elements having substantially the same function as those in the above embodiments will be numbered the same here, and will not be described and/or illustrated again in detail here for the sake of brevity.

Figure 33:
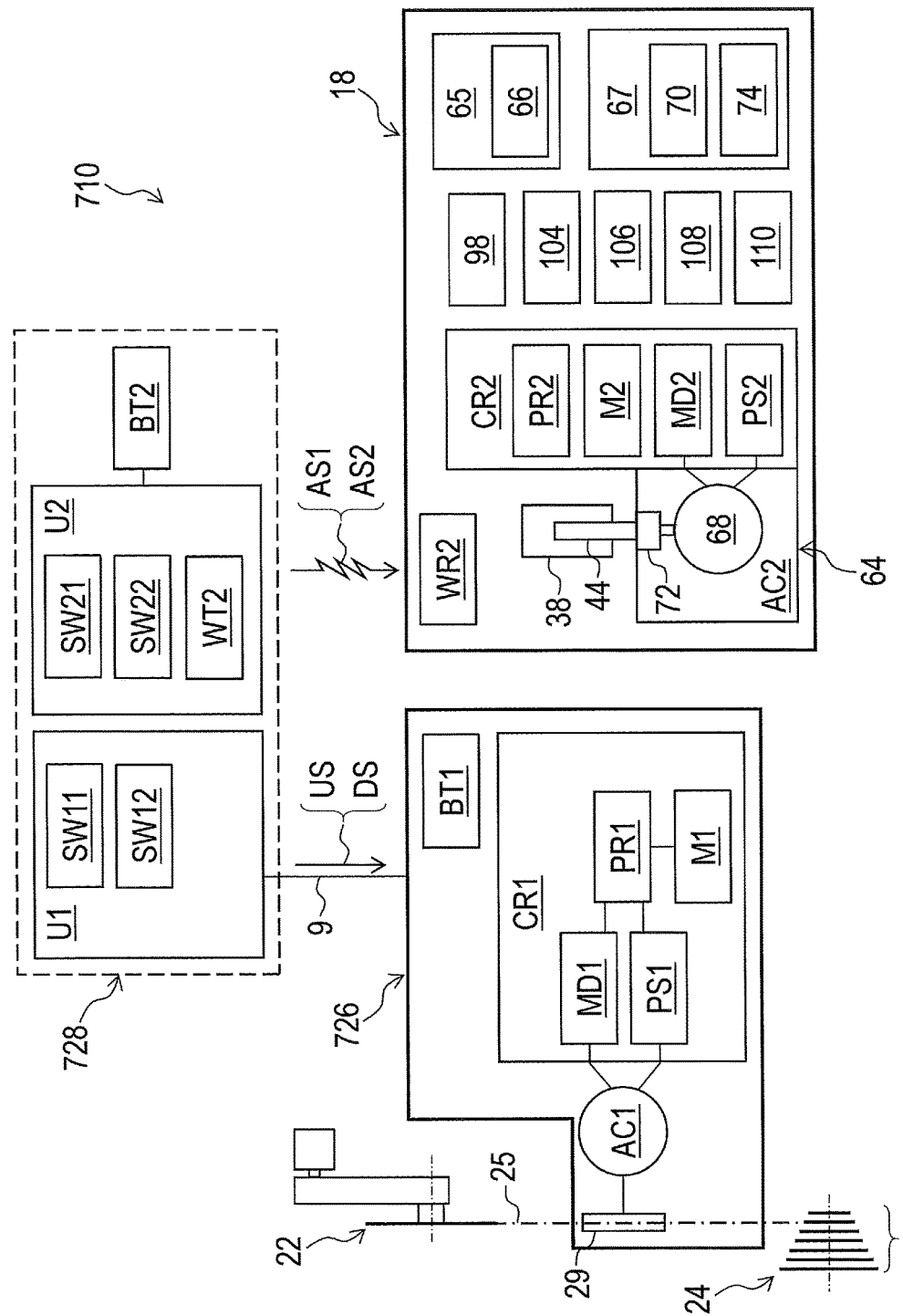
FIG. 33 is a block diagram of a bicycle in accordance with a seventh embodiment.

As seen in FIG. 33, the bicycle 710 comprises the electrical seatpost assembly 18, a rear derailleur 726, and an operating device 728. The rear derailleur 726 has substantially the same structure as that of the rear derailleur 26 of the first embodiment. The operating device 728 has substantially the same structure as that of the operating device 28 of the first embodiment. However, the rear derailleur 726 is electrically connected to the operating device 728 via an electrical cable 9. The upshifting signal US and the downshifting signal DS are transmitted from the operating device 728 to the rear derailleur 726 via the electrical cable 9. The wireless transmitter WT1 is omitted from the operating device 728, and the wireless receiver WR1 is omitted from the rear derailleur 726.

With the bicycle 710, it is possible to obtain substantially the same effects as those of the bicycle 10 in accordance with the first embodiment.

Eighth Embodiment

A bicycle 810 in accordance with an eighth embodiment will be described below referring to FIG. 34. The bicycle 810 has substantially the same structure and/or configuration as that of the bicycle 610 except for the rear derailleur 626 and the operating device 628. Thus, elements having substantially the same function as those in the above embodiments will be numbered the same here, and will not be described and/or illustrated again in detail here for the sake of brevity.

Figure 34:
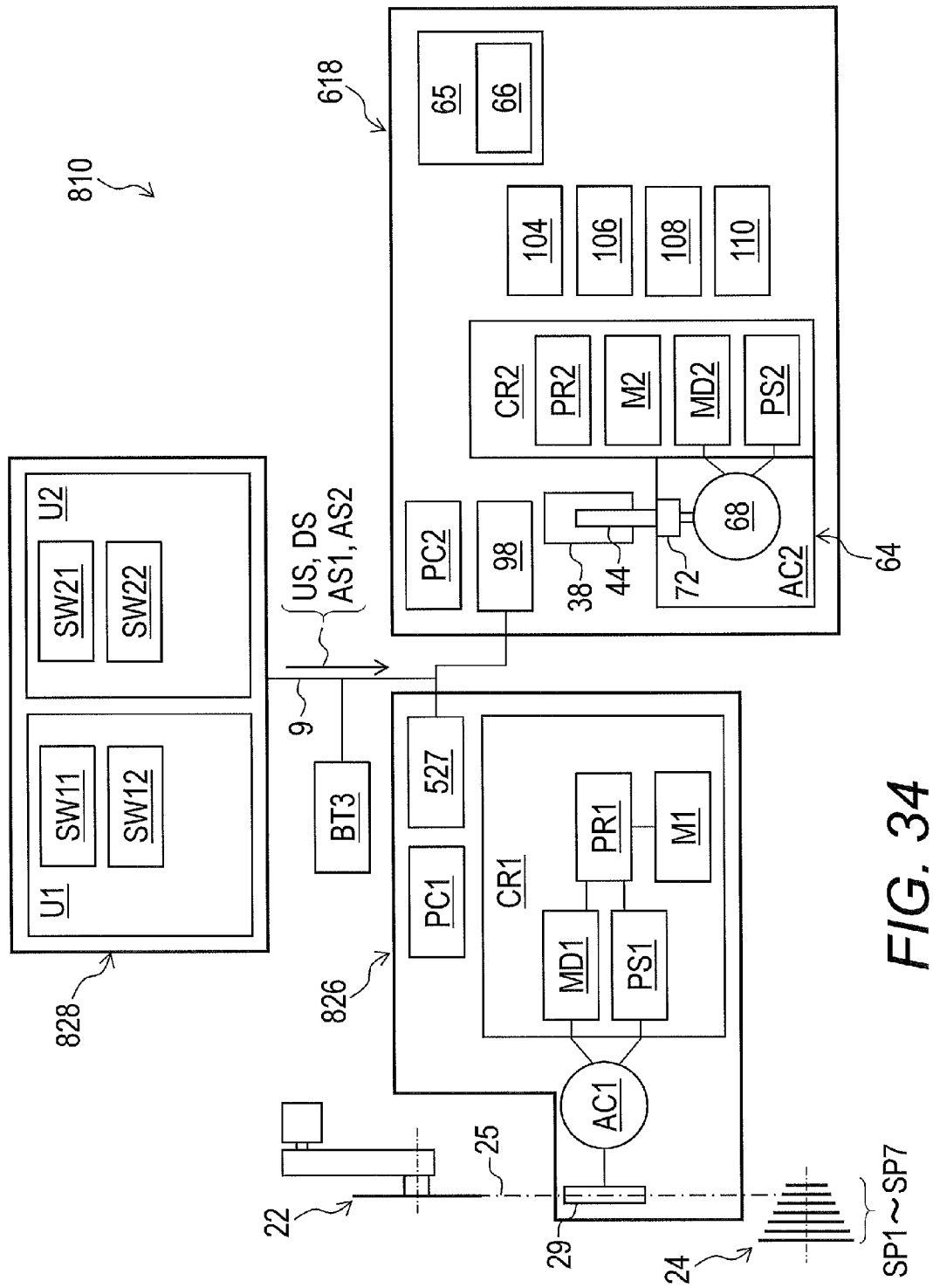
FIG. 34 is a block diagram of a bicycle in accordance with an eighth embodiment.

As seen in FIG. 34, the bicycle 810 comprises the electrical seatpost assembly 618, a rear derailleur 826, and an operating device 828. The rear derailleur 826 has substantially the same structure as that of the rear derailleur 26 of the first embodiment. The operating device 828 has substantially the same structure as that of the operating device 28 of the first embodiment. However, the electrical seatpost assembly 618, the rear derailleur 826, and the operating device 828 are electrically connected to each other via the electrical cable 9 using the PLC technology.

The wireless transmitters WT1 and WT2 are omitted from the operating device 828. The wireless receiver WR1 is omitted from the rear derailleur 826. The wireless receiver WR2 is omitted from the electrical seatpost assembly 618. The bicycle 810 includes a battery unit BT3. The battery unit BT3 is mounted to the bicycle frame 12 (FIG. 1). The battery unit BT3 is electrically connected to the electrical seatpost assembly 618, the rear derailleur 826, and the operating device 828 via the electrical cable 9. The battery unit BT2 is omitted from the operating device 828.

The rear derailleur 826 includes the receiving port 527 of the fifth embodiment and the first PLC controller PC1 of the sixth embodiment. The receiving port 527 is electrically connected to the shifting controller CR1, the first PLC controller PC1, and the shifting electrical actuator AC1.

Electrical power is supplied from the battery unit BT2 to the electrical seatpost assembly 618, the rear derailleur 826, and the operating device 828 via the electrical communication cable 8 using the PLC technology. Command signals are transmitted from the operating device 828 to the electrical seatpost assembly 618 and the rear derailleur 826 via the electrical communication cable 8 using the PLC technology.

With the bicycle 810, it is possible to obtain substantially the same effects as those of the bicycle 610 in accordance with the sixth embodiment.

Ninth Embodiment

An electrical seatpost assembly 918 in accordance with a ninth embodiment will be described below referring to FIGS. 35 and 36. The electrical seatpost assembly 918 has substantially the same structure and/or configuration as that of the electrical seatpost assembly 18 except for the arrangement of the charging port 74. Thus, elements having substantially the same function as those in the above embodiments will be numbered the same here, and will not be described and/or illustrated again in detail here for the sake of brevity.

Figure 35:
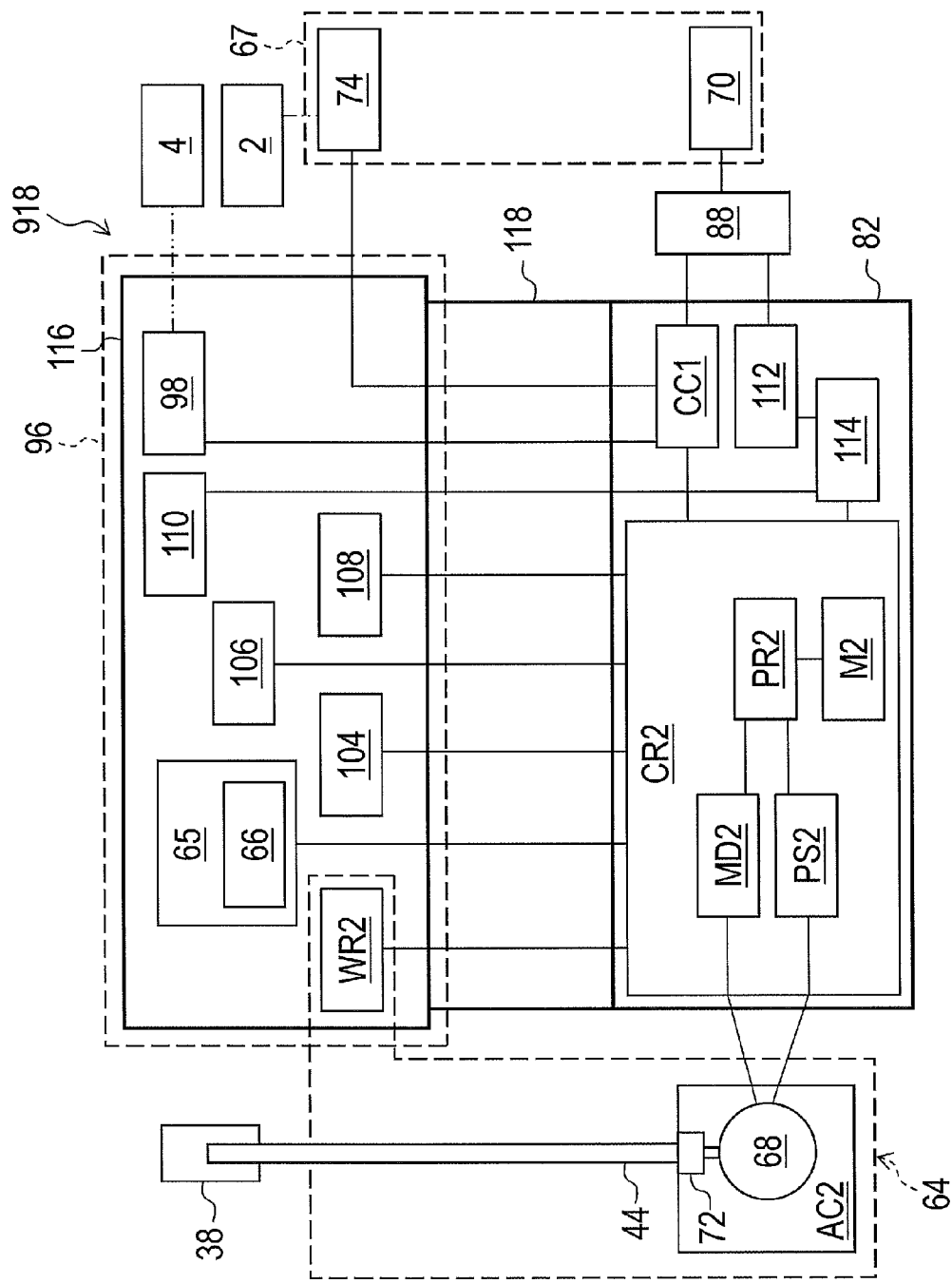
FIG. 35 is a block diagram of an electrical seatpost assembly in accordance with a ninth embodiment.
Figure 36:
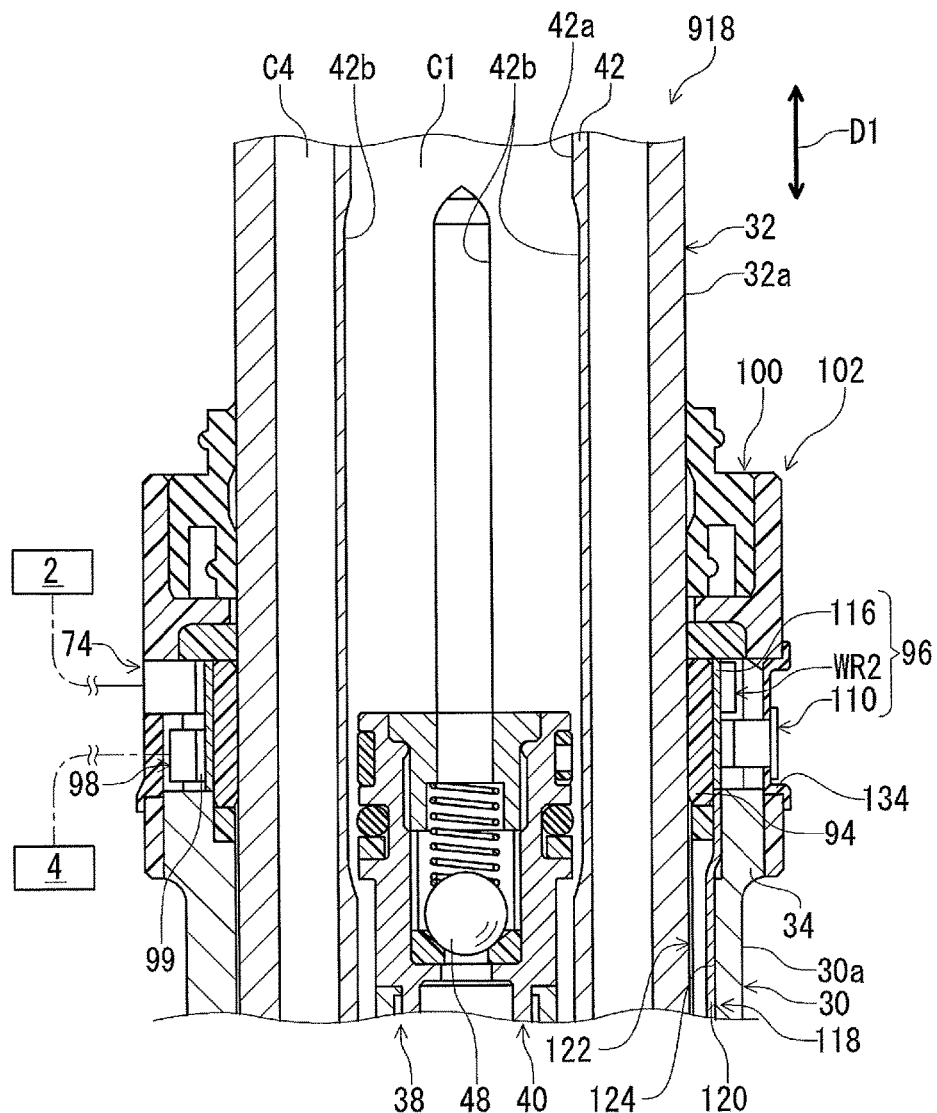
FIG. 36 is a cross-sectional view of the electrical seatpost assembly illustrated in FIG. 35.

As seen in FIGS. 35 and 36, in the electrical seatpost assembly 918, the cover member 102 includes the charging port 74 to receive electrical power to charge the battery 70. Specifically, the charging port 74 is mounted to the cover member 102. The charging port 74 is electrically connected to the charging controller CC1.

With the electrical seatpost assembly 918, it is possible to obtain substantially the same effects as those of the electrical seatpost assembly 18 in accordance with the first embodiment.

Tenth Embodiment

An electrical seatpost assembly 1018 in accordance with a tenth embodiment will be described below referring to FIGS. 37 to 39. The electrical seatpost assembly 1018 has substantially the same structure and/or configuration as that of the electrical seatpost assembly 18 except for the arrangement of the charging port 74. Thus, elements having substantially the same function as those in the above embodiments will be numbered the same here, and will not be described and/or illustrated again in detail here for the sake of brevity.

Figure 37:
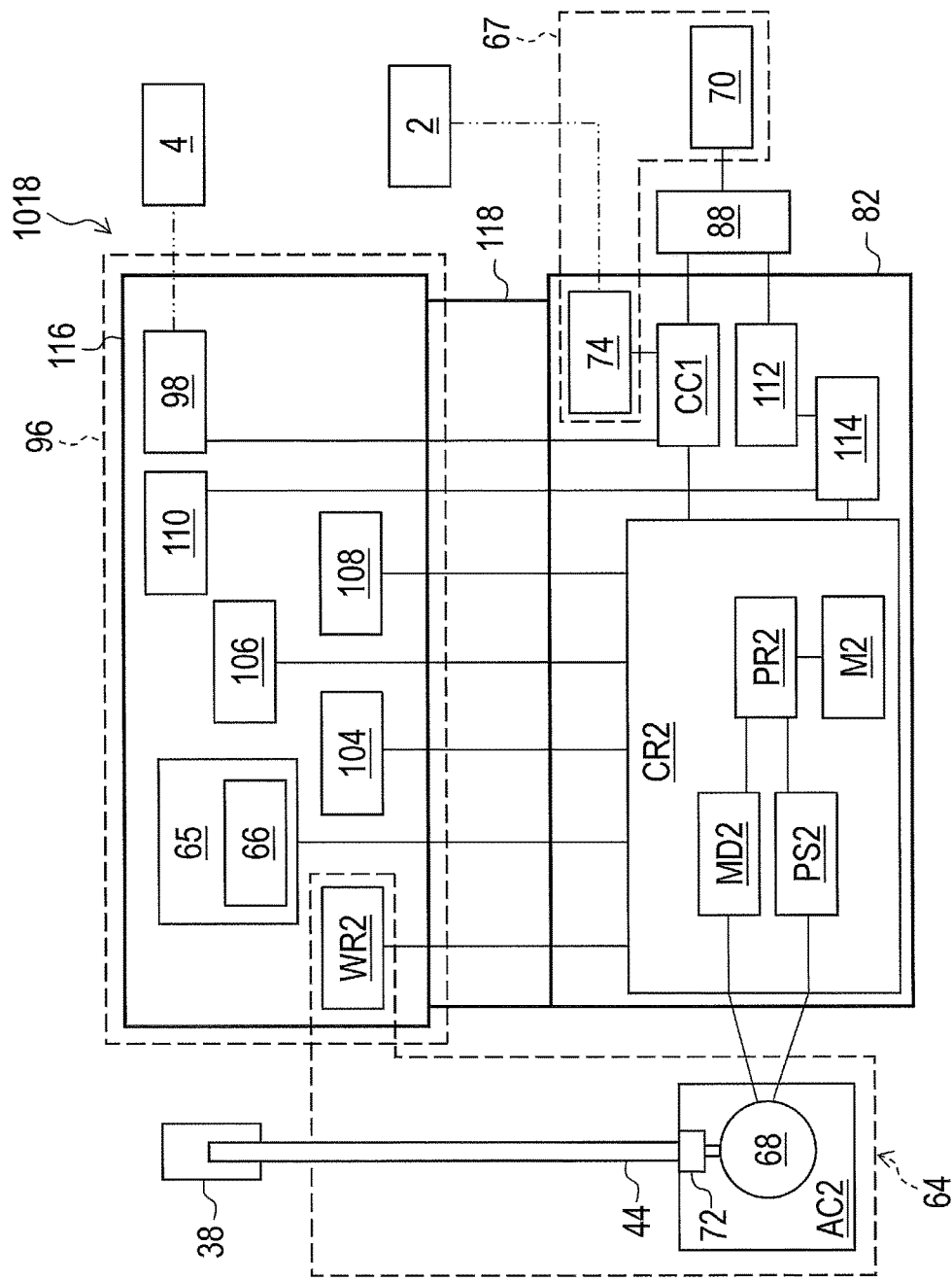
FIG. 37 is a block diagram of an electrical seatpost assembly in accordance with a tenth embodiment.
Figure 38:
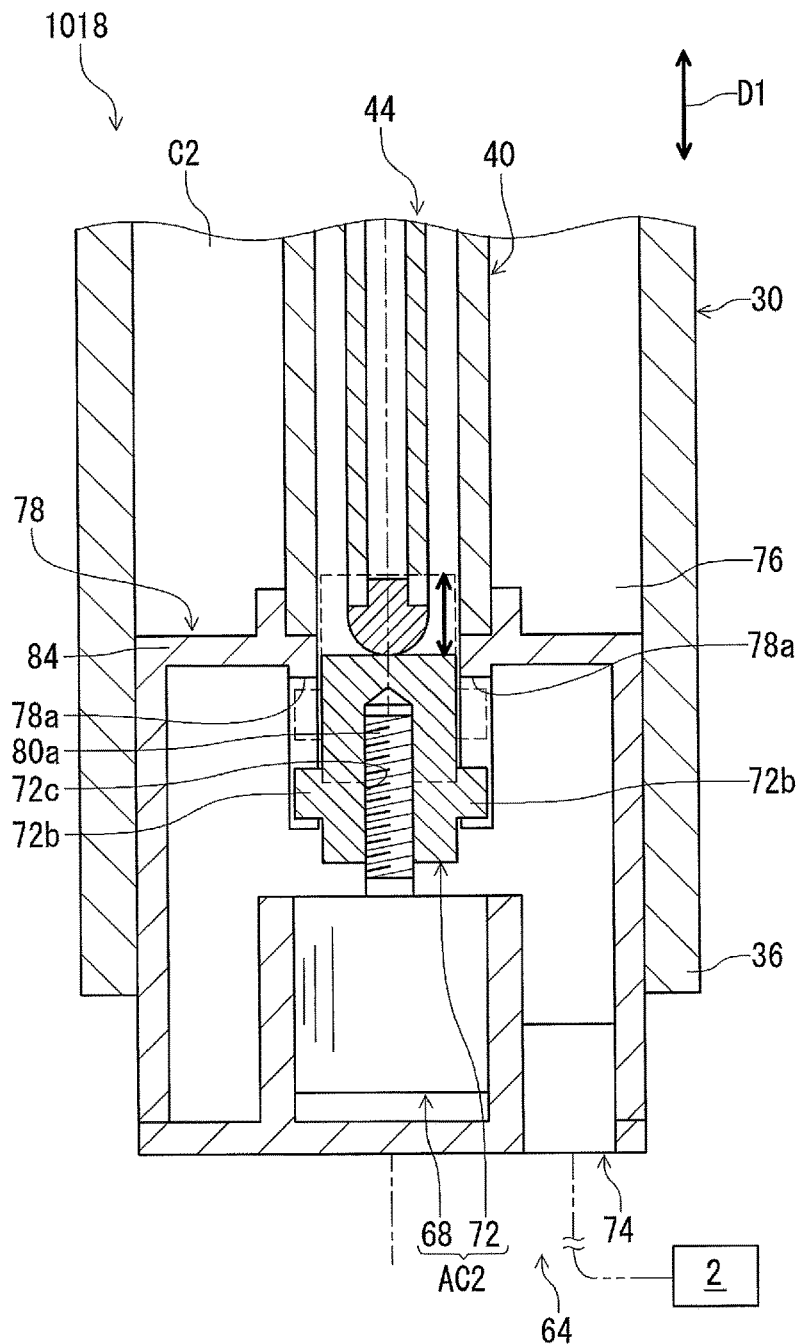
FIG. 38 is a cross-sectional view of the electrical seatpost assembly illustrated in FIG. 37.
Figure 39:
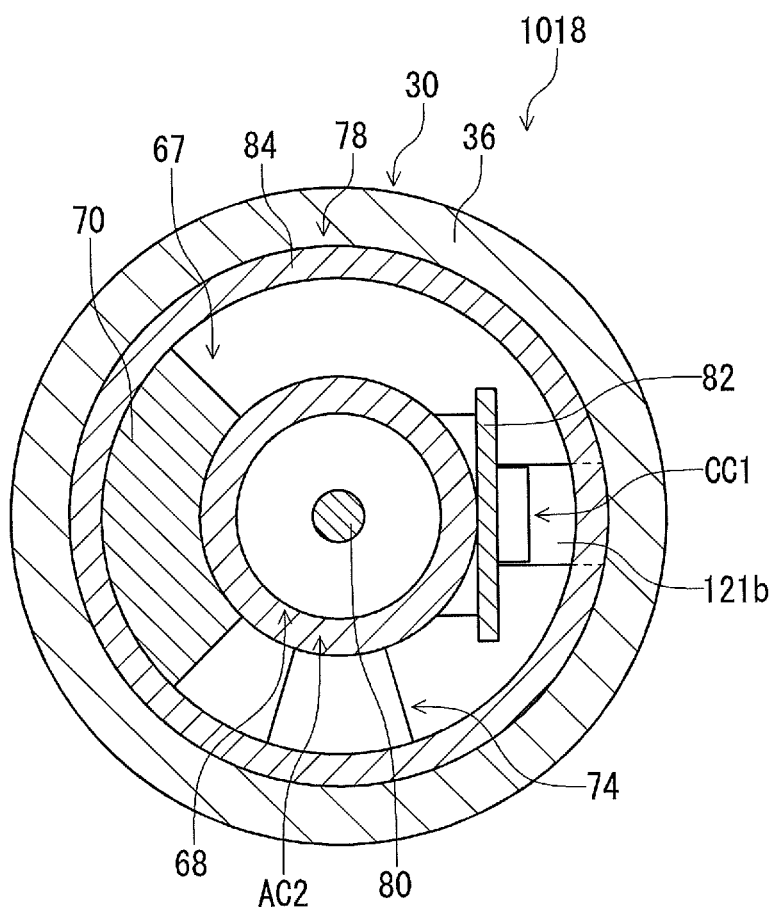
FIG. 39 is a cross-sectional view of the electrical seatpost assembly illustrated in FIG. 38.

As seen in FIGS. 37 to 39, in the electrical seatpost assembly 1018, the charging port 74 is provided at the second end 36 of the first cylinder 30. Since the charging port 74 is provided at the second end 36 of the first cylinder 30, it is possible to utilize the second end 36 of the first cylinder 30 as a space for the charging port 74.

With the electrical seatpost assembly 1018, it is possible to obtain substantially the same effects as those of the electrical seatpost assembly 18 in accordance with the first embodiment.

Eleventh Embodiment

A bicycle 1110 including an electrical seatpost assembly 1118 in accordance with an eleventh embodiment will be described below referring to FIGS. 40 to 42. The bicycle 1110 has substantially the same structure and/or configuration as that of the bicycle 10 except for the charging port 74. Thus, elements having substantially the same function as those in the above embodiments will be numbered the same here, and will not be described and/or illustrated again in detail here for the sake of brevity.

Figure 40:
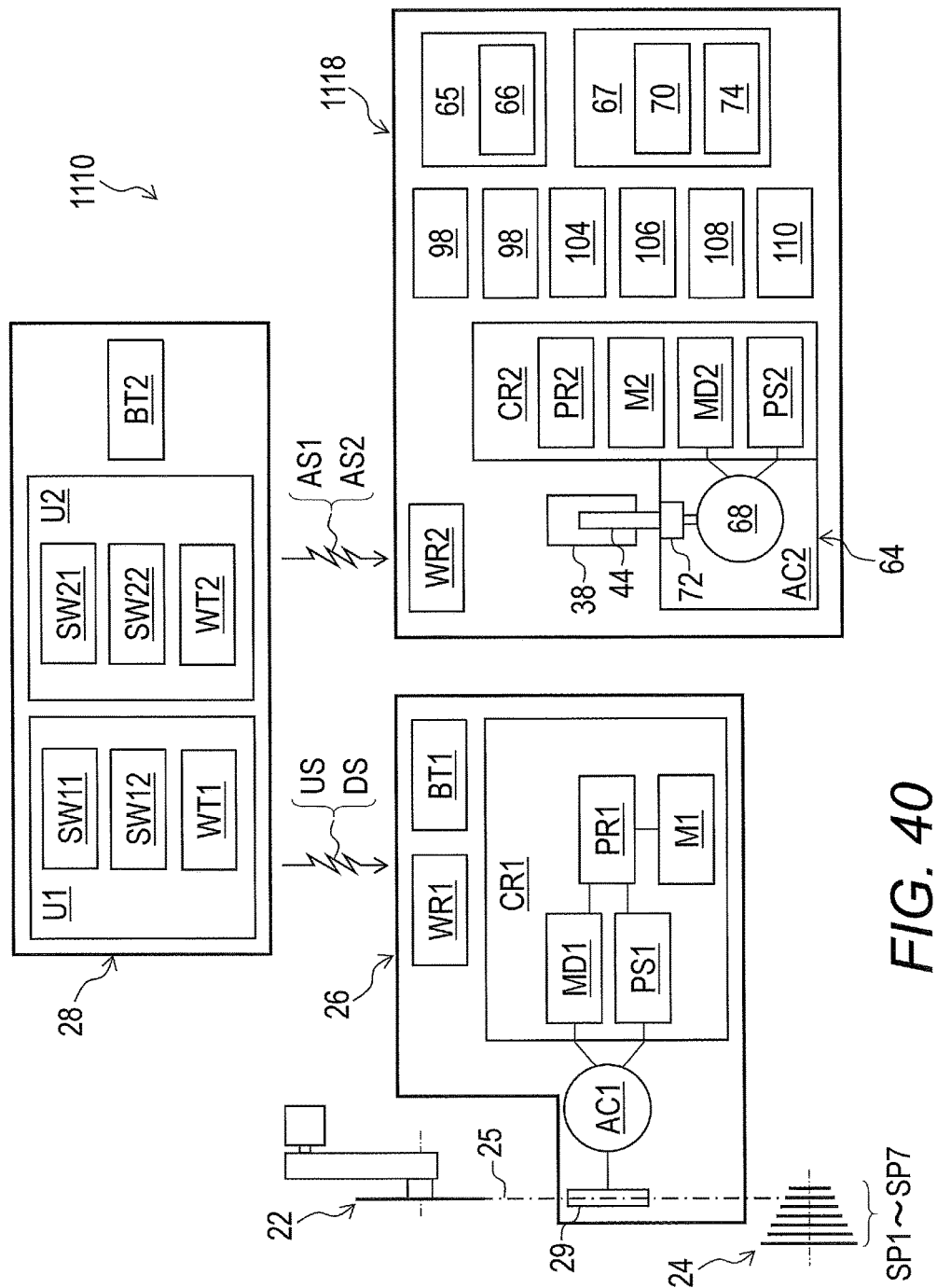
FIG. 40 is a block diagram of a bicycle in accordance with an eleventh embodiment.
Figure 41:
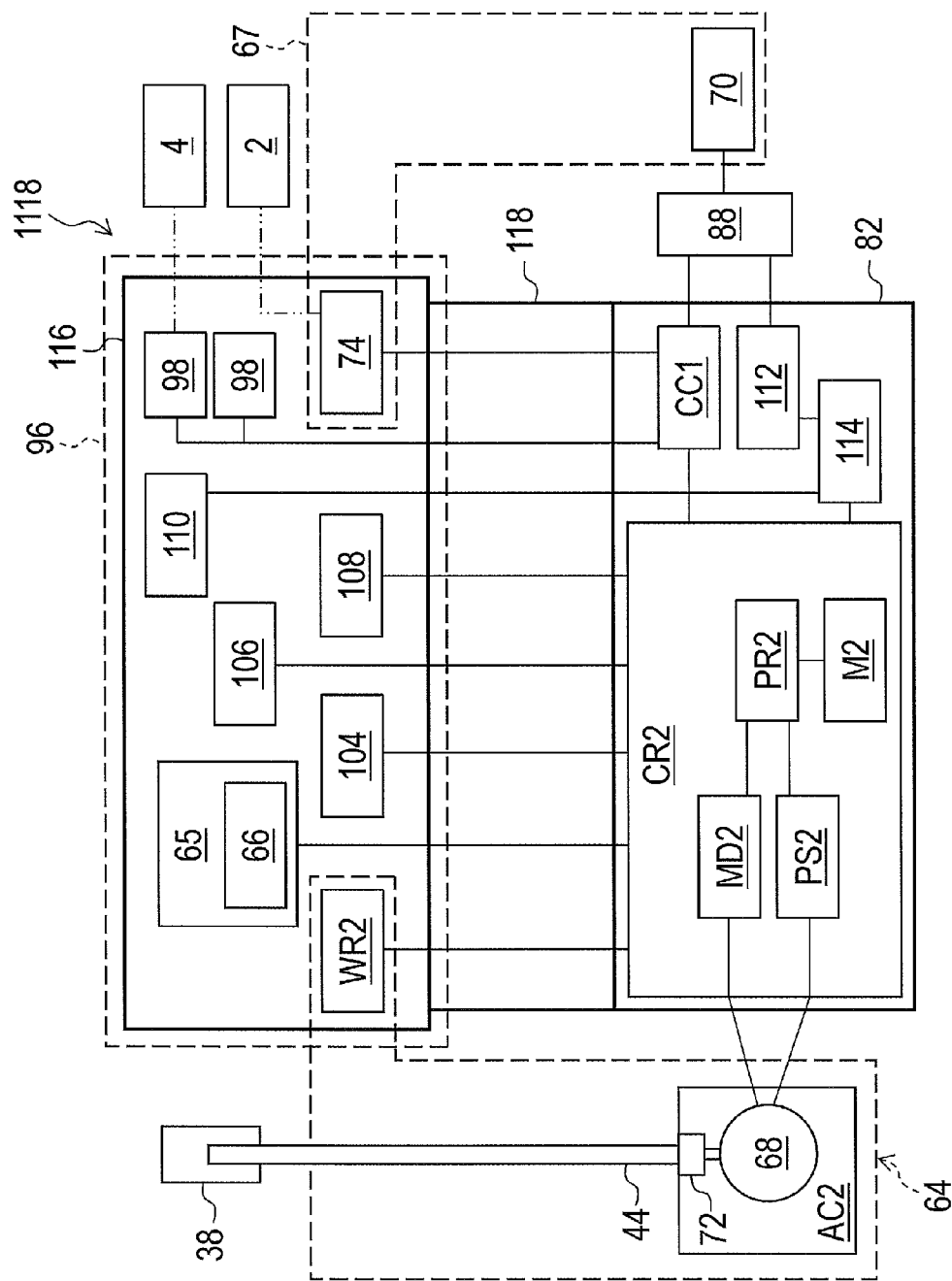
FIG. 41 is a block diagram of an electrical seatpost assembly of the bicycle illustrated in FIG. 40.
Figure 42:
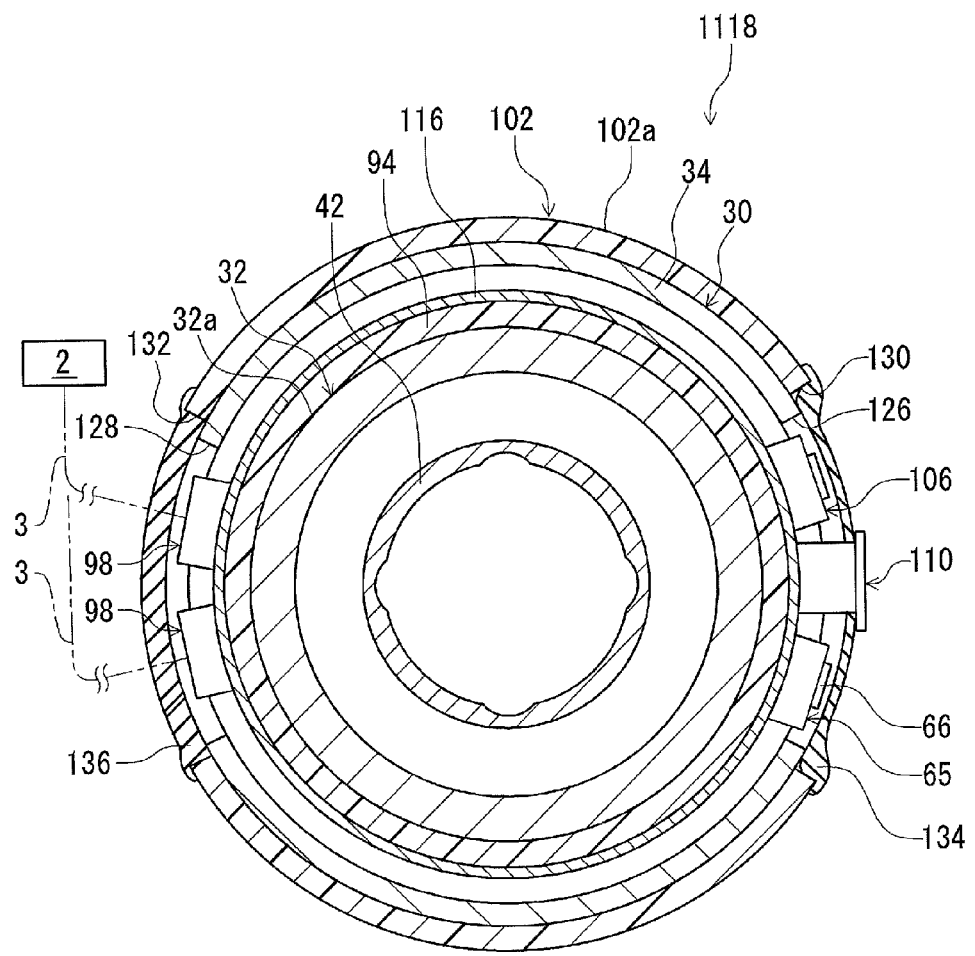
FIG. 42 is a cross-sectional view of the electrical seatpost assembly illustrated in FIG. 41.

As seen in FIGS. 40 to 42, in the electrical seatpost assembly 1118, the at least one power receiving port 98 includes a plurality of power receiving ports 98. In this embodiment, the at least one power receiving port 98 includes two power receiving ports 98. The plurality of power receiving ports 98 are spaced apart from each other in the circumferential direction D2 of the first cylinder 30. Accordingly, the plurality of power receiving ports 98 allow the user to select a preferable port among the plurality of power receiving ports 98. This allows the user to select a preferable route of an electrical cable 3.

With the bicycle 1110 and the electrical seatpost assembly 1118, it is possible to obtain substantially the same effects as those of the bicycle 10 and the electrical seatpost assembly 18 in accordance with the first embodiment.

Twelfth Embodiment

An electrical seatpost assembly 1218 in accordance with a twelfth embodiment will be described below referring to FIGS. 43 to 45. The electrical seatpost assembly 1218 has substantially the same structure and/or configuration as that of the electrical seatpost assembly 18 except for a configuration to operate the indicator 110. Thus, elements having substantially the same function as those in the above embodiments will be numbered the same here, and will not be described and/or illustrated again in detail here for the sake of brevity.

Figure 43:
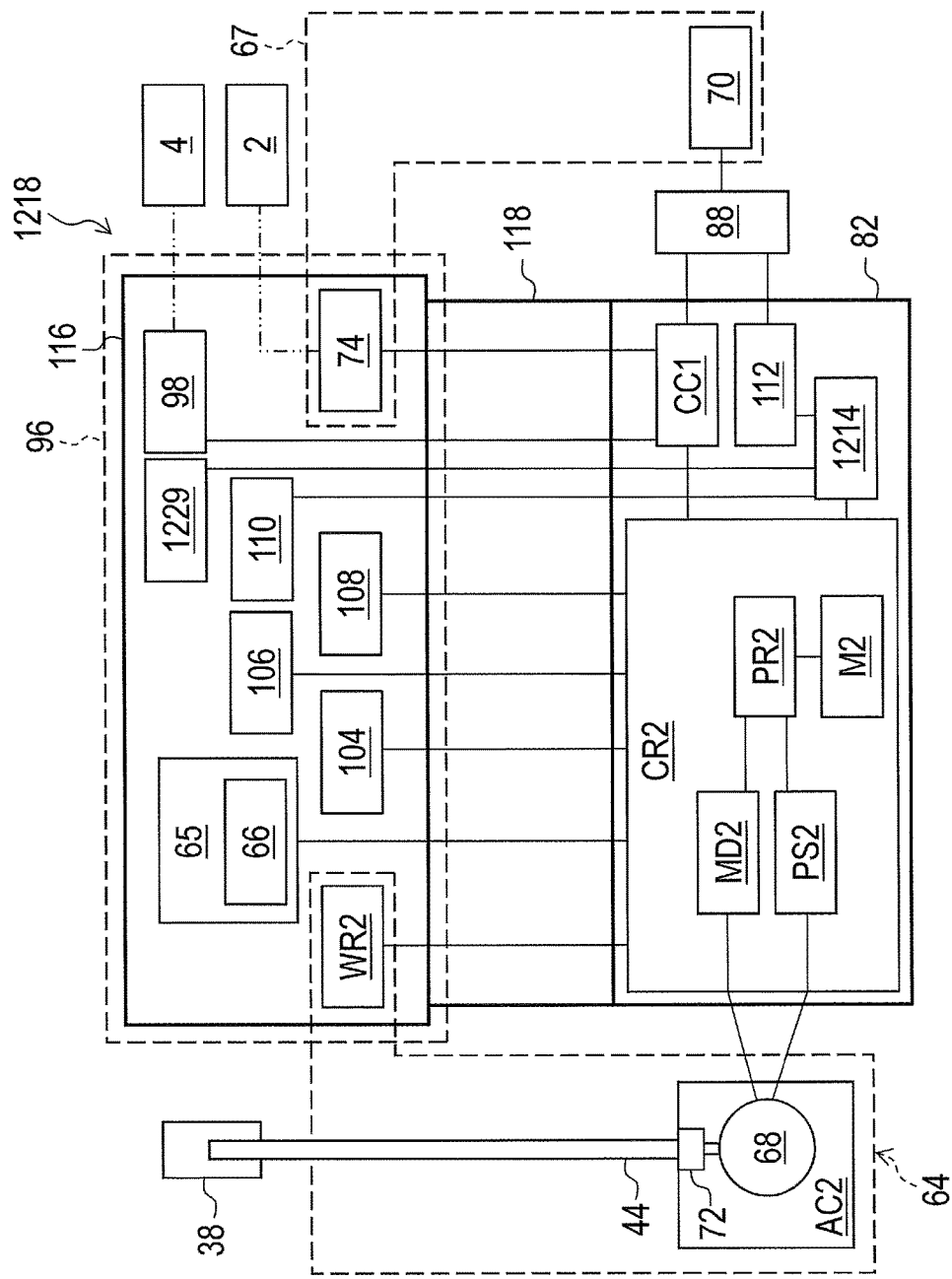
FIG. 43 is a block diagram of an electrical seatpost assembly in accordance with a twelfth embodiment.

As seen in FIG. 43, the electrical seatpost assembly 1218 further comprises an indication operating device 1229 to generate the indication command signal. The indicator 110 indicates the remaining battery level of the battery 70 when the indicator 110 receives the indication command signal. In this embodiment, the indication operating device 1229 is a switch to generate the indication command signal when operated by the user. The indication operating device 1229 maintains the indication command signal while the indication operating device 1229 is operated by the user.

The electrical seatpost assembly 1218 includes an indication controller 1214. The indication controller 1214 controls the indicator 110 to indicate the remaining battery level of the battery 70 based on the indication command signal. The indication controller 1214 is electrically connected to the indicator 110, the indication operating device 1229, and the electrical actuator AC2. The indication controller 1214 senses the indication command signal generated by the indication operating device 1229. The indication controller 1214 controls the indicator 110 to indicate the remaining battery level of the battery 70 when the indication controller 1214 senses the indication command signal. The indication controller 1214 controls the indicator 110 to keep indicating the remaining battery level of the battery 70 while the indication operating device 1229 is operated by the user.

Figure 44:
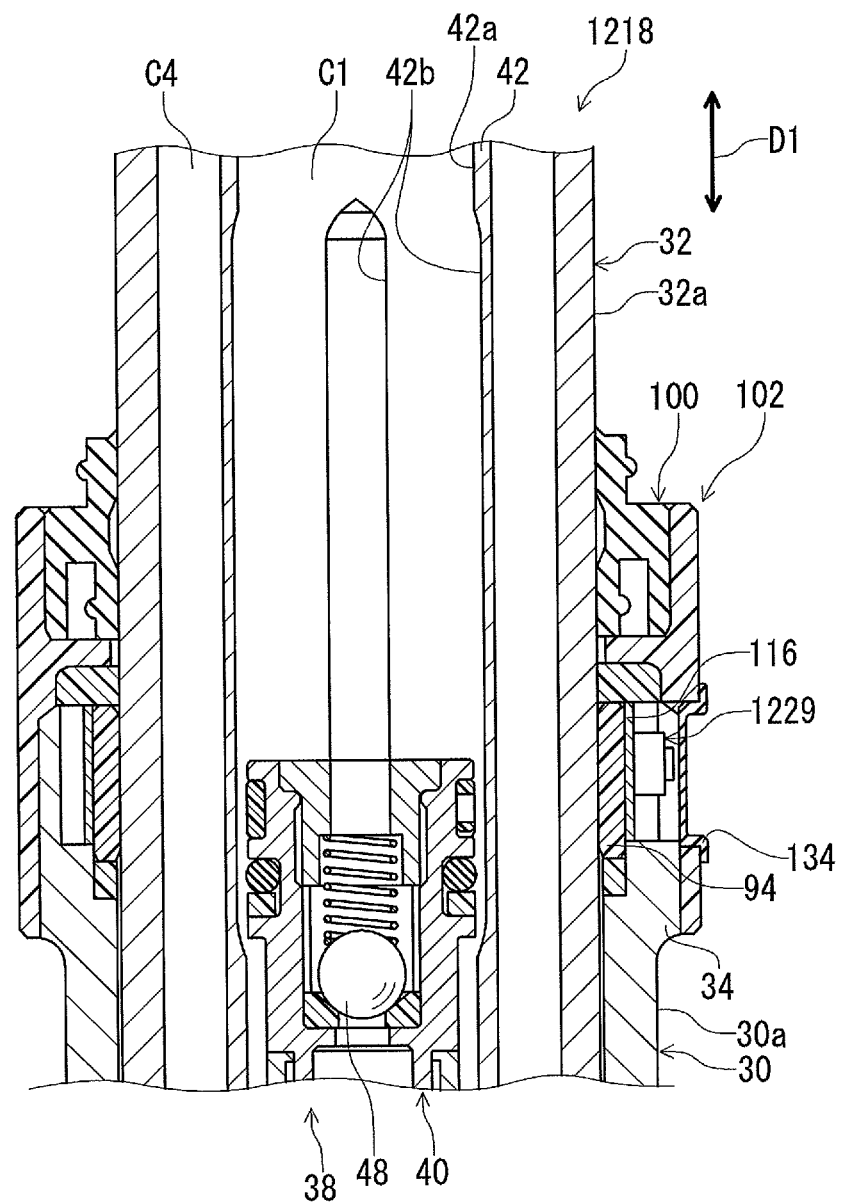
FIG. 44 is a cross-sectional view of the electrical seatpost assembly illustrated in FIG. 43.

As seen in FIG. 44, the indication operating device 1229 is provided on one of the first cylinder 30 and the second cylinder 32. In this embodiment, the indication operating device 1229 is provided on the second cylinder 32. However, the indication operating device 1229 can be provided on the first cylinder 30. The indication operating device 1229 is mounted on the control substrate 116.

Figure 45:
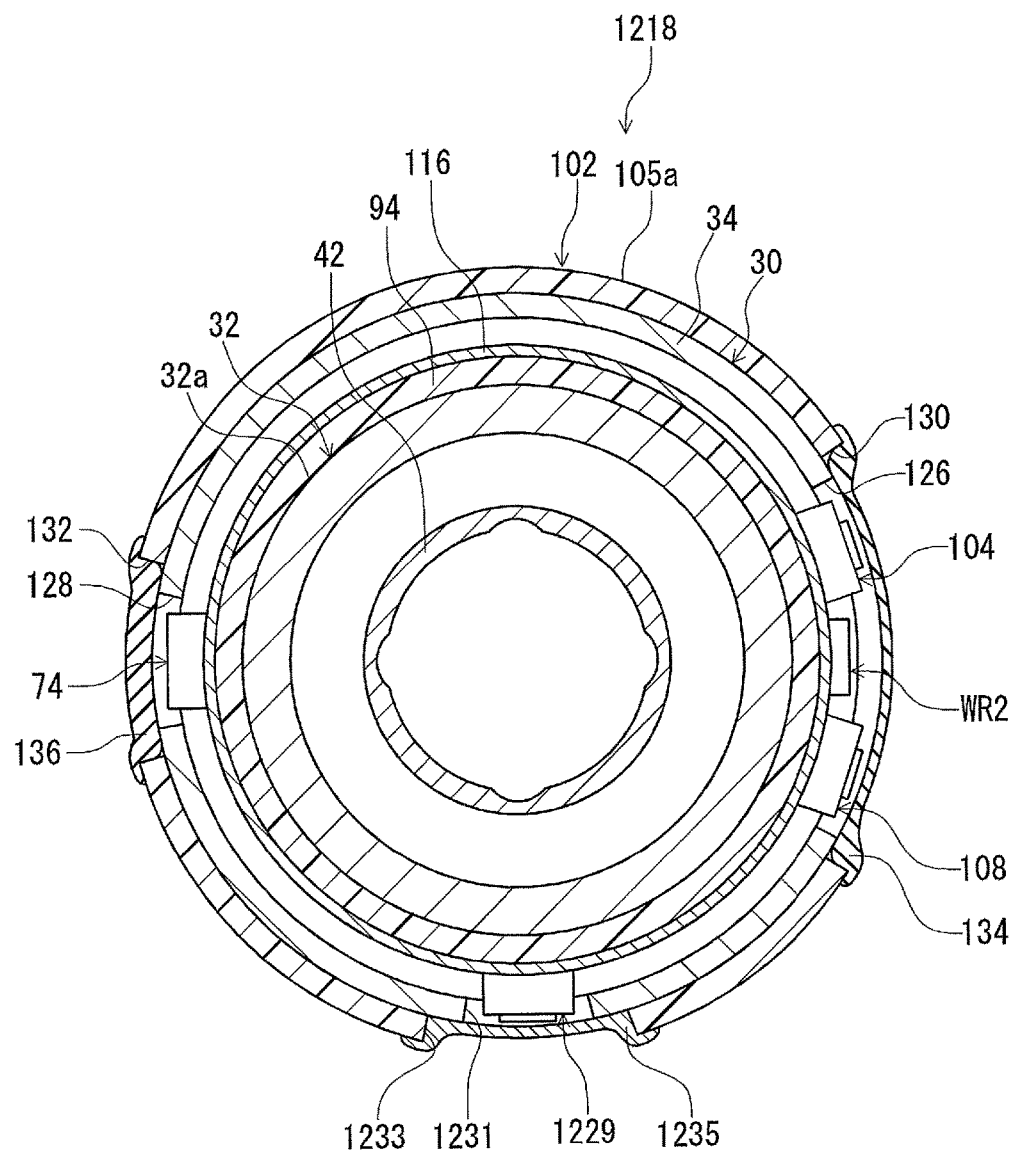
FIG. 45 is a cross-sectional view of the electrical seatpost assembly illustrated in FIG. 43.

As seen in FIG. 45, the indication operating device 1229 is mounted on the control substrate 82. The indication operating device 1229 is provided on the right side of the guide member 94 in the mounting state. However, the arrangement of the indication operating device 1229 is not limited to this embodiment.

The first cylinder 30 includes a fifth opening 1231. The fifth opening 1231 is provided on the right side of the guide member 94 in the mounting state. The cover member 102 includes a sixth opening 1233. The sixth opening 1233 is provided on the right side of the guide member 94 in the mounting state.

The electrical seatpost assembly 1218 includes a third cover 1235. The third cover 1235 is detachably attached to the cover member 102 to cover the fifth opening 1231 and the sixth opening 1233. The third cover 1235 is made of a flexible material such as rubber. The user can operate the indication operating device 1229 from outside of the electrical seatpost assembly 1218 via the third cover 1235.

With the electrical seatpost assembly 1218, it is possible to obtain substantially the same effects as those of the electrical seatpost assembly 18 in accordance with the first embodiment.

Since the electrical seatpost assembly 1218 further comprises the indication operating device 1229 to generate the indication command signal, it is possible to generate the indication command signal based on a user input via the indication operating device 1229. This allows the user to check the remaining battery level at a desired timing of the user's choice.

Since the indication operating device 1229 is provided on one of the first cylinder 30 and the second cylinder 32, it is possible to easily access the indication operating device 1229.

Thirteenth Embodiment

An electrical seatpost assembly 1318 in accordance with a thirteenth embodiment will be described below referring to FIGS. 46 and 47. The electrical seatpost assembly 1318 has substantially the same structure and/or configuration as that of the electrical seatpost assembly 18 except for the changing device 65. Thus, elements having substantially the same function as those in the above embodiments will be numbered the same here, and will not be described and/or illustrated again in detail here for the sake of brevity.

Figure 46:
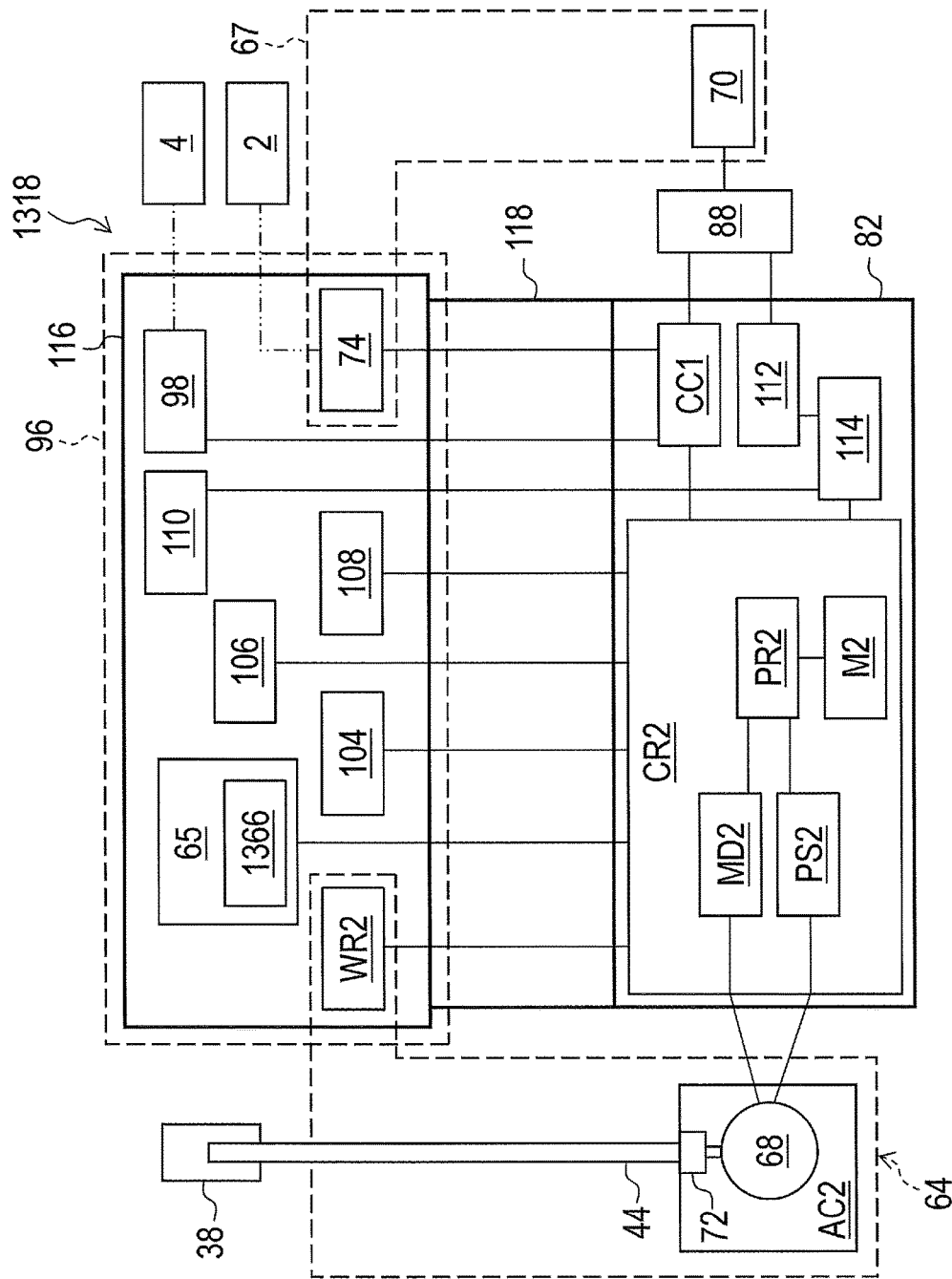
FIG. 46 is a block diagram of an electrical seatpost assembly in accordance with a thirteenth embodiment.

As seen in FIG. 46, in the electrical seatpost assembly 1318, the changing device 65 includes a sensor instead of the manual switch 66. The changing device 65 automatically changes the state of the actuating device 64 between the accessible state and the inaccessible state based on a sensing result of the sensor.

In this embodiment, the changing device 65 includes a vibration sensor 1366 to sense vibration of the bicycle 10. The vibration sensor 1366 is mounted to the first end 34 of the first cylinder 30. However, the vibration sensor 1366 can be mounted to other parts of the electrical seatpost assembly or other parts in the bicycle 10.

Figure 47:
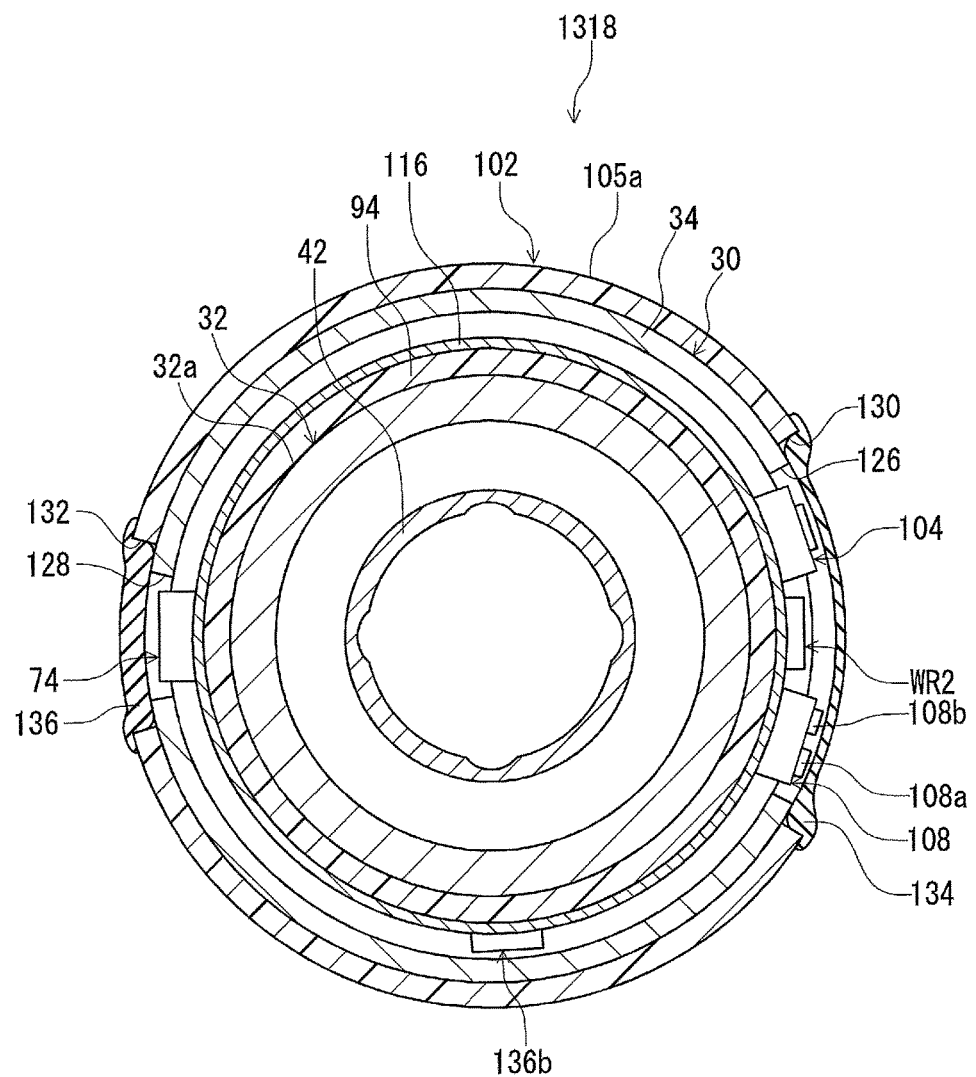
FIG. 47 is a cross-sectional view of the electrical seatpost assembly illustrated in FIG. 46.

As seen in FIG. 47, the vibration sensor 1366 is mounted on the control substrate 116. The vibration sensor 1366 is provided on the right side of the guide member 94 in the mounting state. However, the arrangement of the vibration sensor 1366 is not limited to this embodiment.

The changing device 65 automatically changes the state of the actuating device 64 between the accessible state and the inaccessible state based on a sensing result of the vibration sensor 1366. Specifically, the changing device 65 automatically changes the state of the actuating device 64 from the inaccessible state to the accessible state when the vibration sensor 1366 senses vibration of the bicycle 10 in the inaccessible state. The changing device 65 automatically changes the state of the actuating device 64 from the accessible state to the inaccessible state when the vibration sensor 1366 does not sense vibration of the bicycle 10 for a waiting time in the accessible state.

With the electrical seatpost assembly 1318, it is possible to obtain substantially the same effects as those of the electrical seatpost assembly 18 in accordance with the first embodiment.

Since the changing device 65 includes the sensor, it is possible to automatically change the state of the actuating device 64 between the accessible state and the inaccessible state using the changing device 65. This can reduce power consumption of the actuating device 64.

Since the changing device 65 includes the vibration sensor 1366 to sense vibration of the bicycle 10, it is possible to automatically switch the state of the actuating device 64 between the accessible state and the inaccessible state based on the vibration of the bicycle 10.

Fourteenth Embodiment

An electrical seatpost assembly 1418 in accordance with a fourteenth embodiment will be described below referring to FIGS. 48 and 49. The electrical seatpost assembly 1418 has substantially the same structure and/or configuration as that of the electrical seatpost assembly 1318 except for the changing device 65. Thus, elements having substantially the same function as those in the above embodiments will be numbered the same here, and will not be described and/or illustrated again in detail here for the sake of brevity.

Figure 48:
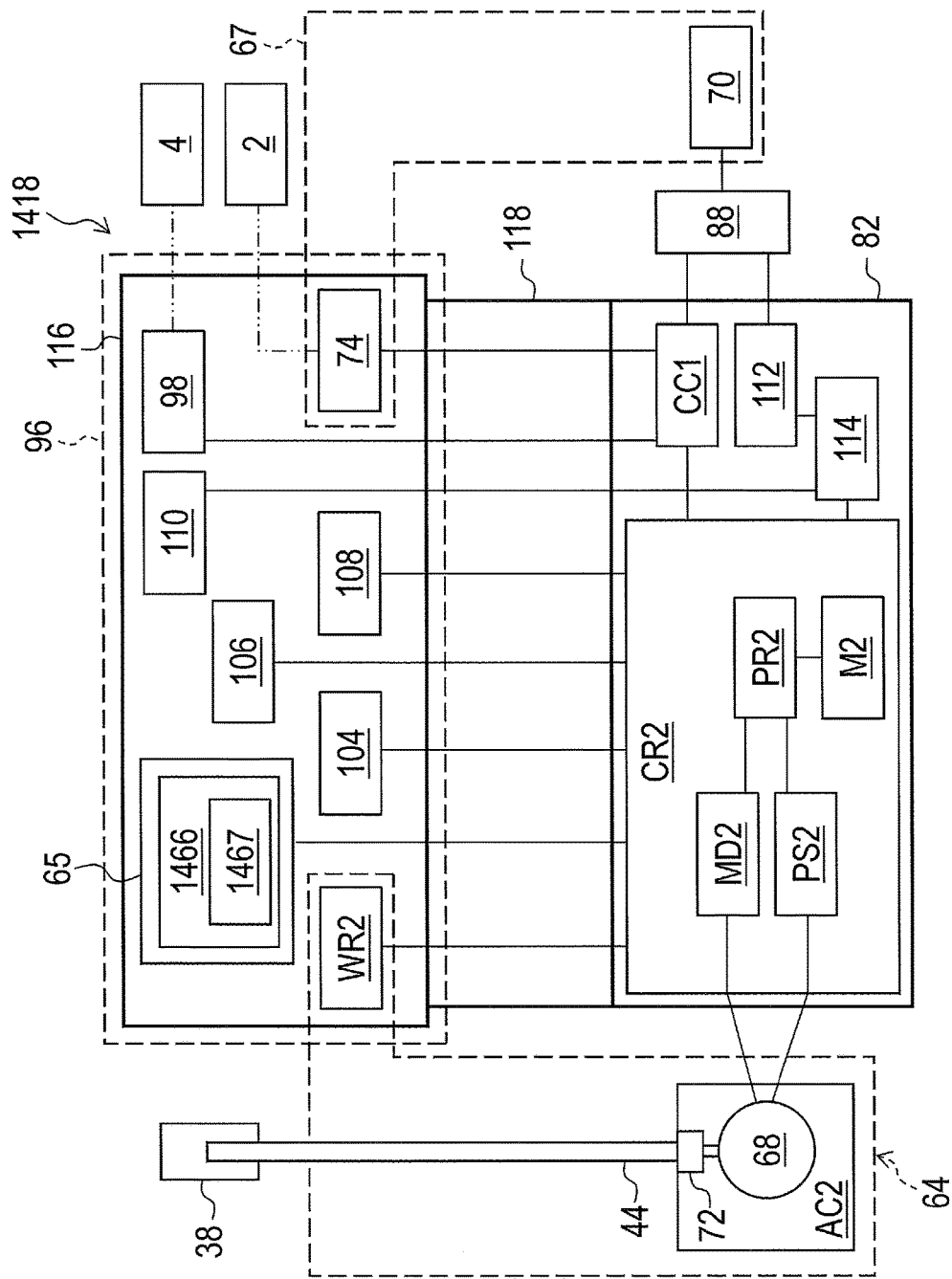
FIG. 48 is a block diagram of an electrical seatpost assembly in accordance with a fourteenth embodiment.

As seen in FIG. 48, in the electrical seatpost assembly 1418, the changing device 65 includes a seating sensor 1466 to sense that the rider is on the saddle 20 mounted to the electrical seatpost assembly 1418. In this embodiment, the seating sensor 1466 includes a strain sensor 1467 to sense strain of the electrical seatpost assembly 1418. Accordingly, it is possible to automatically change the state of the actuating device 64 between the accessible state and the inaccessible state based on the usage state of the electrical seatpost assembly 18. The strain sensor 1467 is electrically connected to the seatpost controller CR2. Examples of the strain sensor 1467 includes a strain gauge.

Figure 49:
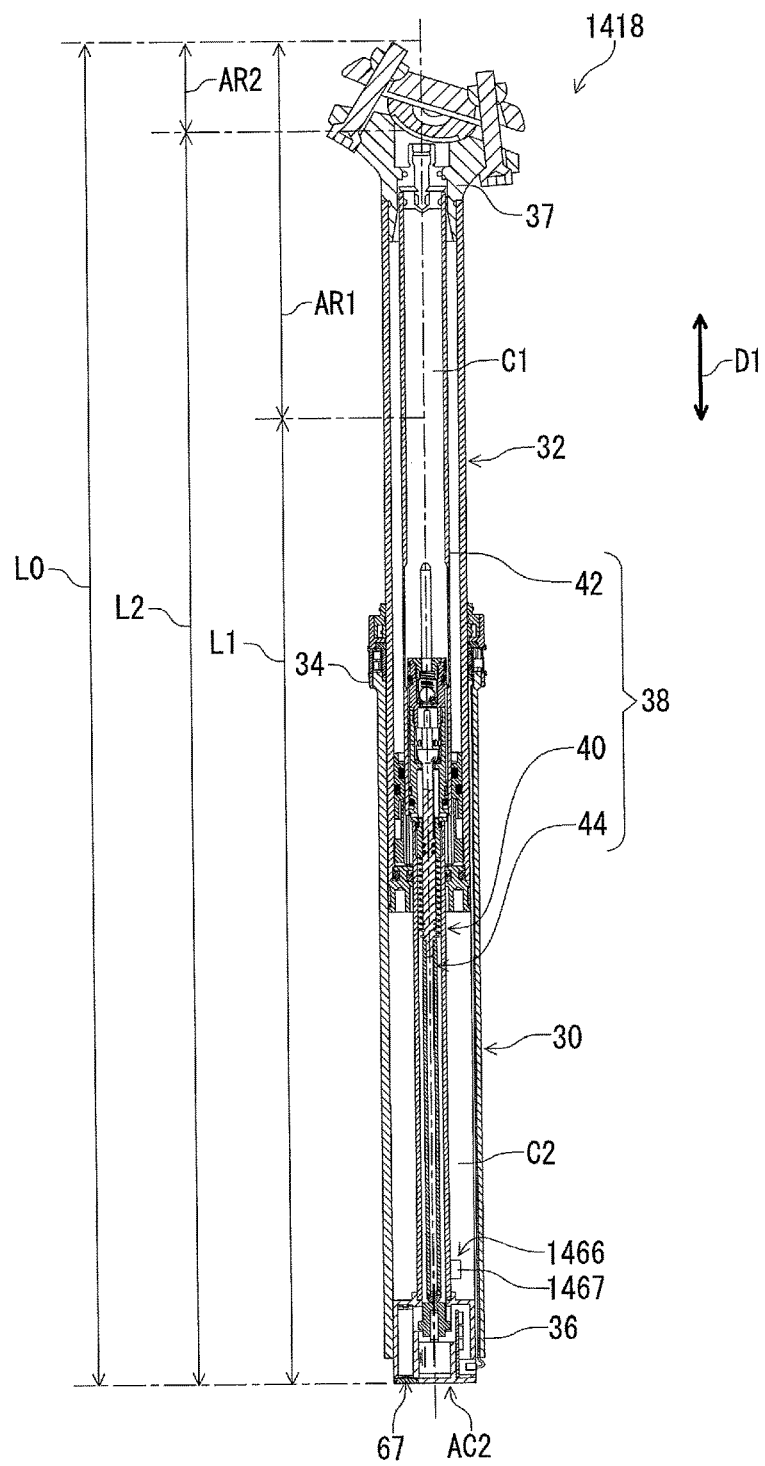
FIG. 49 is a cross-sectional view of the electrical seatpost assembly illustrated in FIG. 48.

As seen in FIG. 49, the seating sensor 1466 is provided in the positioning structure 38. Accordingly, it is possible to determine that the rider is on the saddle based on a state of the positioning structure 38. The strain sensor 1467 is attached to the support member 40 to sense strain of the support member 40. The strain occurs on the support member 40 when the rider sits on the saddle 20. However, the strain sensor 1467 can be attached to other parts of the electrical seatpost assembly 1418. The strain sensor 1467 is electrically connected to the seatpost controller CR2.

The changing device 65 automatically changes the state of the actuating device 64 between the accessible state and the inaccessible state based on a sensing result of the strain sensor 1467. Specifically, the changing device 65 automatically changes the state of the actuating device 64 from the inaccessible state to the accessible state when the strain sensor 1467 senses strain of the bicycle 10 in the inaccessible state. The changing device 65 automatically changes the state of the actuating device 64 from the accessible state to the inaccessible state when the strain sensor 1467 does not sense strain of the bicycle 10 for a waiting time in the accessible state.

With the electrical seatpost assembly 1418, it is possible to obtain substantially the same effects as those of the electrical seatpost assembly 1318 in accordance with the thirteenth embodiment.

Since the seating sensor 1466 includes the strain sensor 1467 to sense strain of the electrical seatpost assembly 1418, it is possible to sense that the rider is on the saddle 20 base on the strain of the electrical seatpost assembly 1418.

Fifteenth Embodiment

An electrical seatpost assembly 1518 in accordance with a fifteenth embodiment will be described below referring to FIGS. 50 and 51. The electrical seatpost assembly 1518 has substantially the same structure and/or configuration as that of the electrical seatpost assembly 1318 except for the seating sensor 1466. Thus, elements having substantially the same function as those in the above embodiments will be numbered the same here, and will not be described and/or illustrated again in detail here for the sake of brevity.

Figure 50:
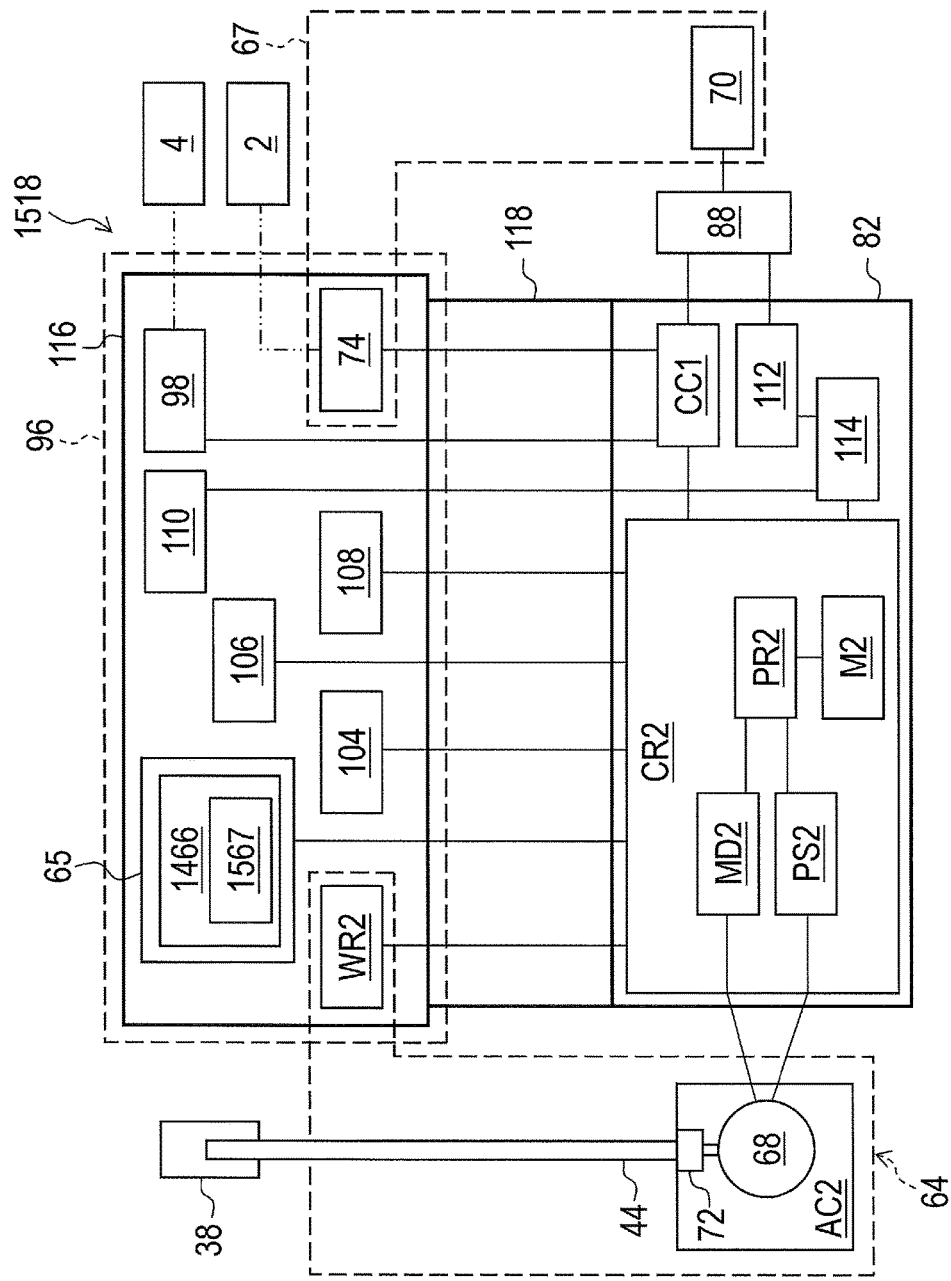
FIG. 50 is a block diagram of an electrical seatpost assembly in accordance with a fifteenth embodiment.

As seen in FIG. 50, in the electrical seatpost assembly 1518, the seating sensor 1466 includes an air pressure sensor 1567 to sense a pressure in an air chamber of the electrical seatpost assembly 1518.

Figure 51:
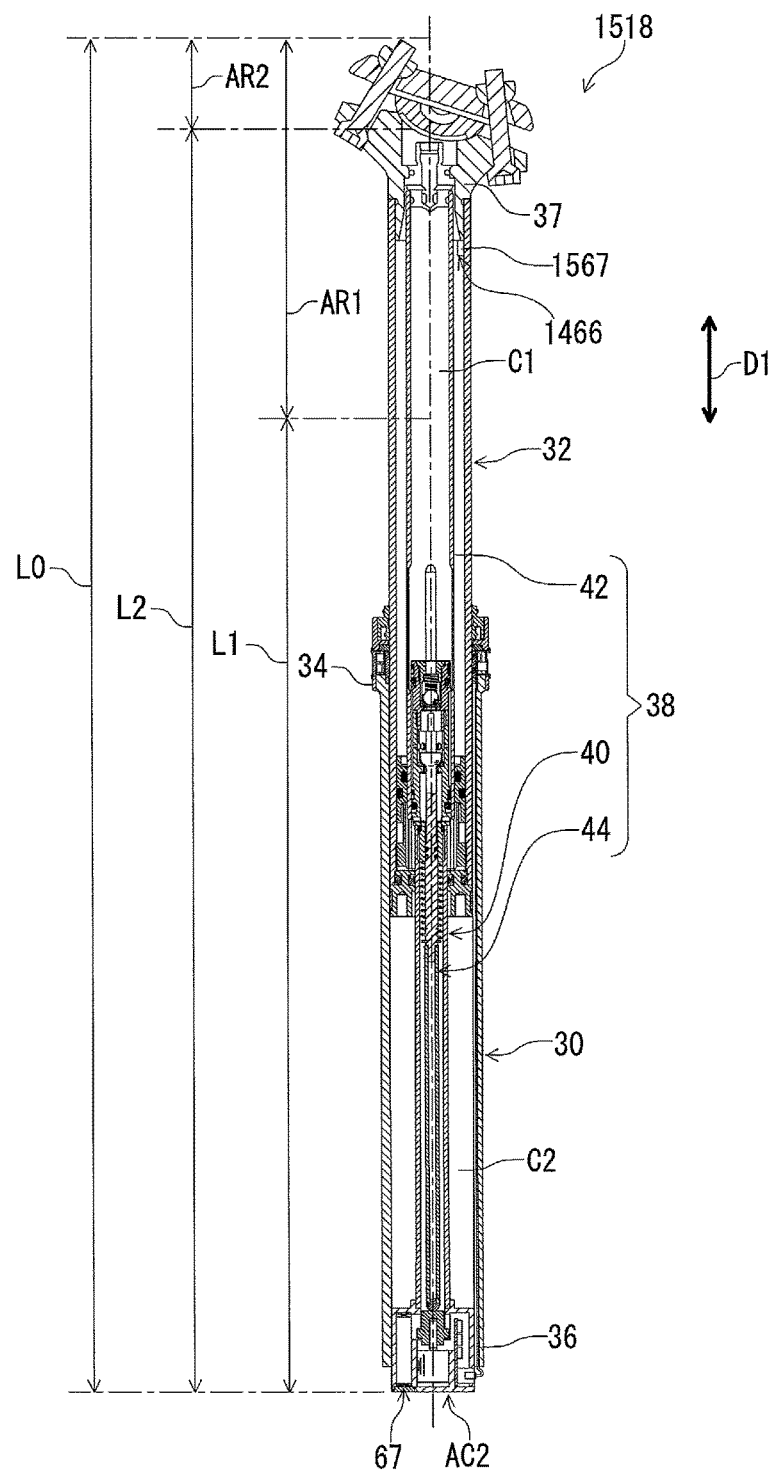
FIG. 51 is a cross-sectional view of the electrical seatpost assembly illustrated in FIG. 50.

As seen in FIG. 51, in this embodiment, the air pressure sensor 1567 senses a pressure in the biasing chamber C4 of the electrical seatpost assembly 1518. The pressure varies in the biasing chamber C4 due to the rider's weight when the rider sits on the saddle 20. The air pressure sensor 1567 senses change in the pressure of the biasing chamber C4.

The changing device 65 automatically changes the state of the actuating device 64 between the accessible state and the inaccessible state based on a sensing result of the air pressure sensor 1567. Specifically, the changing device 65 automatically changes the state of the actuating device 64 from the inaccessible state to the accessible state when the air pressure sensor 1567 senses the change in the pressure of the biasing chamber C4 in the inaccessible state. The changing device 65 automatically changes the state of the actuating device 64 from the accessible state to the inaccessible state when the air pressure sensor 1567 does not sense the change in the pressure of the biasing chamber C4 for a waiting time in the accessible state. In this embodiment, the changing device 65 automatically changes the state of the actuating device 64 between the accessible state and the inaccessible state only when the movable member 44 is positioned at the closed position P10.

With the electrical seatpost assembly 1518, it is possible to obtain substantially the same effects as those of the electrical seatpost assembly 1318 in accordance with the thirteenth embodiment.

The seating sensor 1466 includes the air pressure sensor 1567, it is possible to sense that the rider is on the saddle 20 base on the pressure of the air chamber (e.g., the biasing chamber C4).

Sixteenth Embodiment

An electrical seatpost assembly 1618 in accordance with a sixteenth embodiment will be described below referring to FIGS. 52 and 53. The electrical seatpost assembly 1618 has substantially the same structure and/or configuration as that of the electrical seatpost assembly 1418 except for the seating sensor 1466. Thus, elements having substantially the same function as those in the above embodiments will be numbered the same here, and will not be described and/or illustrated again in detail here for the sake of brevity.

Figure 52:
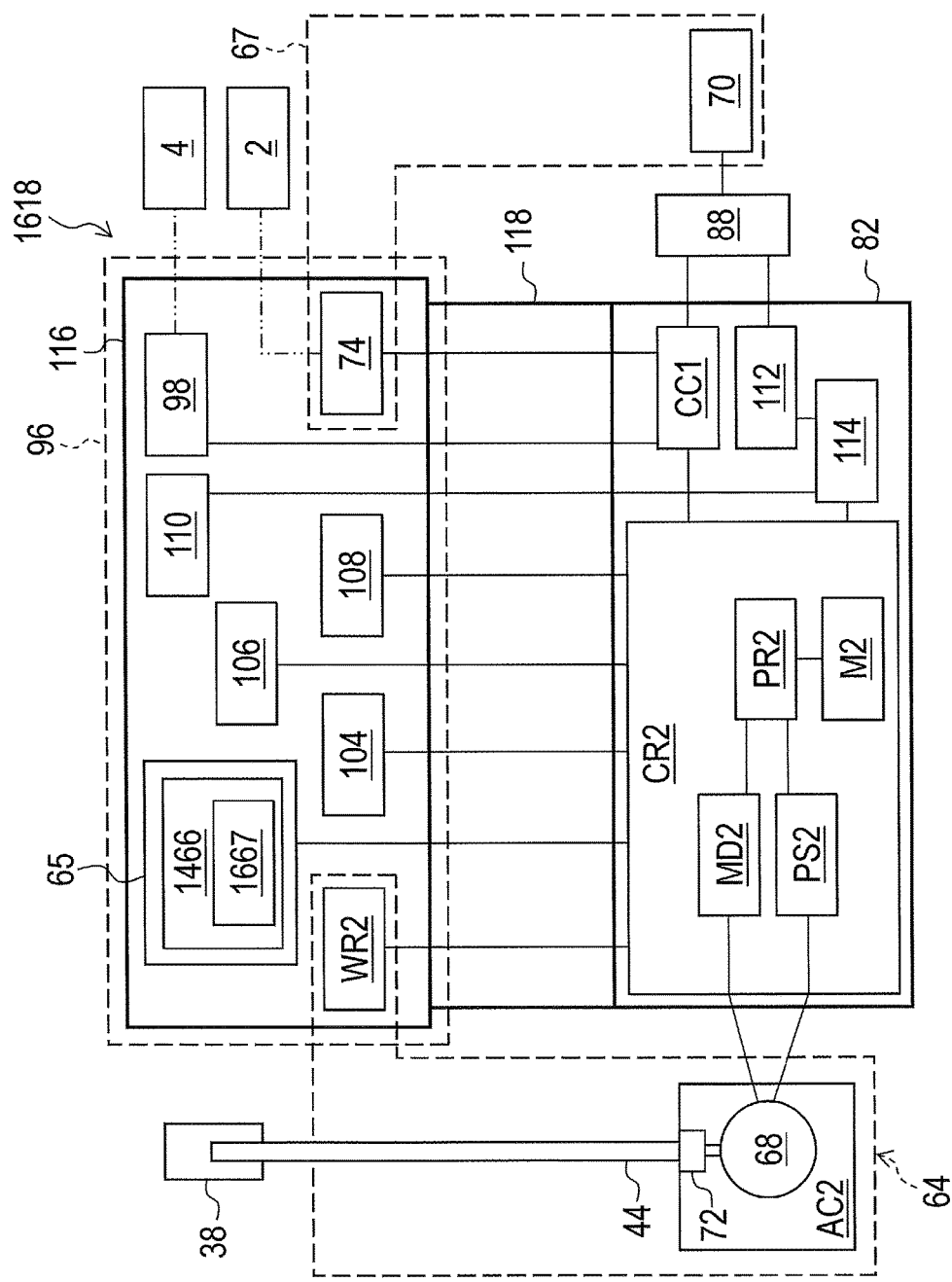
FIG. 52 is a block diagram of an electrical seatpost assembly in accordance with a sixteenth embodiment.
Figure 53:
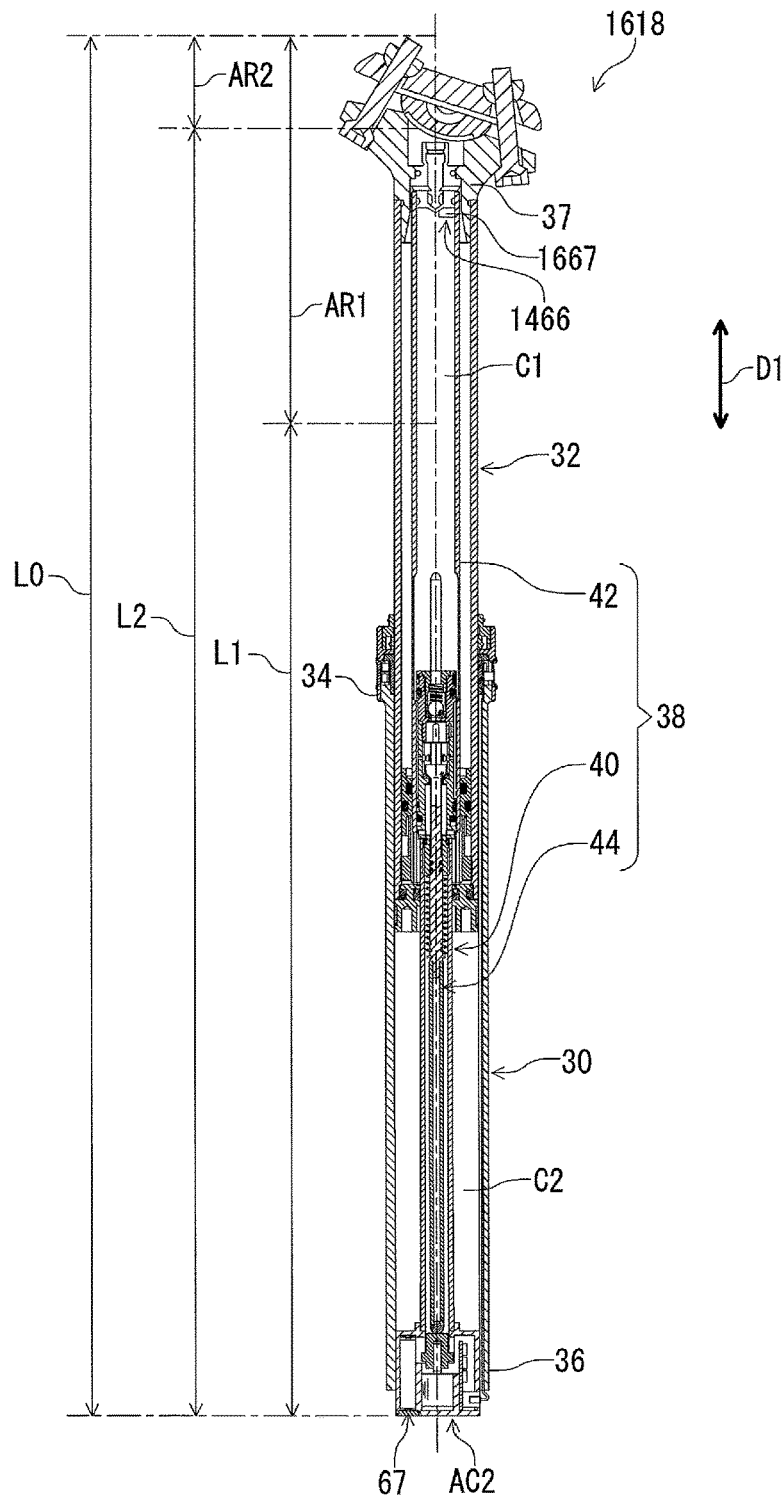
FIG. 53 is a cross-sectional view of the electrical seatpost assembly illustrated in FIG. 52.

As seen in FIG. 52, in the electrical seatpost assembly 1618, the seating sensor 1466 includes a hydraulic sensor 1667 to sense a pressure in a hydraulic chamber of the electrical seatpost assembly 1618.

In this embodiment, the hydraulic sensor 1667 senses a pressure in the first chamber C1 of the electrical seatpost assembly 1618. The pressure varies in the first chamber C1 when the rider sits on the saddle 20. The hydraulic sensor 1667 senses change in the pressure of the first chamber C1.

The changing device 65 automatically changes the state of the actuating device 64 between the accessible state and the inaccessible state based on a sensing result of the hydraulic sensor 1667. Specifically, the changing device 65 automatically changes the state of the actuating device 64 from the inaccessible state to the accessible state when the hydraulic sensor 1667 senses the change in the pressure of the first chamber C1 in the inaccessible state. The changing device 65 automatically changes the state of the actuating device 64 from the accessible state to the inaccessible state when the hydraulic sensor 1667 does not sense the change in the pressure of the first chamber C1 for a waiting time in the accessible state.

With the electrical seatpost assembly 1618, it is possible to obtain substantially the same effects as those of the electrical seatpost assembly 1418 in accordance with the fourteenth embodiment.

Since the seating sensor 1466 includes the hydraulic sensor 1667, it is possible to sense that the rider is on the saddle 20 base on the pressure of the hydraulic chamber (e.g., the first chamber C1).

The configurations of the rear derailleur in accordance with each of the above embodiments can be at least partly applied to the front derailleur.

It will be apparent to those skilled in the bicycle field from the present disclosure that the structures and/or configurations of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. An electrical seatpost assembly comprising:
   a first cylinder comprising:
      a first end; and
      a second end opposite to the first end in a telescopic direction; and
   a second cylinder telescopically received in the first cylinder from the first end;
   a guide member disposed between the first cylinder and the second cylinder to slidably guide the second cylinder with respect to the first cylinder;
   a positioning structure to adjustably position the second cylinder relative to the first cylinder in the telescopic direction;
   an electrical actuator to actuate the positioning structure in accordance with an electrical signal; and
   an electrical device mounted to the first cylinder, an upper end of the electrical device being disposed above a lower end of the guide member in the telescopic direction in a mounting state where the first cylinder is mounted to a bicycle frame.

2. The electrical seatpost assembly according to claim 1, wherein
   the guide member is provided at the first end.

3. The electrical seatpost assembly according to claim 1, further comprising:
   a seal provided at the first end to seal a gap between the first and second cylinders, wherein
   the upper end of the electrical device is disposed above a lower end of the seal in the telescopic direction in the mounting state.

4. The electrical seatpost assembly according to claim 3, wherein the first cylinder includes a cover member provided at the first end, and at least one of the guide member and the seal is disposed between the cover member and the second cylinder in the direction perpendicular to the telescopic direction.

5. The electrical seatpost assembly according to claim 1, wherein the electrical device is configured to receive at least one of an electrical input and a mechanical input.

6. The electrical seatpost assembly according to claim 5, wherein the electrical device includes a wireless receiver to wirelessly receive a wireless signal.

7. The electrical seatpost assembly according to claim 6, wherein the electrical device includes a pairing switch to switch a mode of the wireless receiver to a pairing mode.

8. The electrical seatpost assembly according to claim 6, wherein the first cylinder includes a cover member provided at the first end, and the cover member includes a resin material.

9. The electrical seatpost assembly according to claim 1, wherein the electrical device includes a start switch to turn the electrical actuator on.

10. The electrical seatpost assembly according to claim 1, wherein the electrical device includes an operating switch to operate the electrical actuator to actuate the positioning structure.

11. The electrical seatpost assembly according to claim 1, wherein the electrical device includes a control substrate.

12. The electrical seatpost assembly according to claim 1, wherein the electrical device includes an indicator provided outside the first cylinder and the second cylinder to indicate seatpost information relating to the electrical seatpost assembly.

13. The electrical seatpost assembly according to claim 12, wherein the seatpost information includes a remaining battery level of a battery to supply electrical power to the electrical actuator.

14. The electrical seatpost assembly according to claim 1, wherein the electrical device includes a charging port to receive electrical power to charge a battery.

15. The electrical seatpost assembly according to claim 1, wherein the electrical device is provided on a front side of the guide member in the mounting state.

16. The electrical seatpost assembly according to claim 1, wherein the first cylinder includes a cover member provided at the first end, the cover member includes an outer peripheral surface, and the electrical device is provided not to protrude radially outwardly from the outer peripheral surface of the cover member.

17. The electrical seatpost assembly according to claim 1, wherein the electrical device includes at least one power receiving port to receive electrical power from an external power supply.

18. The electrical seatpost assembly according to claim 17, wherein the at least one power receiving port is movably mounted relative to the first cylinder in a circumferential direction of the first cylinder.

19. The electrical seatpost assembly according to claim 17, wherein the at least one power receiving port includes a plurality of power receiving ports, and the plurality of power receiving ports are spaced apart from each other in a circumferential direction of the first cylinder.

20. The electrical seatpost assembly according to claim 1, wherein the electrical device includes a battery.

21. The electrical seatpost assembly according to claim 20, wherein the first cylinder includes a cover member provided at the first end, and the battery is detachably attached to the cover member.

22. The electrical seatpost assembly according to claim 20, wherein the first cylinder includes a cover member provided at the first end, and one of the electrical device and the cover member includes a charging port to receive electrical power to charge the battery.

23. The electrical seatpost assembly according to claim 20, wherein the battery is provided on a rear side of the cover member in the mounting state.

24. The electrical seatpost assembly according to claim 1, further comprising:

a connecting part, wherein the electrical actuator includes a motor, the motor is provided at the second end of the first cylinder, and the connecting part electrically connects the electrical device to the motor.

25. The electrical seatpost assembly according to claim 24, wherein the connecting part includes an electronic substrate electrically connecting the electrical device to the motor.

26. The electrical seatpost assembly according to claim 24, wherein the first cylinder includes an accommodation part accommodating the connecting part.

27. An electrical seatpost assembly comprising:

a first cylinder;

a second cylinder telescopically received in the first cylinder;

a positioning structure to adjustably position the second cylinder relative to the first cylinder in the telescopic direction;

an electrical actuator to actuate the positioning structure in accordance with an electrical signal; and an indicator to indicate seatpost information relating to the electrical seatpost assembly, the indicator being mounted to the first cylinder.

28. The electrical seatpost assembly according to claim 27, wherein the indicator includes one of a light emitting element and a display.

29. The electrical seatpost assembly according to claim 27, wherein the seatpost information includes a remaining battery level of a battery to supply electrical power to the electrical actuator.

30. The electrical seatpost assembly according to claim 29, further comprising:
the battery to supply the electrical power to the electrical actuator.

31. The electrical seatpost assembly according to claim 29, wherein
the indicator indicates the remaining battery level of the battery when the electrical actuator is turned on.

32. The electrical seatpost assembly according to claim 29, wherein
the indicator indicates the remaining battery level of the battery when the indicator receives an indication command signal.

33. The electrical seatpost assembly according to claim 32, further comprising:
an indication operating device to generate the indication command signal.

34. The electrical seatpost assembly according to claim 33, wherein
the indication operating device is provided on one of the first cylinder and the second cylinder.

35. The electrical seatpost assembly according to claim 27, wherein
the indicator is provided on a front side of the first cylinder in a mounting state where the first cylinder is mounted to a bicycle frame.

36. An electrical seatpost assembly comprising:
a first cylinder;
a second cylinder telescopically received in the first cylinder;
a positioning structure to adjustably position the second cylinder relative to the first cylinder in the telescopic direction, the positioning structure having a movable member movably provided in a movement direction parallel to the telescopic direction;
an actuating device to actuate the positioning structure by moving the movable member in the movement direction, the actuating device having
an accessible state where the actuating device is controlled in accordance with an electrical signal, and
an inaccessible state where the actuating device is not controlled in accordance with an electrical signal; and
a changing device to change a state of the actuating device between the accessible state and the inaccessible state.

37. The electrical seatpost assembly according to claim 36, wherein
the changing device includes a manual switch.

38. The electrical seatpost assembly according to claim 37, wherein
the manual switch is provided on an outer peripheral surface of one of the first cylinder and the second cylinder.

39. The electrical seatpost assembly according to claim 36, wherein
the changing device includes a sensor and automatically changes the state of the actuating device between the accessible state and the inaccessible state based on a sensing result of the sensor.

40. The electrical seatpost assembly according to claim 39, wherein
the changing device includes a vibration sensor to sense vibration of a bicycle.

41. The electrical seatpost assembly according to claim 39, wherein
the changing device includes a seating sensor to sense that a rider is on a saddle mounted to the electrical seatpost assembly.

42. The electrical seatpost assembly according to claim 41, wherein
the seating sensor includes a strain sensor to sense strain of the electrical seatpost assembly.

43. The electrical seatpost assembly according to claim 41, wherein
the seating sensor includes an air pressure sensor to sense a pressure in an air chamber of the electrical seatpost assembly.

44. The electrical seatpost assembly according to claim 41, wherein
the seating sensor includes a hydraulic sensor to sense a pressure in a hydraulic chamber of the electrical seatpost assembly.

45. The electrical seatpost assembly according to claim 39, wherein
the seating sensor is provided in the positioning structure.

46. The electrical seatpost assembly according to claim 36, wherein
the changing device changes the state of the actuating device from the accessible state to the inaccessible state when the changing device does not receive an input for a waiting time in the accessible state.

47. The electrical seatpost assembly according to claim 36, wherein
the actuating device includes
a wireless receiver to wirelessly receive a wireless signal, and
an electrical actuator to actuate the positioning structure in accordance with the wireless signal, and
the wireless receiver wirelessly receives the wireless signal in the accessible state of the actuating device.

48. The electrical seatpost assembly according to claim 36, wherein
the actuating device includes an electrical actuator to actuate the positioning structure based on a wireless signal, the electrical seatpost assembly further comprising:
an operating switch to operate the electrical actuator to actuate the positioning structure without the wireless signal.

* * * * *